United States Patent [19]
Kasahara et al.

[11] Patent Number: 5,729,510
[45] Date of Patent: Mar. 17, 1998

[54] OPTICAL HEAD USED FOR RECORDING ON OPTICAL RECORDING MEDIUM HAVING VARIOUS THICKNESSES, WARPAGE AND THE LIKE

[75] Inventors: Akihiro Kasahara, Chiba-ken; Isao Hoshino; Hisashi Yamada, both of Yokohama, all of Japan

[73] Assignee: Kabushiki Kaisha Toshiba, Kawasaki, Japan

[21] Appl. No.: 374,992

[22] Filed: Jan. 19, 1995

[30] Foreign Application Priority Data

Jan. 19, 1994 [JP] Japan ................ 6-004212
Mar. 31, 1994 [JP] Japan ................ 6-083788
Sep. 14, 1994 [JP] Japan ................ 6-220095

[51] Int. Cl.⁶ ............................................. G11B 7/095
[52] U.S. Cl. .................... 369/44.14; 369/44.23; 369/44.27; 369/58
[58] Field of Search ................ 369/44.14, 44.11, 369/44.23, 112, 44, 27, 54, 58, 111

[56] References Cited

U.S. PATENT DOCUMENTS

| | | | |
|---|---|---|---|
| 3,999,009 | 12/1976 | Bouwhuis | 369/112 |
| 4,460,989 | 7/1984 | Russell | 369/44.14 |
| 4,644,516 | 2/1987 | Musha | 369/112 |
| 4,759,005 | 7/1988 | Kasahara | 369/44 |
| 4,956,833 | 9/1990 | Kokado et al. | 369/112 |
| 5,097,464 | 3/1992 | Nishiuchi et al. | 369/112 |
| 5,148,421 | 9/1992 | Satoh et al. | 369/44.23 |
| 5,235,581 | 8/1993 | Miyagawa et al. | 369/44.12 |
| 5,255,262 | 10/1993 | Best et al. | 369/94 |
| 5,307,336 | 4/1994 | Lee et al. | 369/112 |

FOREIGN PATENT DOCUMENTS 60-140549  7/1985  Japan.

*Primary Examiner*—W. R. Young
*Attorney, Agent, or Firm*—Oblon, Spivak, McClelland, Maier & Neustadt, P.C.

[57] ABSTRACT

An optical head apparatus includes a stationary optical system having a light source and a detector for detecting light reflected by a recording medium, which stationary optical system is arranged at a position fixed to the recording medium. Plural objective lenses for focusing/irradiating light emitted from the light source onto the recording medium are arranged on a rotating blade which is provided to be rotatable in a direction parallel to the recording medium. By controlling the waveform of a current to be supplied to a tracking coil, the blade is rotated and a desired one of the objective lenses is located on an optical axis of the light irradiated onto the recording medium.

52 Claims, 44 Drawing Sheets

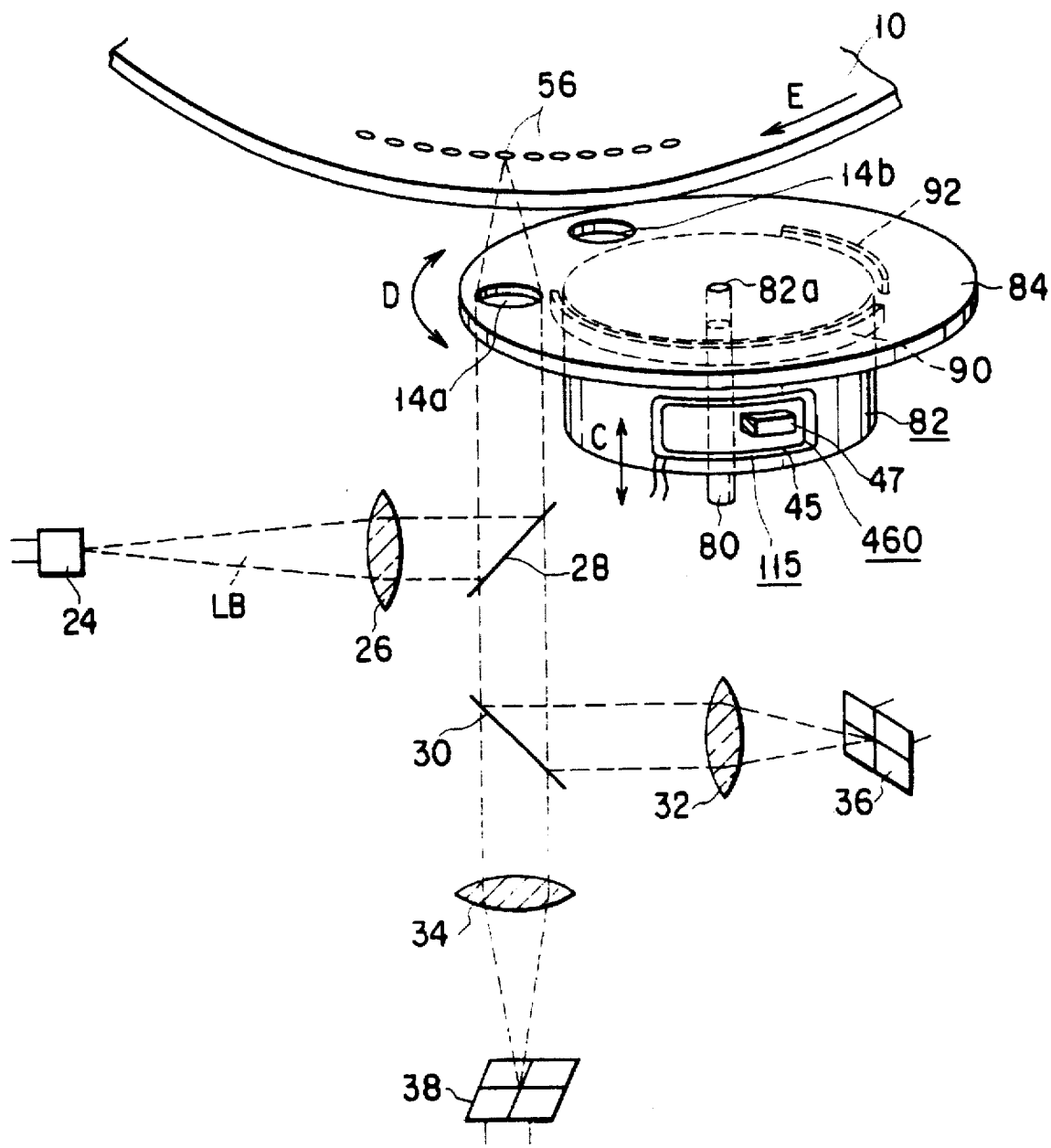
F I G. 8

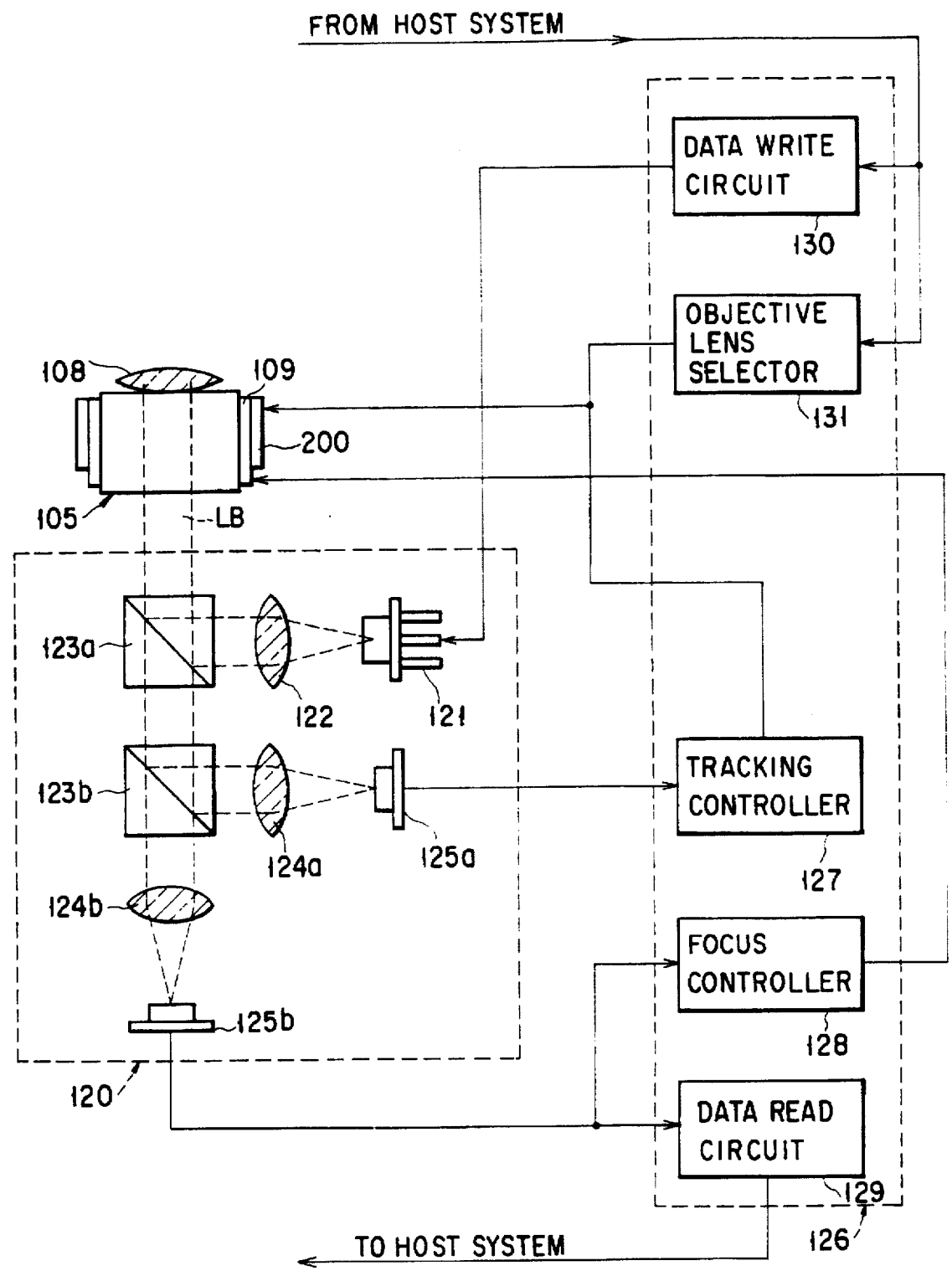
F I G. 18

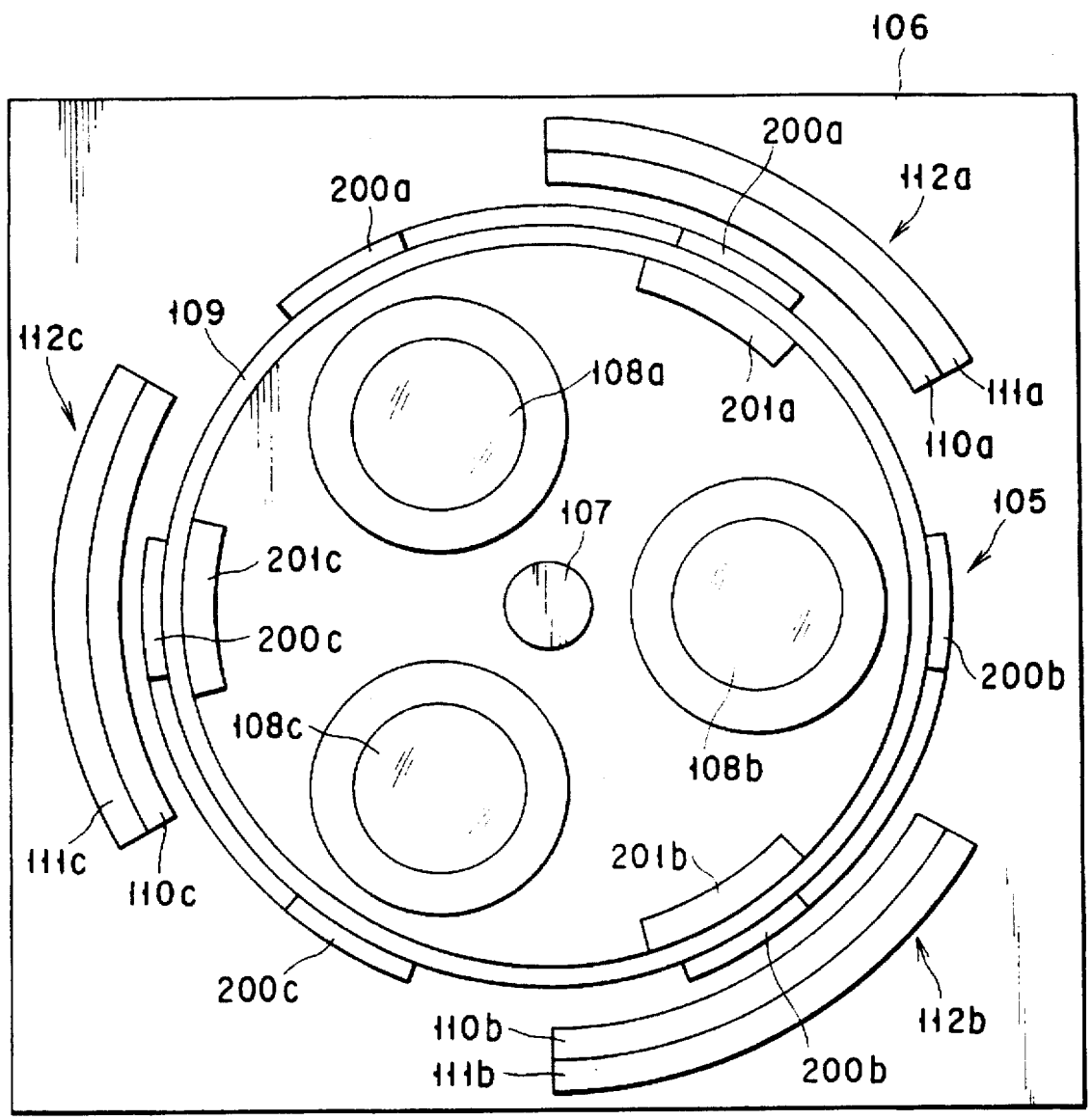
F I G. 22

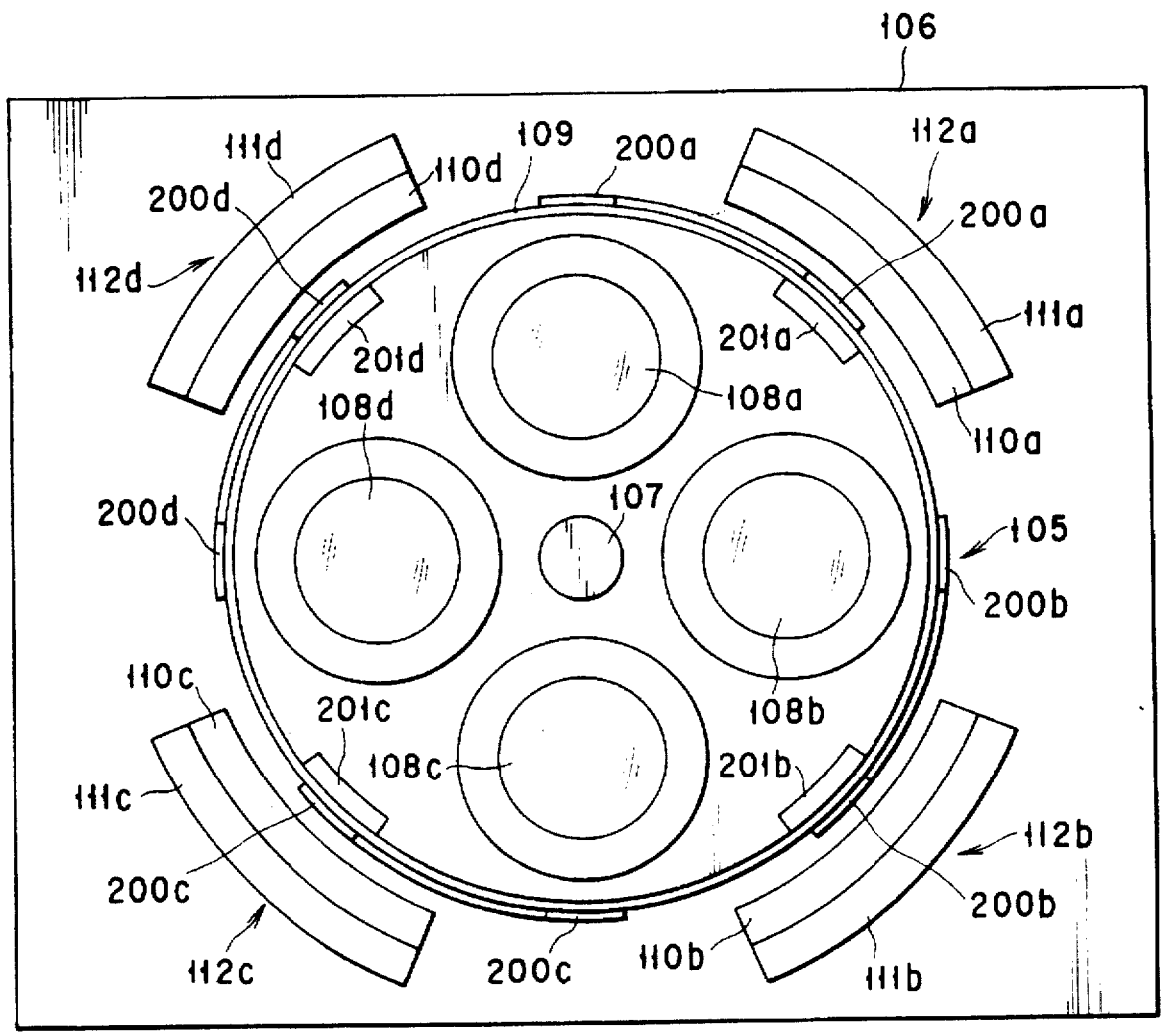
F I G. 23

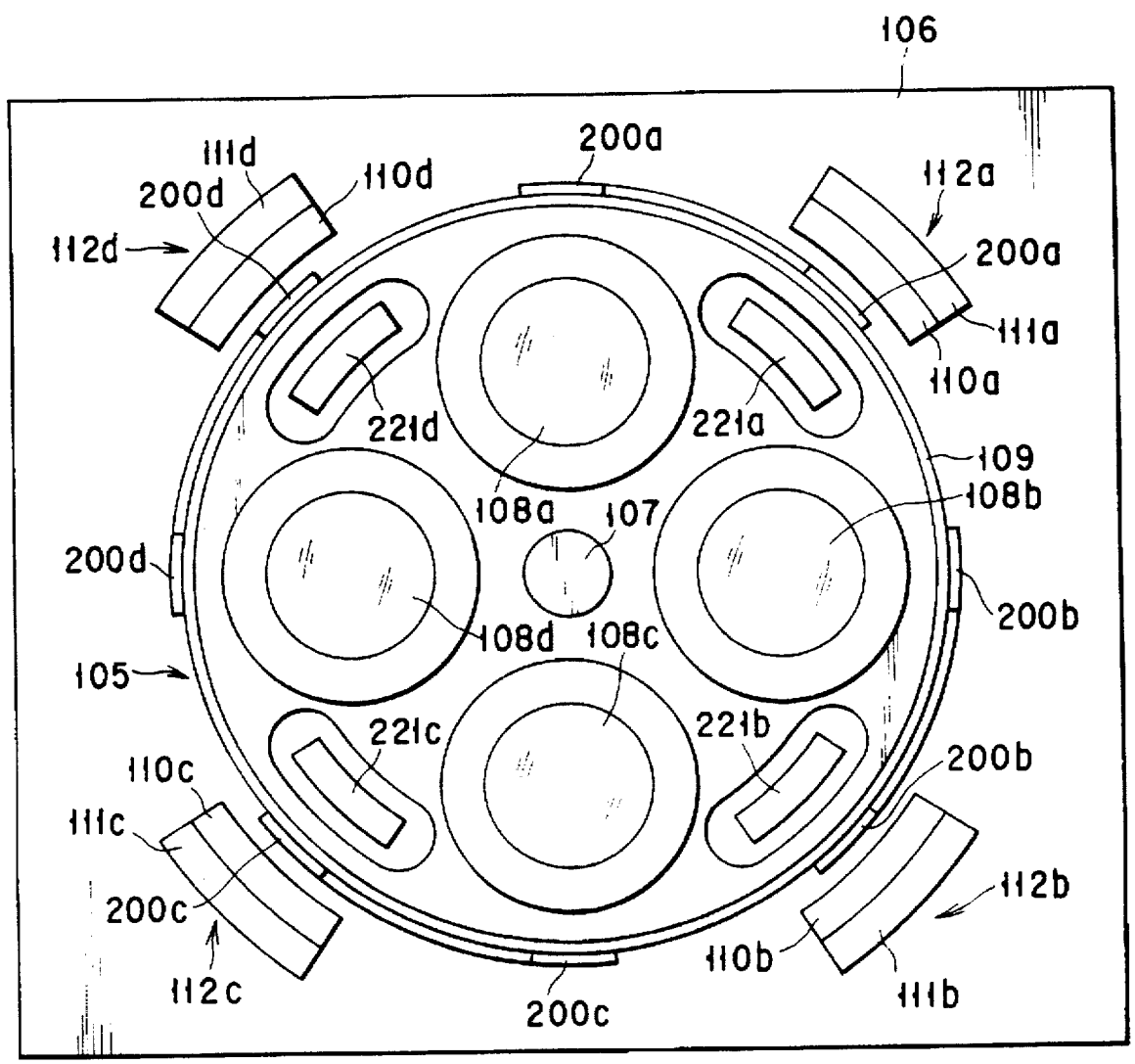
F I G. 27

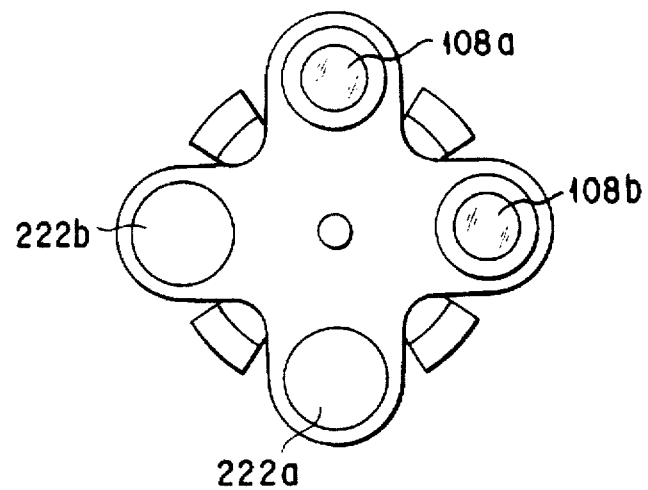
F I G. 29A
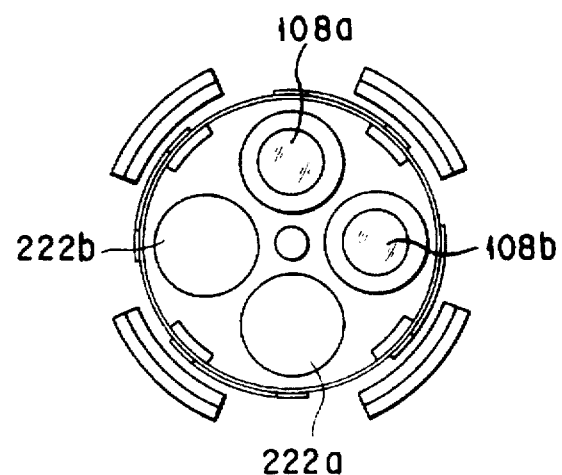
F I G. 29B
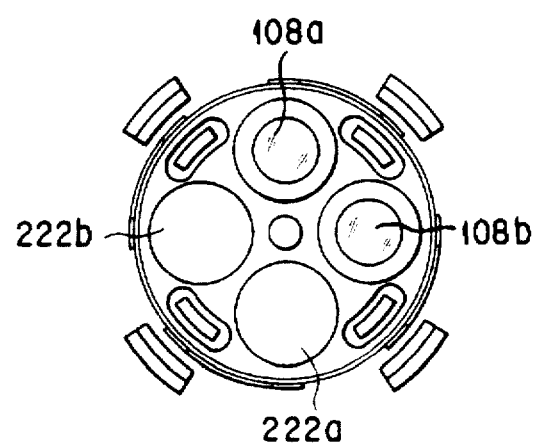
F I G. 29C

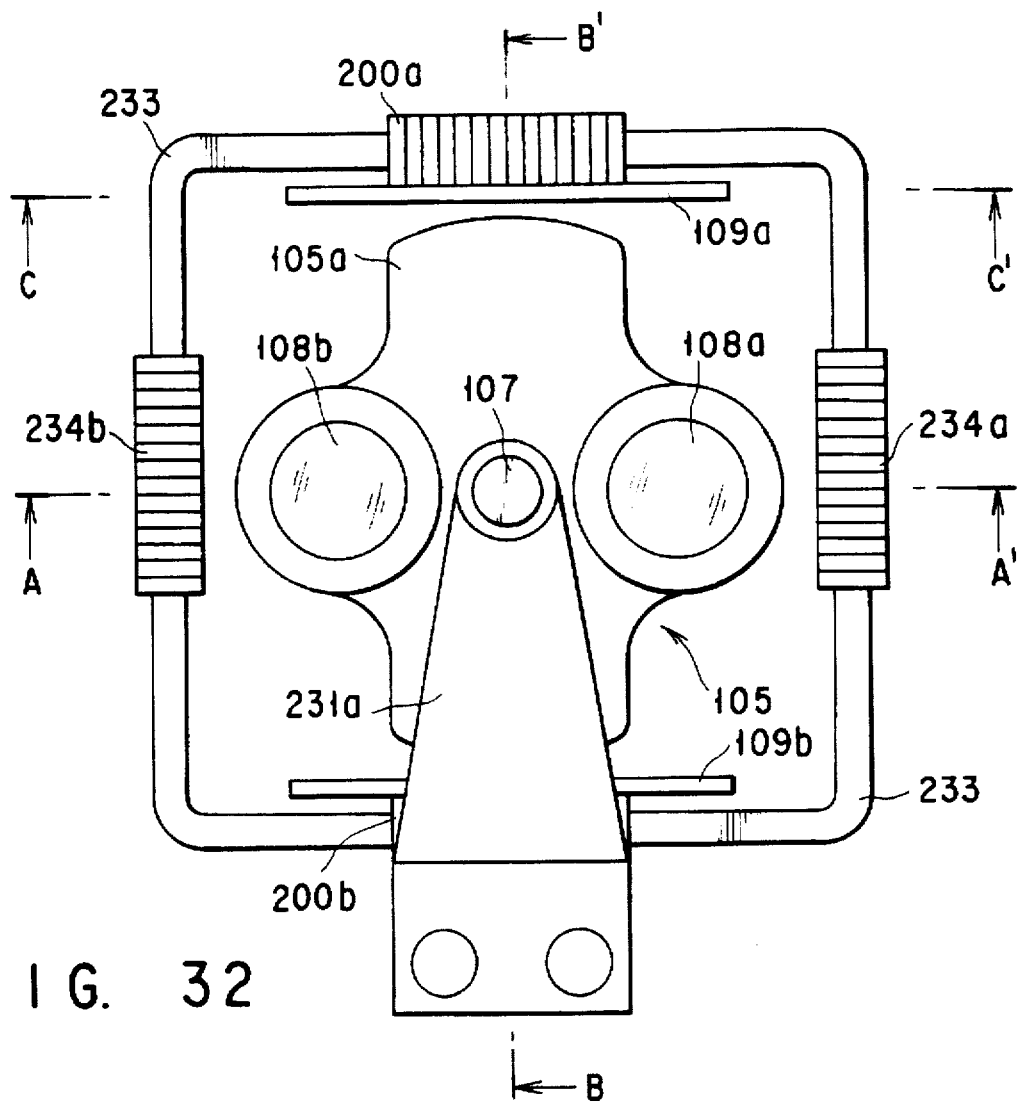
F I G. 32
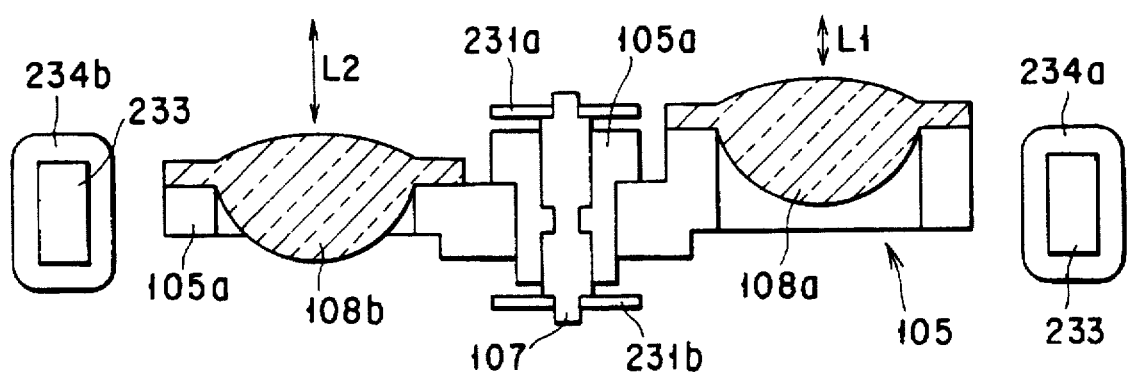
F I G. 33

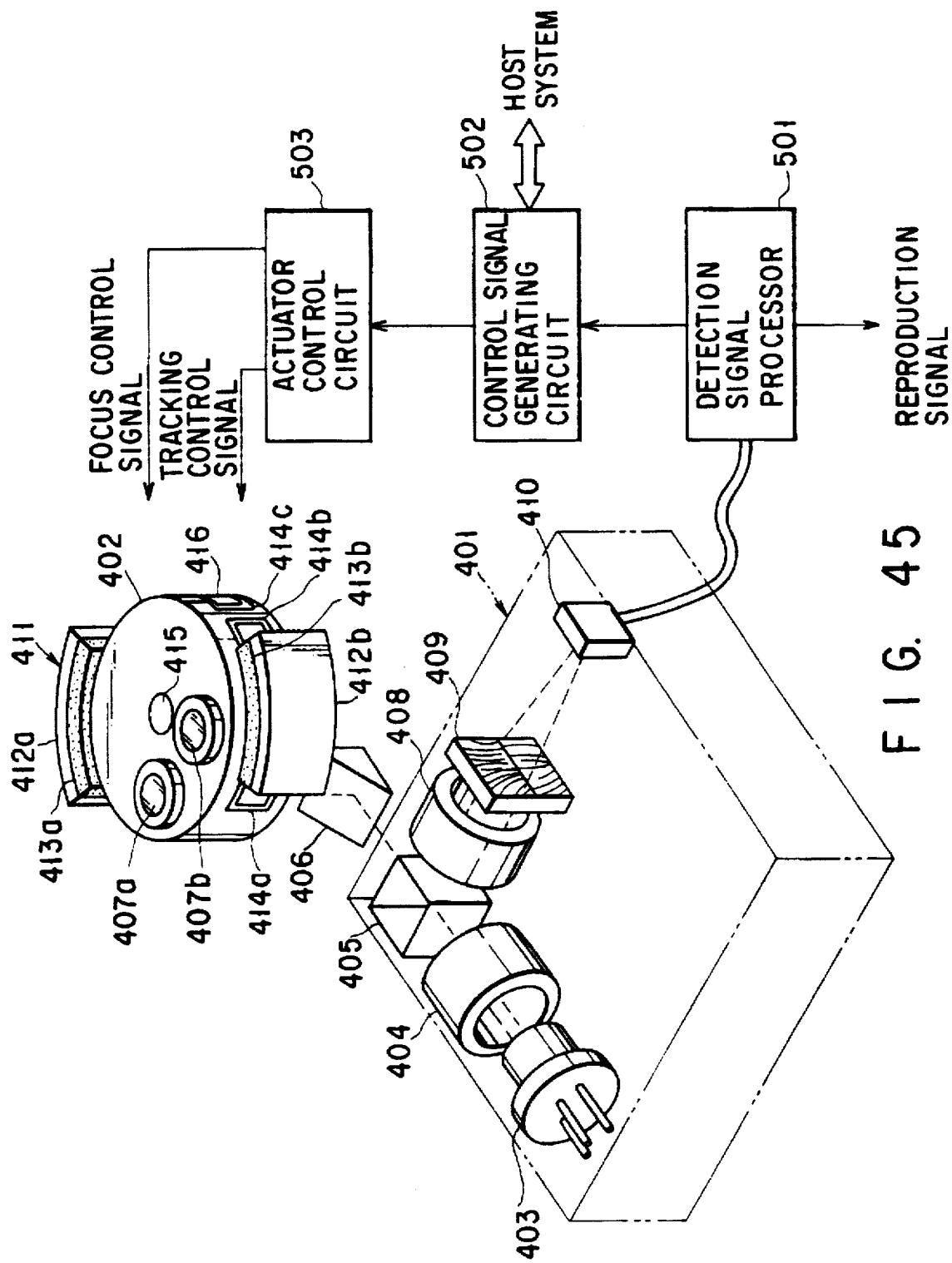
F I G. 45

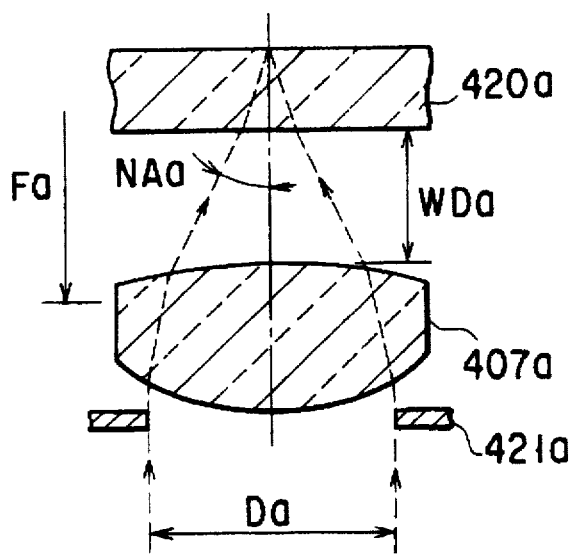
F I G. 46A
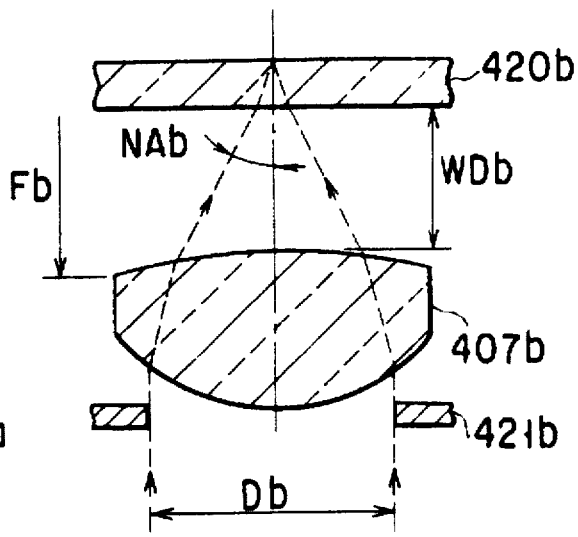
F I G. 46B
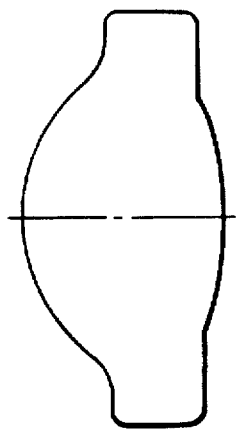
F I G. 47A
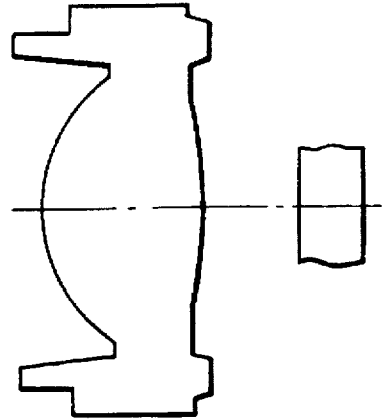
F I G. 47B

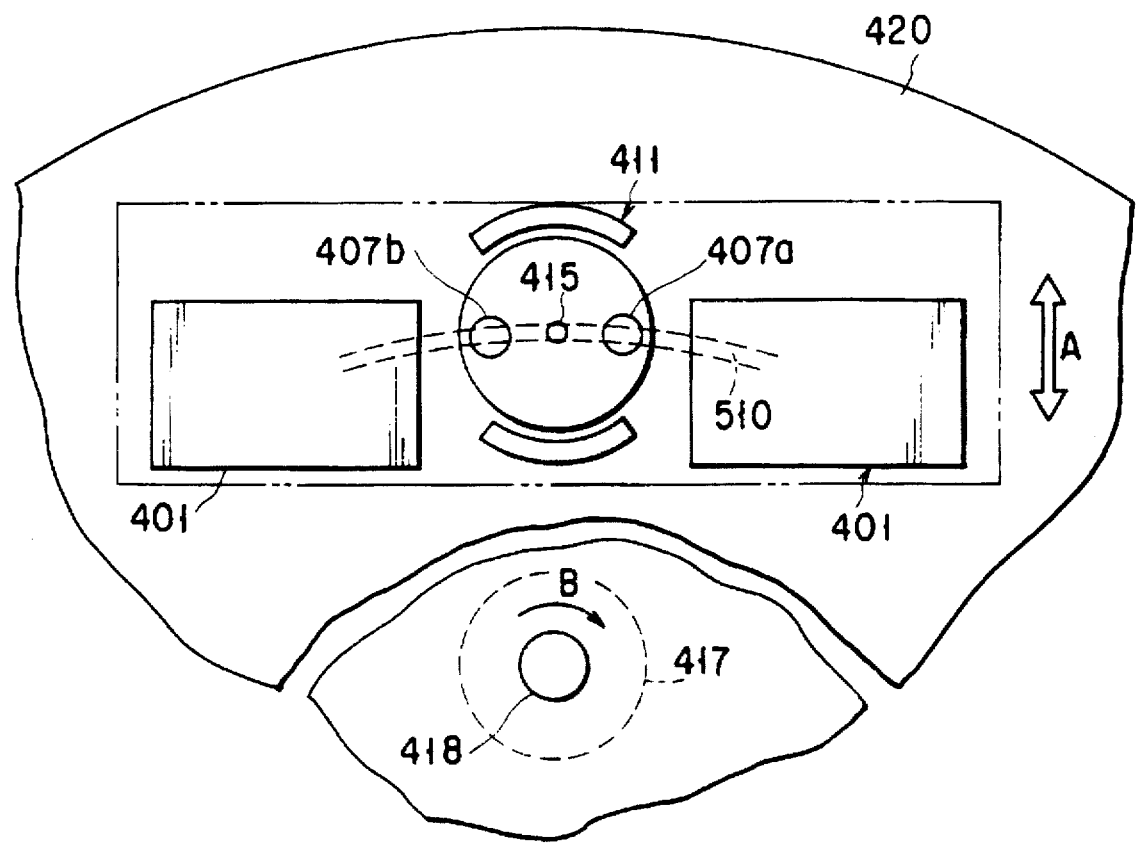
F I G. 52

OPTICAL HEAD USED FOR RECORDING ON OPTICAL RECORDING MEDIUM HAVING VARIOUS THICKNESSES, WARPAGE AND THE LIKE

BACKGROUND OF THE INVENTION

1. Field of the Invention

The present invention relates to an optical data recording/reproducing apparatus for recording/reproducing data in/from an optical data recording medium such as an optical disk and, more particularly, to an optical head used therefor.

2. Description of the Related Art

A technique of reproducing data recorded on an optical disk by irradiating a light beam on the optical disk and detecting light reflected thereby is widely used for a CD (Compact Disk) apparatus, an LD (Laser Disk) apparatus, and the like. In such an optical disk reproducing apparatus, a light beam emitted from a light source such as a semiconductor laser is focused/irradiated on the recording surface of an optical disk via an objective lens, and light reflected by the optical disk is detected by a photodetector, thereby reproducing data recorded on the optical disk.

As attempts have been made to increase the recording density of optical disks, optical disks have been developed on the basis of standards different from those of conventional optical disks. For example, the size of a pit as a unit in recording data is about one micron at present, but it is highly possible that the size of a pit is reduced to a value on the submicron order.

The recording density of an optical disk is determined by the size of a beam spot for a recording/reproducing operation, which is irradiated on the optical disk by a pickup (optical head) to read a very small pit formed in the optical disk to record data.

The size of this spot is determined by the wavelength of a light beam emitted from a laser used and the NA (Numerical Aperture) of an objective lens, and is given by spot size=$k$×laser wavelength/NA where $k$ is a constant.

When, therefore, data is to be read from an optical disk having a higher recording density by using a small spot, a laser having a short wavelength or a lens having a large NA must be used.

A conventional data recording/reproducing apparatus is designed to have only one objective lens. For this reason, data cannot be read from a high-density optical disk by using a pickup having an objective lens corresponding to a conventional optical disk.

More specifically, assume that a pickup for a high recording density uses an objective lens having a large NA. In this case, if an optical disk tilts with respect to the objective lens, the disturbance of a spot is large. For this reason, the pickup cannot be commonly used for conventional and new optical disks in many cases. That is, the allowable values for, e.g., the warp of an optical disk are large according to the conventional standards, but those for a new optical disk are small. Consequently, data cannot be read from an optical disk having large warp.

Note that the disturbance of a spot is influenced by the thickness of an optical disk. With a decrease in the thickness of an optical disk, the disturbance of a spot is reduced when the optical disk tilts. For this reason, a thin optical disk is used as a substrate for a high-density optical disk in some case.

With respect to the same optical disk, different specifications may be set for optimal objective lenses in a recording operation and a reproducing operation, respectively. Since a conventional apparatus has only one objective lens, the apparatus cannot cope with such a case.

In addition, according to new standards, there are disks having substrates which are different in thickness from each other. For this reason, it is possible that a new apparatus cannot record or reproduce data on or from a disk based on the conventional standards.

Consider the thickness of a disk substrate as a standard. An optical disk of this type is generally designed such that a reflecting film is formed on a transparent substrate (to be referred to as a disk substrate hereinafter) on which data is recorded in the form of pits, and a protective layer is formed on the reflecting film. A light beam is irradiated from the disk substrate side onto the reflecting film as a recording surface. In this case, the reproduction characteristics change depending on the thickness of a disk substrate. FIGS. 1A and 1B show changes in transmission wavefront aberration with tilting of optical disks with respect to an objective lens. FIG. 1A shows a case wherein the thickness of a disk substrate is 1.2 mm. FIG. 1B shows a case wherein the thickness of a disk substrate is 0.6 mm. As is apparent from FIGS. 1A and 1B, even with objective lenses having the same NA, the transmission wavefront aberration caused by a disk tilt is smaller in the thinner disk substrate, and a focused spot on the recording surface exhibits good focusing characteristics. Consequently, a reproduction signal having good quality can be obtained with the thinner disk substrate. For this reason, an optical disk apparatus using an optical disk having a thin disk substrate has been developed. As optical disks constituted by disk substrates having different thicknesses are developed, there naturally arise demands for reproducing data from these optical disks by using the same apparatus.

In some apparatuses proposed (e.g., Japanese Patent Disclosure (KOKAI) Nos. 4-372734, 5-266492, and 62-66433), a parallel flat plate is inserted between an optical disk and an objective lens to properly reproduce data recorded on a plurality of types of optical disks constituted by disk substrates having different thicknesses. In such an apparatus, one of parallel flat plates having different thicknesses is inserted in the optical path between an optical disk and the objective lens depending on the thickness of the optical disk subjected to reproduction processing in such a manner that the sum of the optical thickness of the parallel flat plate and that of the optical disk becomes equal to the design lens load of the objective lens. With this operation, data can be stably reproduced from the optical disk while the transmission wavefront aberration is always kept small.

In an apparatus using such a parallel flat plate, it is important that a parallel flat plate is inserted in the optical path without tilting the plate with respect to the optical disk and the objective lens. That is, a high precision is required for a moving mechanism for each parallel flat plate. In addition, if a parallel flat plate tilts with respect to the objective lens, a coma is caused. Even if, therefore, the spherical aberration is reduced by the insertion of the parallel flat plate, the shape of a focused spot is not improved. Furthermore, since the space (working distance) between the objective lens and an optical disk is small, it is very difficult to insert a parallel flat plate in this space.

In another apparatus proposed (Japanese Patent Disclosure (KOKAI) No. 5-241095), a parallel flat plate is inserted between the objective lens and the light source for the same purpose as described above. In some other apparatuses proposed (e.g., Japanese Patent Disclosure (KOKAI) Nos.

5-54406, 5-205282, and 5-266511), a compensating lens is inserted between the objective lens and the light source to properly reproduce data from various types of optical disks constituted by disk substrates having different thicknesses. According to these proposals, when the thickness of an optical disk contradicts the design lens load of the objective lens, a spherical aberration is caused, and a beam spot focused on the recording surface of the optical disk increases in size. As a result, data cannot be accurately reproduced. For this reason, the wavefronts of a light beam incident on the objective lens are adjusted to prevent a spherical aberration so as to form a small beam spot, thereby realizing stable reproduction of data from the optical disk.

As a means for preventing a spherical aberration, a wavefront correcting lens like a concave lens is used in Japanese Patent Disclosure (KOKAI) No. 5-54406; a compensating lens made of, e.g., a liquid crystal material, in Japanese Patent Disclosure (KOKAI) No. 5-205282; and a correcting lens constituted by a plurality of lens elements having variable gaps, in Japanese Patent Disclosure (KOKAI) No. 5-266511.

In an optical disk apparatus, however, the objective lens moves in the direction of the optical axis while following the warp of an optical disk. Therefore, in the method of adjusting the wavefronts of a light beam incident on the objective lens to cancel out the spherical aberration, if the warp of the optical disk is large, a change in the curvature of a light beam incident on the objective lens cannot be neglected. As a result, the spherical aberration cannot be satisfactorily canceled out.

In still another apparatus proposed (Japanese Patent Disclosure (KOKAI) No. 4-95224 corresponding to U.S. Pat. No. 5,235,581), a plurality of optical heads respectively corresponding to optical disks constituted by disk substrates having different thicknesses are selectively used to properly reproduce data recorded on each of these optical disks. More specifically, each optical head includes a semiconductor laser as a light source, an objective lens, and a photodetector. In addition, in order to selectively use these optical heads, head moving mechanisms are arranged in correspondence with the respective optical heads to move a selected optical head along the radial direction of an optical disk.

However, with these optical heads and head moving mechanisms arranged in correspondence with the thicknesses of disk substrates, the overall arrangement of the optical disk apparatus is very complicated and large in size, thus impairing the essential merit that data can be read from optical disks constituted by substrates having different thicknesses, i.e., based on different specifications, by using one optical disk apparatus.

On the other hand, as a means for stably reproducing data from a plurality of types of optical disks having different recording densities, an apparatus designed to variably change the focal length of the objective lens has been proposed (Japanese Patent Disclosure (KOKAI) No. 5-54414). This apparatus uses a liquid crystal lens designed to variably change the focal length by electrically controlling the curvature of the lens in which a liquid crystal is sealed. When the density of the data recorded on an optical disk is high, the focal length of the lens is shortened. With this operation, stable reproduction of data from optical disks having different recording densities is always performed. Since the aperture of the lens does not change, the NA increases with a decrease in focal length, and a small beam spot can be formed on the recording surface of an optical disk.

This method may be practical under the condition that the NA of an objective lens is relatively small. However, since an objective lens having a large NA (e.g., NA=0.45 for a CD; NA=0.55 for an LD) is used to focus a small beam spot on an optical disk, it is very difficult to change the surface shape of the liquid crystal lens into a shape having a small transmission wavefront aberration.

As described above, since the conventional optical head has only one objective lens, the optical recording/reproducing apparatus cannot properly cope with a case wherein a plurality of data recording media based on different specifications associated with, e.g., recording density, allowable warp amount, and substrate thickness, are to be used, or a case wherein different specifications are set for optimal lenses in a recording operation and a reproducing operation, respectively, with respect to the same data recording medium.

Note that a plurality of special pickups (optical heads) using special objective lenses complying with the respective standards and specifications may be prepared to be selectively used. In this case, however, the apparatus undergoes an increase in cost as well as an increase in size. Therefore, this arrangement cannot be practical.

All the conventional methods known as techniques of properly reproducing data recorded on a plurality of type of optical disks constituted by disk substrates having different thicknesses by using one optical disk apparatus pose practical problems.

More specifically, in the method of inserting a parallel flat plate between an optical disk and an objective lens, since the parallel flat plate is inserted in an optical path so as not to tilt with respect to the optical disk and the objective lens, a high precision is required for a moving mechanism for the parallel flat plate. If the parallel flat plate tilts with respect to the optical disk and the objective lens, a coma is caused to degrade the shape of a focused spot. In addition, it is very difficult to insert the parallel flat plate in the space between the objective lens and the optical disk.

In the method of inserting a parallel flat plate or a compensating lens between an objective lens and a light source to adjust the wavefronts of a light beam incident on the objective lens so as to prevent a spherical aberration, since the objective lens moves in the direction of the optical axis while following the warp of an optical disk, a change in the curvature of a light beam incident on the objective lens cannot be neglected if the warp of the optical disk is large. For this reason, the spherical aberration cannot be satisfactorily canceled out.

Consider the apparatus in which a plurality of optical heads, each having a semiconductor laser, an objective lens, and a photodetector, are arranged in correspondence with optical disks constituted by substrates having different thicknesses, and each optical head is moved along the radial direction of an optical disk by a corresponding special head moving mechanism to be selectively used. Since this apparatus requires a plurality of optical heads and head moving mechanisms equal in number thereto, the overall arrangement of the apparatus is complicated and large.

In the apparatus using a variable focus lens, e.g., a liquid crystal lens designed to variably change the focal length by electrical control, to stably reproduce data from a plurality of types of optical disks having different recording densities, when an objective lens having a large NA is used to form a small beam spot, it is very difficult to change the surface shape of the liquid crystal lens into a shape having a small spherical wavefront aberration.

SUMMARY OF THE INVENTION

Accordingly, it is an object of the present invention to provide an optical head for an optical data recording/ reproducing apparatus, which has a small size and an inexpensive arrangement but performs a proper recording/reproducing operation with respect to a plurality of data recording media demanding different specifications for objective lenses.

A related object of the present invention is to provide an optical head for an optical data recording/reproducing apparatus, which has a small size and an inexpensive arrangement but performs proper recording and reproducing operations even if different specifications are set for objective lenses in a recording operation and a reproducing operation, respectively.

According to the present invention, there is provided an optical head apparatus used for an optical data recording/reproducing device, comprising objective lenses for irradiating light onto a recording medium; and means for selecting a desired objective lens from the objective lenses.

According to the present invention, there is provided another optical head apparatus comprising a movable member driven in a direction of thickness of a recording medium and a direction perpendicular to the direction of thickness, the movable member having a light source; objective lenses, mounted on the movable member, for irradiating light from the light source onto the recording medium; and means for selecting a desired objective lens in accordance with a type of the recording medium, and locating the desired objective lens in an optical path of the light.

According to the present invention, there is provided a further optical head apparatus comprising a movable member driven in a direction of thickness of a recording medium and a direction perpendicular to the direction of thickness, the movable member having a magnet; objective lenses, mounted on the movable member, for irradiating light from the light source onto the recording medium; coil means, arranged around the movable member, for driving the movable member at least in the direction perpendicular the direction of thickness; and means for selecting a desired objective lens in accordance with a type of the recording medium, and locating the desired objective lens in an optical path of the light.

According to the present invention, there is provided a still another optical head apparatus comprising a stationary optical system including a light source for emitting light and a detection system for detecting light reflected by a recording medium, and arranged at a position fixed to the recording medium; objective lenses for focusing/irradiating light emitted from the light source onto the recording medium; a movable support member supporting the objective lenses and arranged to be movable in a direction parallel to the recording medium; and control means for controlling the movable support member to selectively locate a desired one of the objective lenses on an optical axis of the light irradiated onto the recording medium.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 8 is a schematic view showing the overall basic arrangement of an optical disk recording/reproducing apparatus including an optical head according to the second embodiment of the present invention;

FIG. 18 is a block diagram showing an optical system and a signal processing system according to the fourth embodiment of the present invention;

FIG. 22 is a plan view showing a movable portion of an optical head according to the eighth embodiment of the present invention;

FIG. 23 is a plan view showing a movable portion of an optical head according to the ninth embodiment of the present invention;

FIG. 27 is a plan view showing a movable portion of an optical head according to the twelfth embodiment of the present invention;

FIGS. 29A to 29C are plan views, each showing an example of using two counterweights instead of an objective lens in the fourth to twelfth embodiments;

FIG. 32 is a plan view of a movable portion of an optical head according to the thirteenth embodiment of the present invention;

FIG. 33 is a sectional view taken along a line A–A' in FIG. 32;

FIG. 45 is a view showing the arrangement of the main part of an optical head according to the seventeenth embodiment of the present invention;

FIGS. 46A and 46B are views showing objective lenses and optical disks based on different specifications for comparison;

FIGS. 47A and 47B are sectional views showing the typical sectional shapes of objective lenses made of different nitrate materials;

FIG. 52 is a view showing the arrangement of the main part of an optical head according to the eighteenth embodiment of the present invention;

DETAILED DESCRIPTION OF THE PREFERRED EMBODIMENTS

Figure 1A:
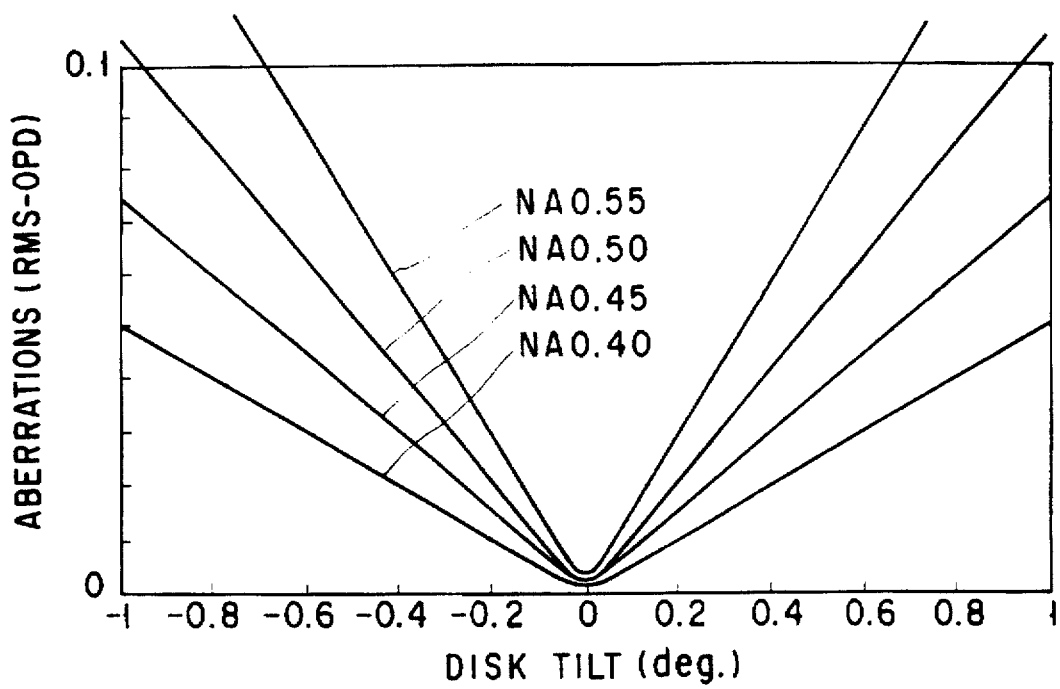
FIGS. 1A and 1B are graphs showing the relationship between the wavefront aberration and the degree of tilting of disk for the substrates with a different thickness.

A preferred embodiment of an optical head according to the present invention will now be described with reference to the accompanying drawings.

[First Embodiment]

The first embodiment will be described below with reference to FIGS. 2 to 7.

The arrangement of the main part of an optical disk apparatus 1 as a data recording/reproducing apparatus according to the present invention will be described first with reference to FIGS. 2 to 4.

The optical disk apparatus 1 has a spindle motor 12 (see FIG. 3) as a disk driving means for holding and rotating/driving an optical disk 10 (only a portion of which is indicated by the chain double-dashed line) as a data recording medium.

A pickup 20 as an optical head capable of linearly moving in the radial direction (indicated by an arrow A) of the optical disk 10 is arranged on the lower surface side of the optical disk 10 rotated by the spindle motor 12. A movable optical system 18 constituted by a plurality of different types of (two, i.e., the first and second objective lenses in this case) objective lenses 14a and 14b (to be described later), a reflecting mirror 16 (see FIG. 4) as a laser beam guide means, and the like is mounted on the pickup 20.

Figure 2:
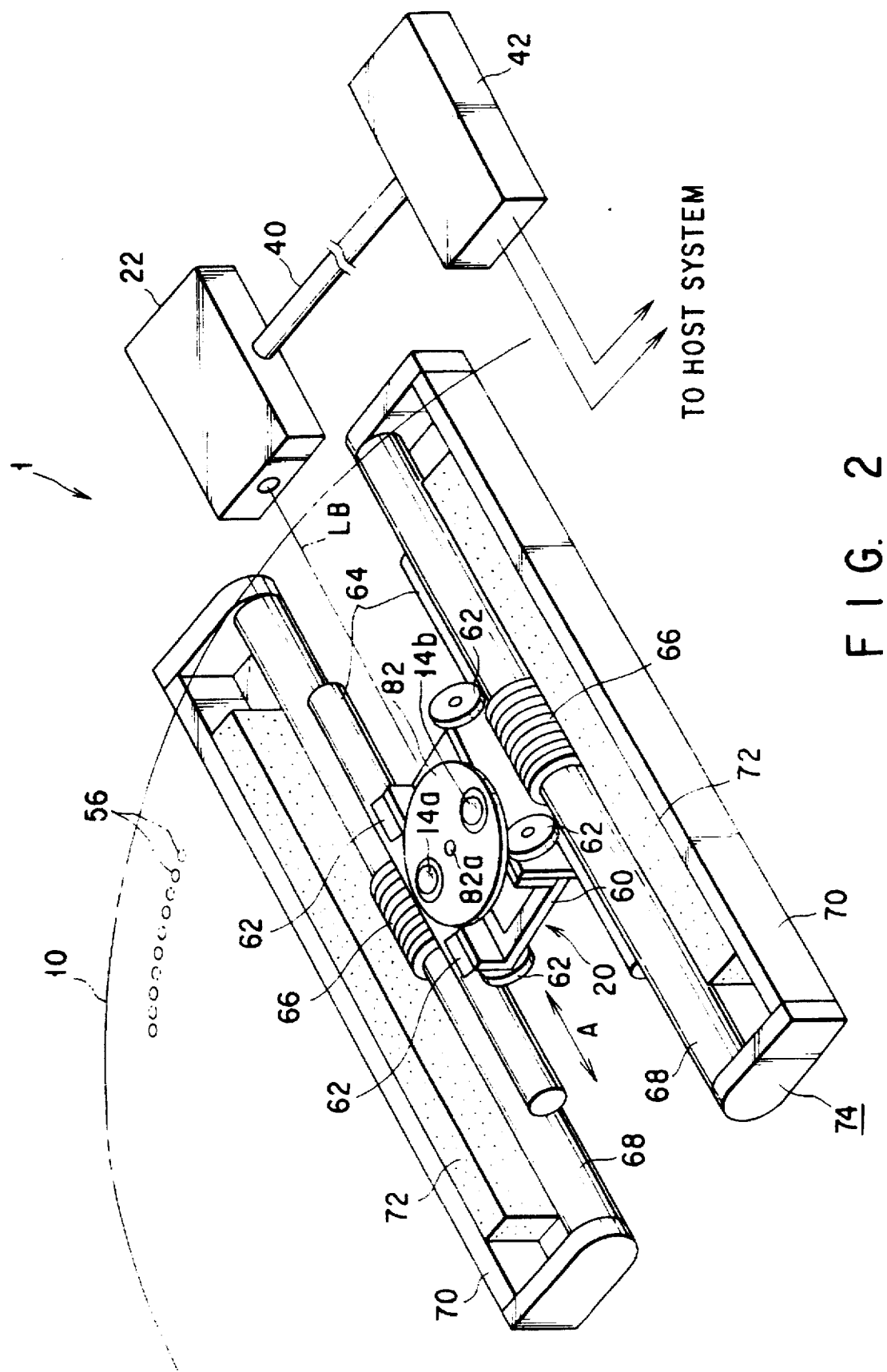
FIG. 2 is a perspective view schematically showing the overall arrangement of an optical disk recording/reproducing apparatus including an optical head according to the first embodiment of the present invention.

As shown in FIG. 2, a stationary optical unit 22 is arranged on the extended line of the path of the pickup 20 in the radial direction of the optical disk 10. The stationary optical unit 22 serves to irradiate/receive a laser beam LB onto/from the movable optical system 18 mounted on the pickup 20.

The laser beam LB irradiated from the stationary optical unit 22 toward the pickup 20 along the moving direction of the pickup 20 is reflected at a right angle by the reflecting mirror 16 constituting the movable optical system 18 and focused on a data recording surface 10a of the optical disk 10 via the objective lens 14a (or 14b). The laser beam LB reflected by the data recording surface 10a passes through the objective lens 14a (or 14b) and is deflected horizontally by the reflecting mirror 16 to be guided to the stationary optical unit 22, thereby performing data read processing.

Figure 3:
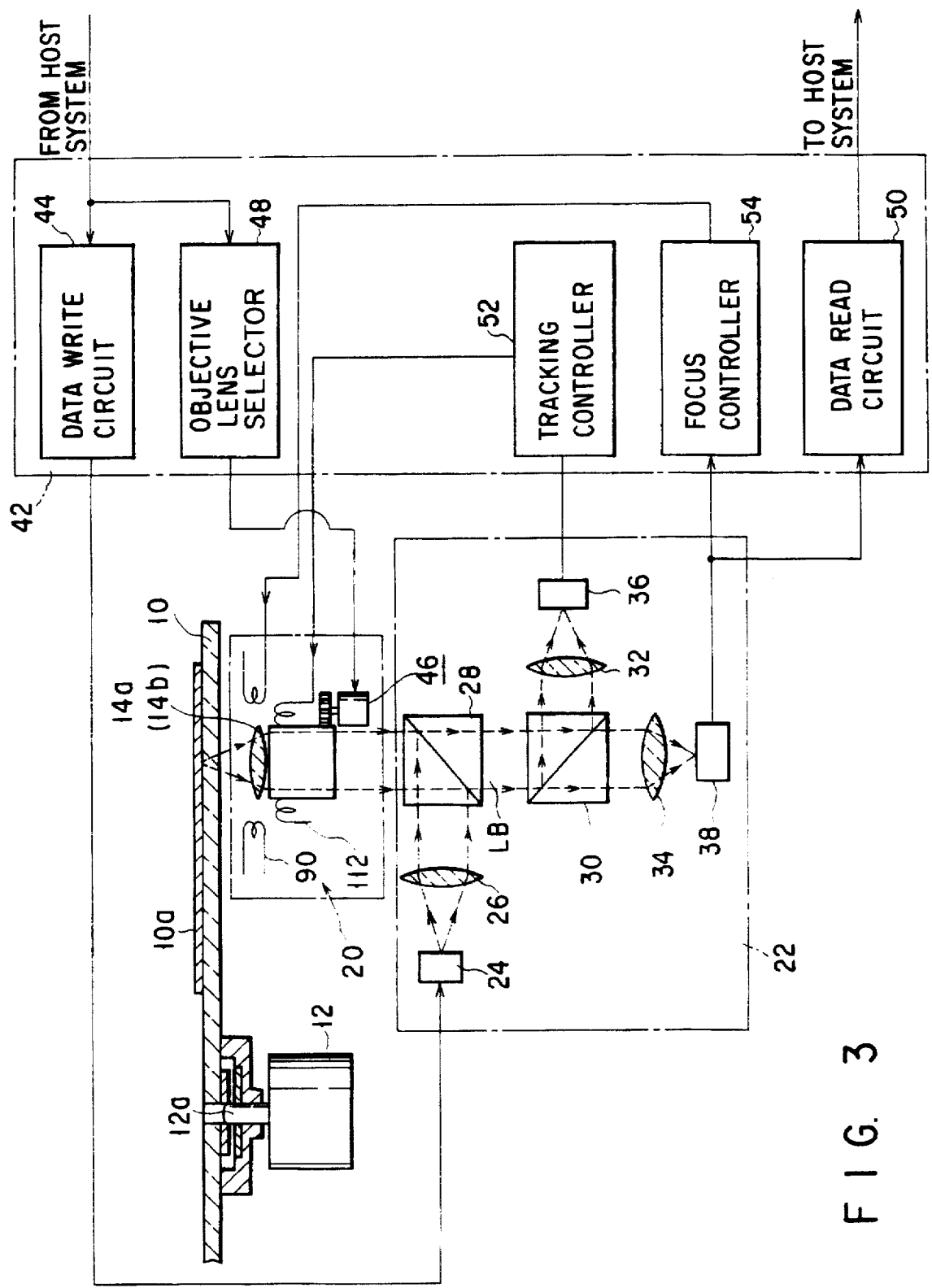
FIG. 3 is a block diagram showing a control system and an optical system for the recording/reproducing apparatus in FIG. 2.

As shown in FIG. 3, the stationary optical unit 22 includes a semiconductor laser 24 as a laser beam generating means for generating the laser beam LB, a collimator lens 26 for collimating the laser beam LB generated by the semiconductor laser 24, a first beam splitter 28 for splitting the laser beam LB into a laser beam LB propagating to the optical disk 10 and a reflected laser beam reflected by the optical disk 10, a second beam splitter 30 for splitting the reflected laser beam LB reflected by the optical disk 10 into a first beam used for focus control and data reproduction and a second beam used for tracking control, first and second focusing lenses 32 and 34 for respectively focusing the first and second beams, first and second photodetectors 36 and 38 for respectively converting the first and second beams into electrical signals, and the like.

The stationary optical unit 22 having the above arrangement is connected to a control section 42 as a control means via a signal cable 40 (see FIG. 2). The control section 42 includes a data write circuit 44 for generating a recording signal in accordance with data input from an external host system (not shown), e.g., a host computer system, an objective lens selector 48 for generating a switching signal to an objective lens selecting means 46 (to be described later) in accordance with the data input from the host computer system, a data read circuit 50 for reproducing data recorded on the optical disk 10 from a detection signal detected via the stationary optical unit 22, a tracking controller 52 for generating a tracking control signal for controlling tracking of the objective lens 14a (or 14b), a focus controller 54 for generating a focus control signal for performing focus control of the objective lens 14a (or 14b), and the like.

The laser beam LB irradiated from the semiconductor laser 24 is converted into a parallel beam via the collimator lens 26, deflected at 90° by the first beam splitter 28, and incident on the movable optical system 18 of the pickup 20. That is, the laser beam LB is incident on the objective lens 14a (or 14b), selected in the manner described later, via the reflecting mirror 16. The laser beam LB incident on the objective lens 14a (or 14b) undergoes a converging effect via the objective lens 14a (or 14b) and is focused on the data recording surface 10a of the optical disk 10 to form a beam spot.

When the optical disk apparatus 1 is in the reproduction mode, the laser beam LB guided onto the optical disk 10 is intensity-modulated in accordance with data recorded on the data recording surface 10a, i.e., the presence/absence of very small pits 56. The resultant beam is returned to the objective lens 14a (or 14b) again.

The laser beam LB returned to the objective lens 14a (or 14b) is guided to the stationary optical unit 22 via the reflecting mirror 16, transmitted through the first beam splitter 28, and split into two beams by the second beam splitter 30. The beams are respectively focused on the first and second photodetectors 36 and 38 via the first focusing lenses 32 and 34.

The laser beams LB guided to the first photodetectors 36 and 38 are respectively converted into electrical signals. The electrical signals are respectively supplied to the tracking controller 52 and the focus controller 54 to be used for focus control and tracking control of the objective lens 14a (or 14b). Note that the laser beam LB guided to the second photodetector 38 is also supplied to the data read circuit 50 to reproduce data recorded on the optical disk 10. The reproduction result is output to a host computer (not shown).

In this case, the pickup 20 is controlled/moved (tracking control) in the radial direction of the optical disk 10 in accordance with a track position on the data recording surface 10a of the optical disk 10 at which a beam spot is to be irradiated.

The arrangement of the pickup 20 as an optical head will be described next with reference to FIGS. 3 and 4.

The pickup 20 has a carriage 60 as a moving means capable of moving in the radial direction (indicated by the arrow A) of the optical disk 10, i.e., the tracking control direction, by using a linear motor 74 (to be described later) as a drive source.

A plurality of (two in this case) pairs of support rollers 62 are arranged, as roller pairs each supported through a leaf spring, on the two side portions of the carriage 60. As shown in FIG. 2, these support rollers 62 are brought into rolling contact with two guide shafts 64 arranged horizontally and parallelly along the radial direction of the optical disk 10 so as to be movably supported in the radial direction (indicated by the arrow A).

In addition, radial coils 66 are mounted on the two side portions of the carriage 60. These radial coils 66 are fitted on inner yokes 68 as members constituting a magnetic circuit. The inner yokes 68 are connected to outer yokes 70. Magnets 72 are mounted on the inner sides of the outer yokes 70, thereby constituting the linear motor 74.

When power is supplied to the radial coils 66, a thrust (Lorentz force) is generated to reciprocate the carriage 60 in the tracking control direction.

Figure 4:
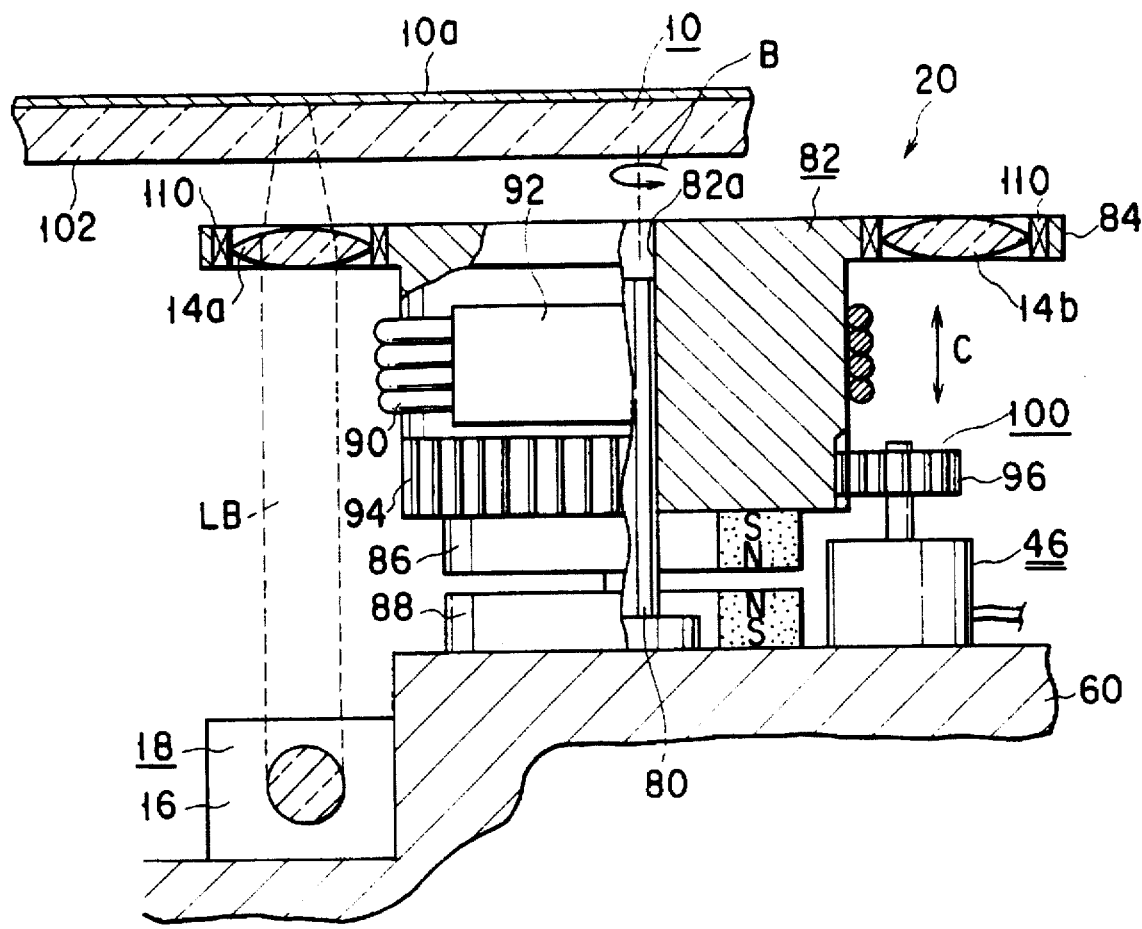
FIG. 4 is a partially sectional side view schematically showing the arrangement of the optical head according to the first embodiment of the present invention.

FIG. 4 is a sectional view of the main part of the carriage 60. As shown in FIG. 4, a support shaft 80 as a rotational center axis extends vertically from the upper surface of the carriage 60. The support shaft 80 is parallel to the rotational center axis of the optical disk 10, i.e., the driving shaft 12a (see FIG. 3) of the spindle motor 12.

A lens actuator 82 as a lens holding member is mounted on the support shaft 80, with a rotational center hole 82a being fitted on the support shaft 80, so as to be rotatable in the direction indicated by an arrow B and movable in the vertical direction (indicated by an arrow C).

The lens actuator 82 has a columnar shape, with a lens mount flange portion 84 being formed on the upper end side. The rotational center hole 82a vertically extends through the central portion of the lens actuator 82.

The first and second objective lenses 14a and 14b suitable for different types of optical disks 10 are arranged on the lens mount flange portion 84 to be symmetrical about the support shaft 80 as the rotational center axis of the lens actuator 82. By selectively rotating the lens actuator 82 in the direction indicated by the arrow B, the first and second objective lenses 14a and 14b can be selectively inserted in the optical path of the laser beam LB.

Ring-like magnets 86 and 88 are respectively mounted on the lower surface of the lens actuator 82 and the upper surface of the carriage 60 so as to magnetically repel each other. In this embodiment, the opposing surfaces of the two magnets have the N poles. With this arrangement, the weight of the lens actuator 82 is canceled out to be rotated and vertically moved with a small force.

A focusing coil 90 is wound on a vertically intermediate portion of the lens actuator 82. A focusing magnet 92 corresponding to the focusing coil 90 is fixed to the carriage 60 via a holding member (not shown). By supplying a current to the focusing coil 90, the lens actuator 82 can be moved in the focus control direction (indicated by the arrow C) to follow vertical vibrations caused by, e.g., the warp of the optical disk 10.

A rack 94 is formed on the lower end portion of the lens actuator 82. A pinion 96 is meshed with the rack 94. The pinion 96 is mounted on the driving shaft of a motor 98 mounted on the carriage 60 and capable of rotating clockwise and counterclockwise. By driving the motor 98, the lens actuator 82 can be selectively rotated in the direction indicated by the arrow B or in the direction reverse thereto. These components constitute a lens actuator moving means 100 as a lens holding member moving means.

With the lens actuator moving means 100, the first or second objective lens 14a or 14b can be selectively inserted in the optical path of the laser beam LB, and the objective lens 14a or 14b can also be moved in the direction indicated by an arrow D (see FIG. 5), which is perpendicular to a recording pit 56 array on the optical disk 10 to follow the pit 56 array on the optical disk 10, thereby moving the objective lens 14a or 14b in the radial direction to follow a large tracking error.

The objective lenses 14a and 14b are mounted on the lens mount flange portion 84 via tracking control mechanisms 110 respectively having tracking coils 112 (see FIG. 3) so as to follow a small tracking error.

The lens actuator 82 serving as a lens holding member and the lens actuator moving means 100 having the above arrangement constitute the objective lens selecting means 46 for selectively inserting the first or second objective lens 14a or 14b in the optical path of the laser beam LB. Cables (not shown) for supplying power are respectively connected to the focusing coil 90, a tracking coil (not shown), and the motor 98 of the lens actuator moving means 100.

Figure 5:
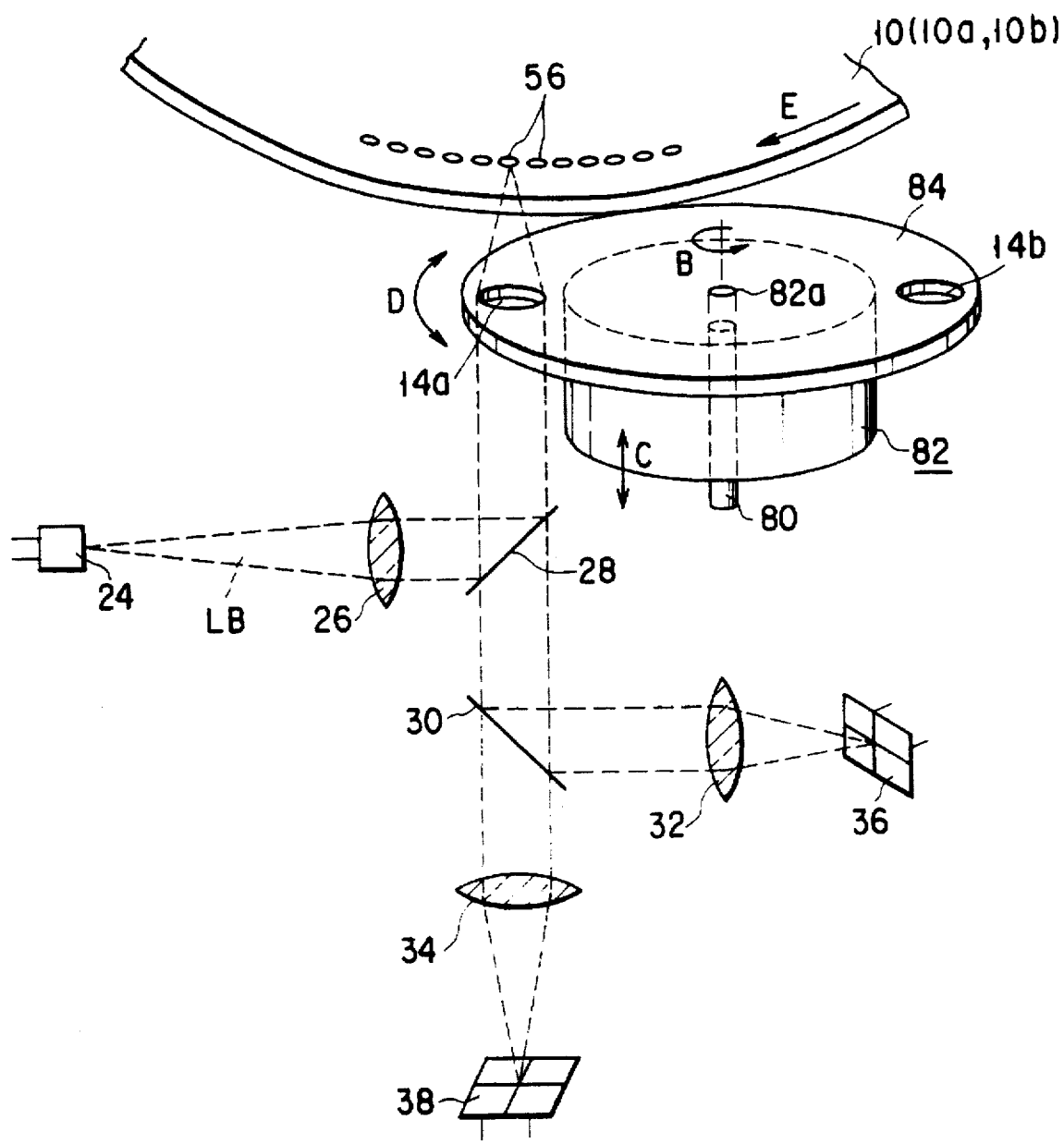
FIG. 5 is a schematic view showing the basic arrangement of the optical disk recording/reproducing apparatus in FIG. 2.

FIG. 5 schematically shows the basic arrangement of the optical disk apparatus 1 as the data recording/reproducing apparatus according to the present invention described above. Note that an arrow E indicates the rotating direction of the optical disk 10.

The first and second objective lenses 14a and 14b are suitable for recording/reproducing operations with respect to a plurality of (two in this embodiment) optical disks 10a and 10b based on different standards associated with, e.g., recording density, allowable warp amount, and substrate thickness.

Figure 6:
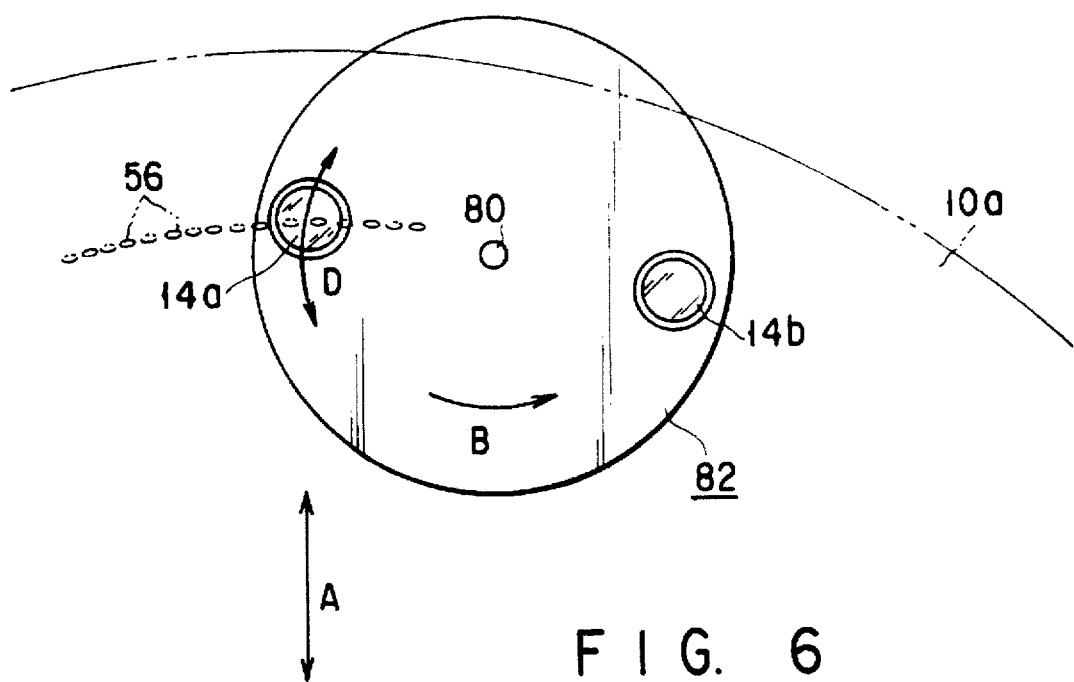
FIG. 6 is a view showing a state wherein the first objective lens is selected in the first embodiment.
Figure 7:
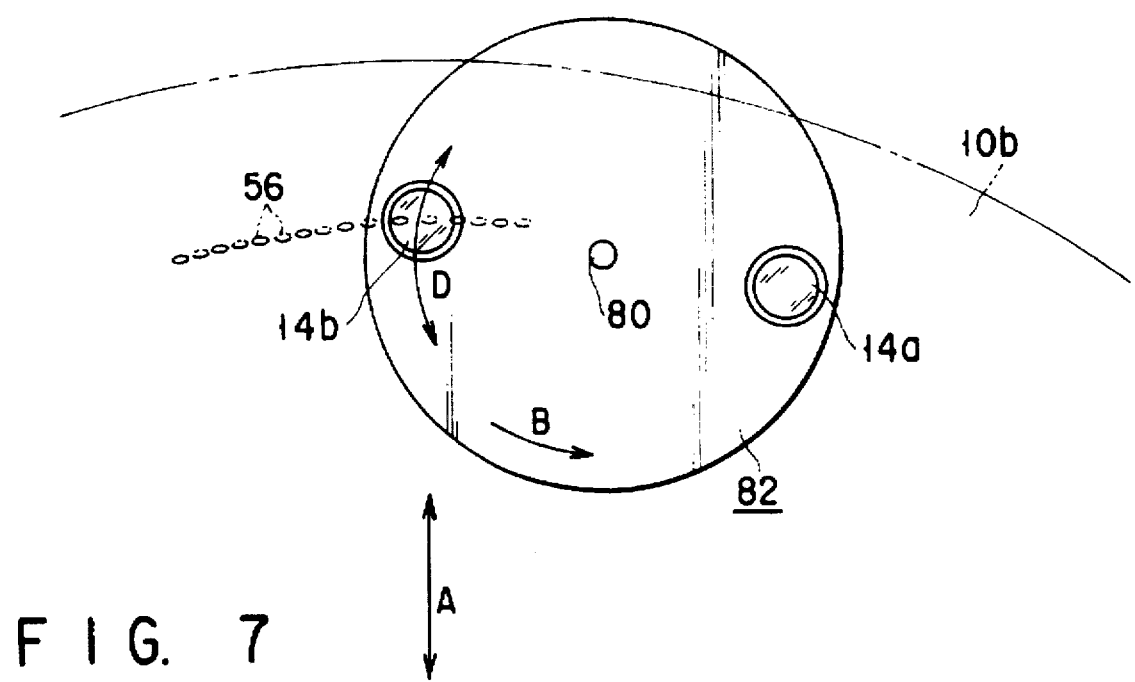
FIG. 7 is a view showing a state wherein the second objective lens is selected in the first embodiment.

Assume that the optical disk 10 is the optical disk 10a having a thick substrate 102. In this case, the first objective lens 14a suitable for the optical disk 10a is selected by a signal from the control section 42 to be inserted in the optical path of the laser beam LB, as shown in FIG. 6. Assume that optical disk 10 is the disk 10b having a thin substrate 102. In this case, the second objective lens 14b suitable for this disk is selected and inserted in the optical path of the laser beam LB, as shown in FIG. 7.

In the above description, the first and second objective lenses 14a and 14b are suitable for processing a plurality of (two in this embodiment) optical disks 10a and 10b based on different standards associated with, e.g., recording density, allowable warp value, and substrate thickness. However, the present invention is not limited to this. If different specifications are set for objective lenses in a recording operation and a reproducing operation, respectively, with respect to the same optical disk 10, the first and second objective lenses 14a and 14b may be selectively used for a recording operation and a reproducing operation, respectively.

In the above description, the optical head has two objective lenses. However, the present invention is not limited to this and may be applied to an arrangement having three or more objective lenses which are to be switched. That is, the present invention is effective for an arrangement having a plurality of objective lenses which are to be switched.

According to the first embodiment, since a predetermined objective lens can be selected (and used) from a plurality of objective lenses suitable for the respective types of data recording media, in which signals to be read out are stored, in accordance with the type of a data recording medium, proper data processing can be performed with respect to a plurality of data recording media requiring different specifications for objective lenses with a small, inexpensive arrangement.

More specifically, one of the plurality of objective lenses 14a and 14b which is suitable for a recording/reproduction operation with respect to an optical disk is selected by changing the pivot angle of the lens actuator 82, instead of preparing a plurality of special pickups using special objective lenses suitable for the respective standards and specifications, and selectively using the pickups in accordance with the characteristics of an optical disk. Therefore, with a small, inexpensive arrangement, proper recording/reproducing operations can be performed with respect to the plurality of optical disks 10a and 10b requiring different specifications for the objective lenses 14a and 14b.

Since the objective lenses 14a and 14b are arranged to be symmetrical about the support shaft 80 as the rotational center axis of the lens actuator 82, the masses of the two objective lenses 14a and 14b balance each other to allow easy balancing of the lens actuator 82. In addition, since the objective lenses 14a and 14b are switched by using the lens actuator 82, this switching operation is easy to perform.

Other embodiments of the present invention will be described next. The same reference numerals in the first embodiment denote the same parts as in the following embodiments, and a detailed description thereof will be omitted.

[Second Embodiment]

Figure 9:
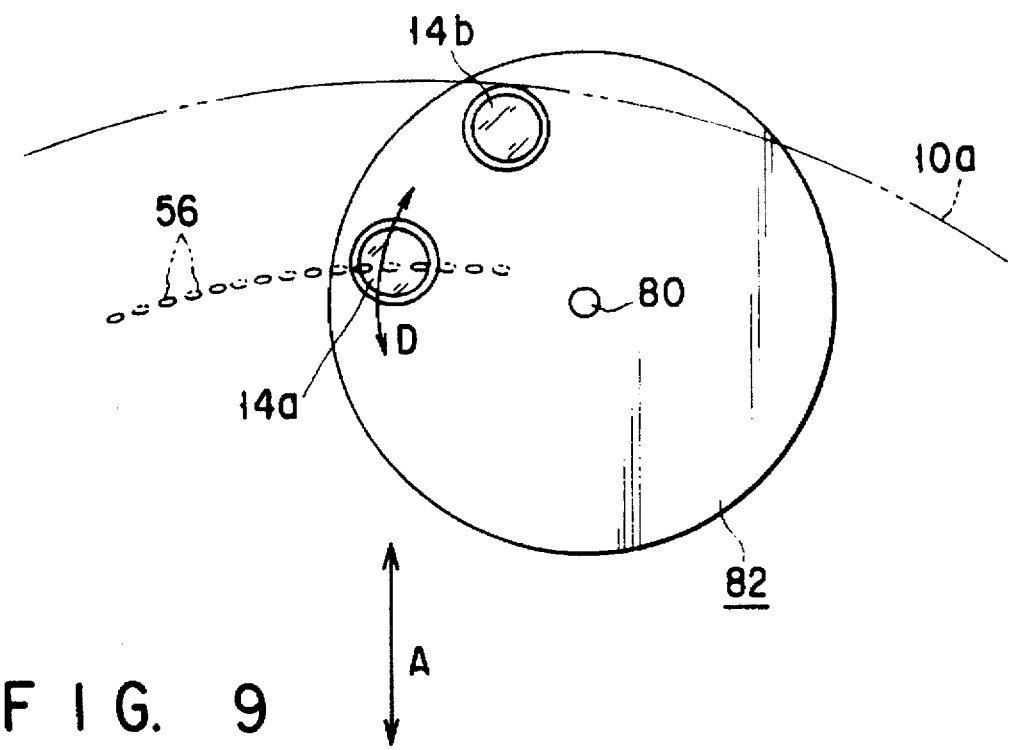
FIG. 9 is a view showing a state wherein the first objective lens is selected in the second embodiment.
Figure 10:
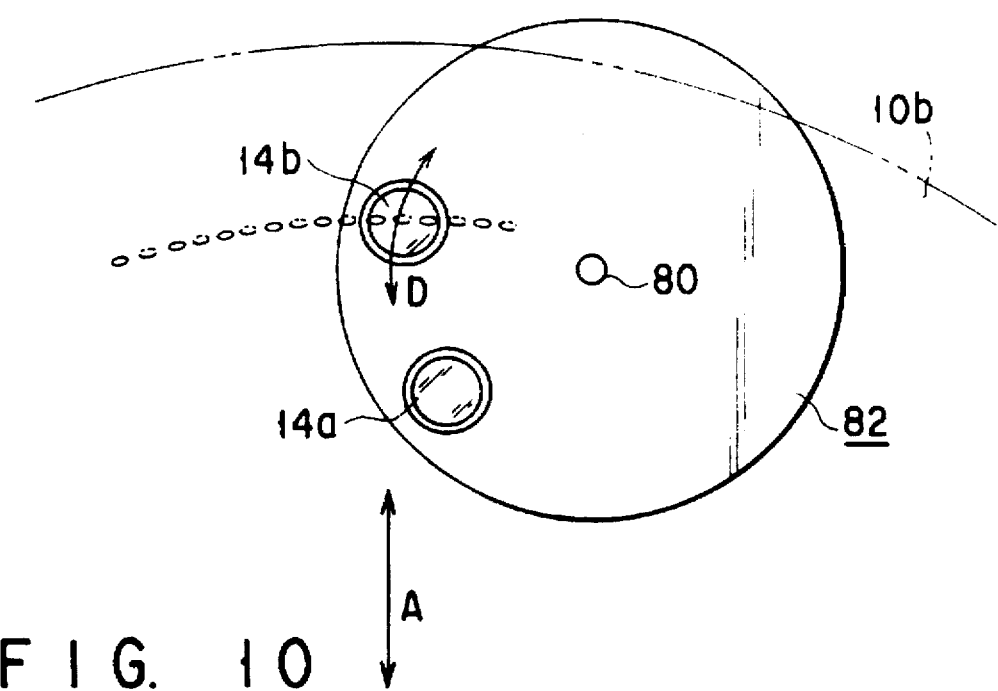
FIG. 10 is a view showing a state wherein the second objective lens is selected in the second embodiment.

The second embodiment of the present invention will be described below with reference to FIGS. 8 to 10. Note that the same reference numerals in the first embodiment denote the same parts as in the second embodiment, and a repetitive description will be avoided.

FIG. 8 schematically shows the basic arrangement of the second embodiment. Each of FIGS. 9 and 10 shows a state where objective lenses 14a and 14b are switched in accordance with the type of an optical disk (optical disk 10a or 10b).

As is apparent from these drawings, unlike in the first embodiment, in the second embodiment, the objective lenses 14a and 14b are arranged at adjacent positions instead of being arranged to be symmetrical about the rotating shaft. In addition, the second embodiment includes an objective lens selecting means 460 for switching the objective lenses 14a and 14b by using a tracking mechanism 115 constituted by a tracking coil 45 and a magnet 47, which are mounted on a lens actuator 82 without using any rack and pinion, and designed to move each objective lens in the direction indicated by an arrow D, which is perpendicular to a recording pit 56 array on an optical disk 10, so as to cause the objective lens to follow a tracking error.

As described above, similar to the first embodiment, in the second embodiment, proper recording/reproducing operations can be performed with respect to the plurality of optical disks 10a and 10b requiring different specifications for the objective lenses 14a and 14b. Furthermore, since the plurality of objective lenses 14a and 14b are located at adjacent positions, the objective lenses can be easily switched within a short period of time.

In addition, the objective lenses 14a and 14b are switched by using the lens actuator 82, and the tracking mechanism 115 can be used as a selecting means for the objective lenses 14a and 14b. Therefore, the mechanism can be simplified.

Note that in the second embodiment, the first and second objective lenses 14a and 14b are applied to processing of the plurality of optical disks 10a and 10b based on different standards associated with, e.g., recording density, allowable warp amount, and substrate thickness, similar to the first embodiment. However, the present invention is not limited this. For example, it is apparent that when different specifications are set for objective lenses in a recording operation and a reproducing operation with respect to one optical disk 10, the first and second objective lenses 14a and 14b may be selectively used for a recording operation and a reproducing operation, respectively.

Further, the present invention is not limited to the optical head having two objective lenses, but may be applied to the optical head having three or more objective lenses.

[Third Embodiment]

Figure 11:
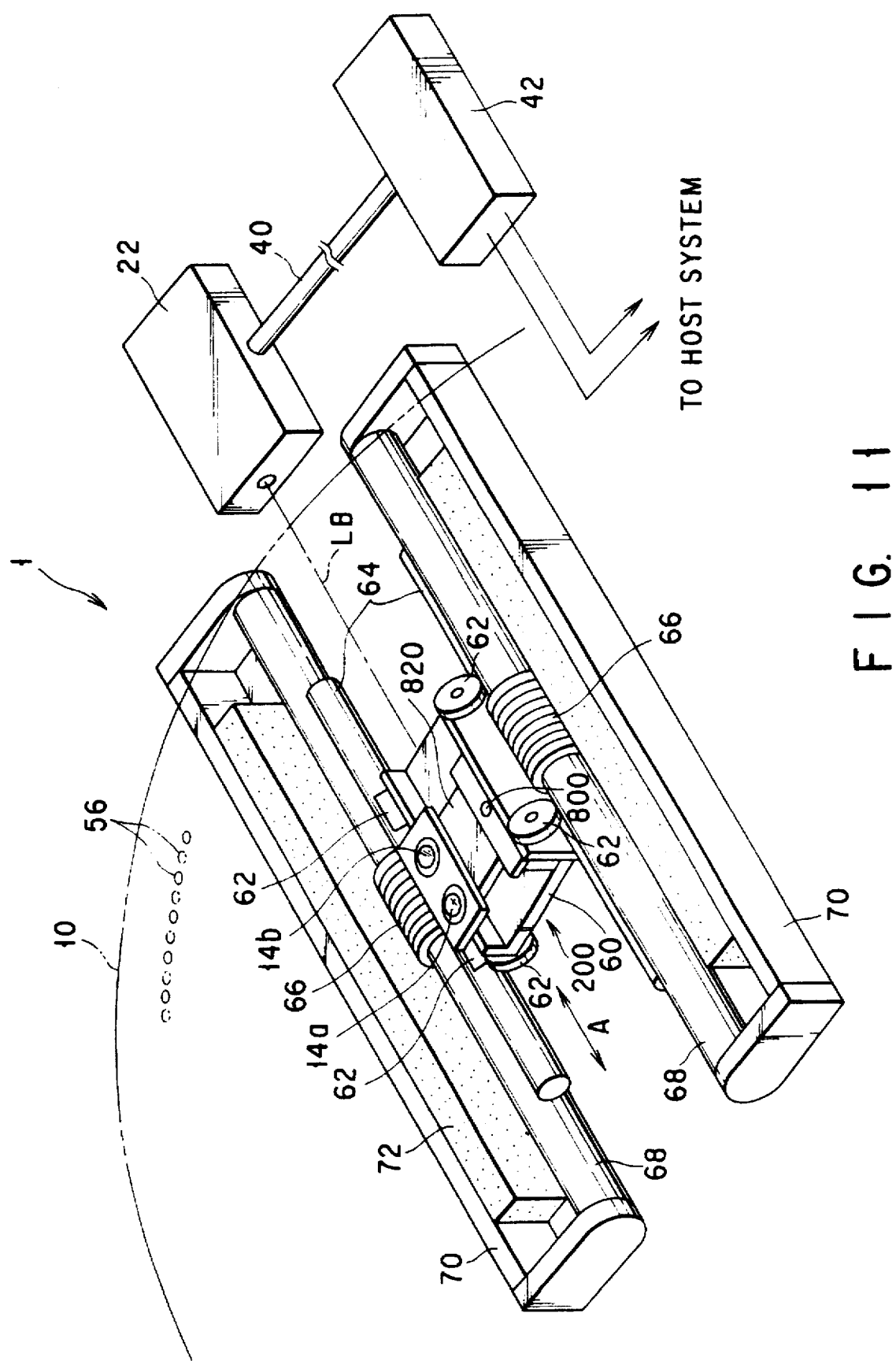
FIG. 11 is a schematic perspective view showing the arrangement of the main part of an optical disk recording/reproducing apparatus including an optical head according to the third embodiment of the present invention.

The third embodiment of the present invention will be described below with reference to FIGS. 11 to 13. Note that the same reference numerals in the third embodiment denote the same parts as in the first embodiment, and a repetitive description will be avoided.

The third embodiment includes a pickup 200 as an optical head having an arm type lens actuator 820 in place of the rotary type lens actuator 82 described above.

The lens actuator 820 is constituted by a support member 120 capable of pivoting on a support shaft 800, as a rotational center axis, which extends vertically from a carriage 60, only in the direction indicated by an arrow G (see FIGS. 12 and 13), a lens holder 121 as a lens holding member for holding objective lenses 14a and 14b, and a parallel leaf spring 122 for coupling the lens holder 121 to the support member 120 and supporting the lens holder 121 to allow it to move in the focus control direction.

Figure 12:
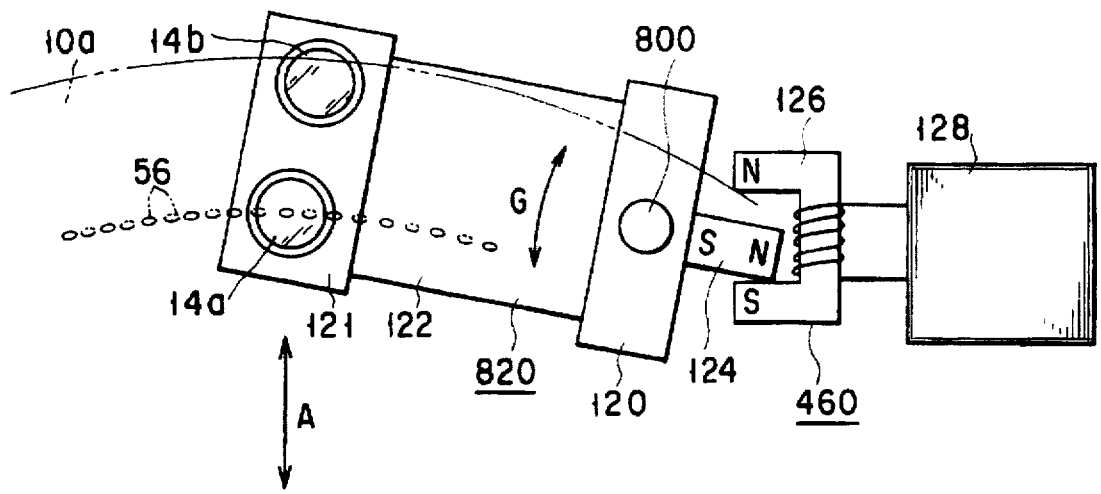
FIG. 12 is a view showing a state wherein the first objective lens is selected in the third embodiment.
Figure 13:
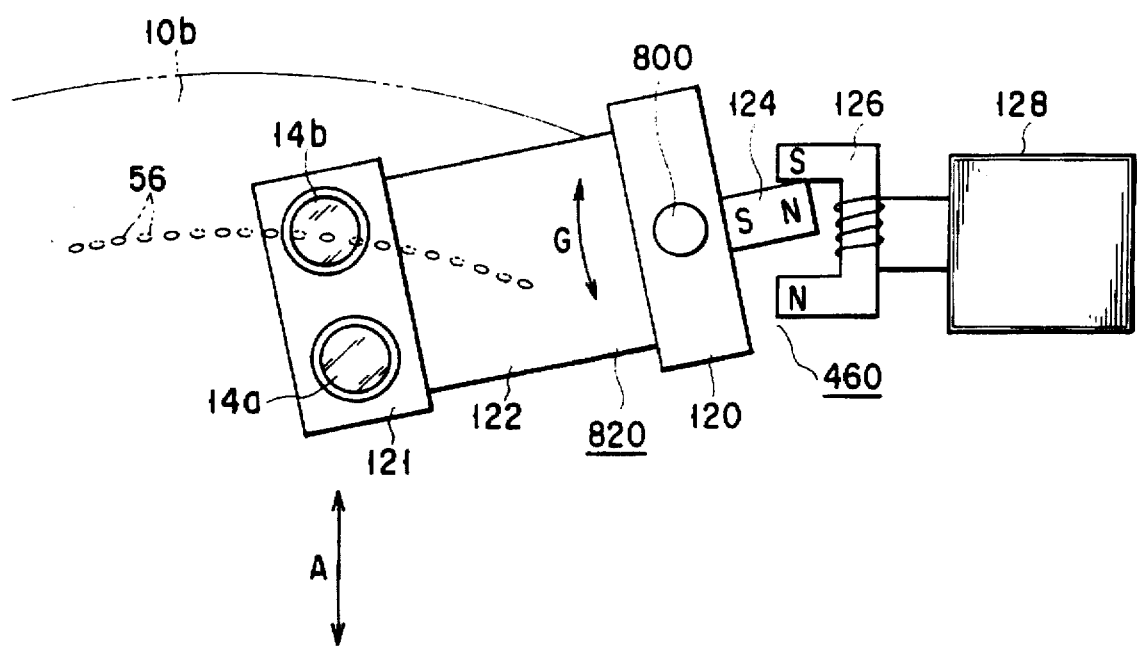
FIG. 13 is a view showing a state wherein the second objective lens is selected in the third embodiment.

If, for example, an optical disk is an optical disk 10a constituted by a thick substrate 102, the first objective lens 14a suitable for this optical disk can be selected and inserted in the optical path of a laser beam LB by pivoting the lens actuator 820 on the support shaft 800 as the rotational center axis by using an objective lens selecting means 460, as shown in FIG. 12. If the optical disk 10 is an optical disk 10b constituted by a thin substrate 102, control is performed to select the second objective lens 14b suitable for this optical disk and insert it in the optical path of the laser beam LB, as shown in FIG. 13.

The objective lens selecting means 460 is constituted by a magnet 124 mounted on the support member 120, an electromagnet 126 arranged near the magnet 124, and a polarity switching means 128 for switching the polarities of the two poles of the electromagnet 126 in accordance with the direction in which a current flows.

According to the third embodiment, the first and second objective lenses 14a and 14b are applied to processing of the plurality of optical disks 10a and 10b based on different standards associated with, e.g., recording density, allowable warp amount, and substrate thickness, similar to the first embodiment. However, the present invention is not limited this. For example, it is apparent that when different specifications are set for objective lenses in a recording operation and a reproducing operation with respect to one optical disk 10, the first and second objective lenses 14a and 14b may be selectively used for a recording operation and a reproducing operation, respectively.

Further, the present invention is not limited to the optical head having two objective lenses, but may be applied to the optical head having three or more objective lenses.

Figure 14:
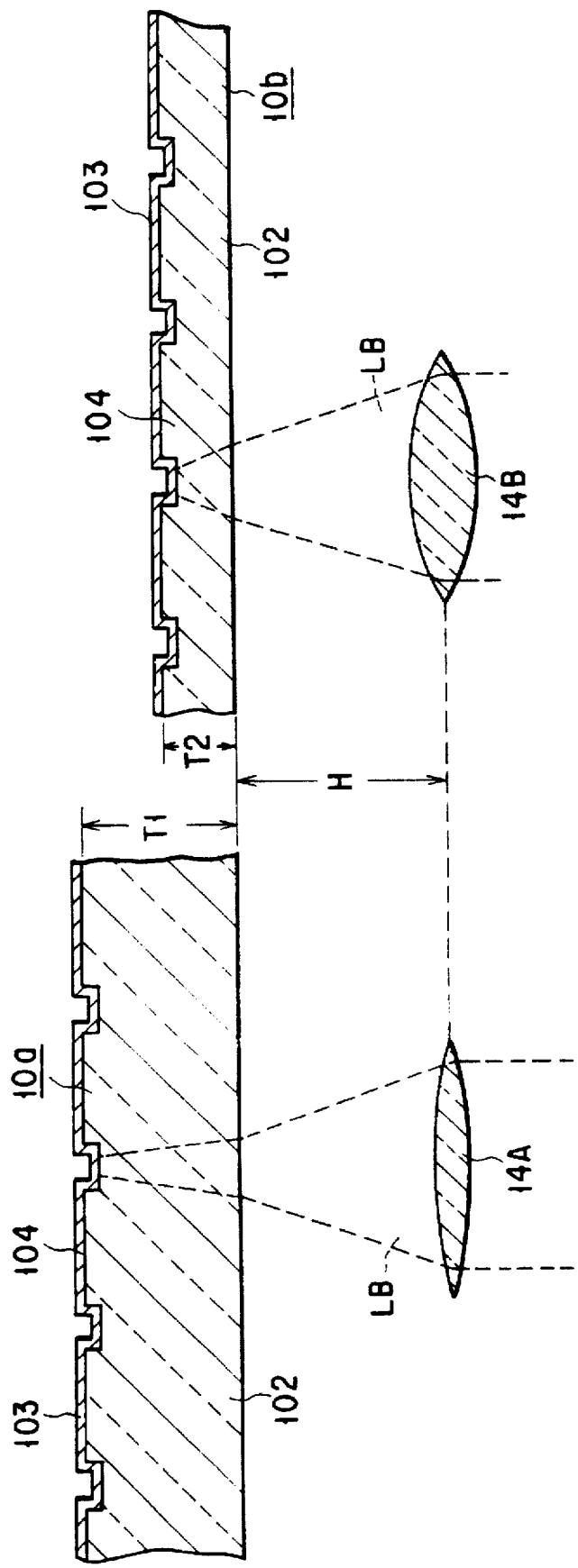
FIG. 14 is a schematic view showing a state wherein a plurality of objective lenses in the first to third embodiments are mounted.

FIG. 14 schematically shows a state wherein the first and second objective lenses 14a and 14b are mounted in the first to third embodiments. The focal lengths of the objective lenses 14a and 14b are set such that the distances between the first and second objective lenses 14a and 14b and the optical disks 10a and 10b, i.e., working distances H, become constant.

Assume that the objective lens 14a having a numerical aperture (NA) of 0.45 is used for the optical disk 10a for a CD, which is constituted by the substrate 102 having a thickness $T_1$ of 1.2 mm; and the objective lens 14b having an NA of 0.6, for the optical disk 10b constituted by the substrate 102 having a thickness $T_2$ of 0.6 mm. In this case, the focal length of the objective lens 14a is set to be f=2.8 mm, and the focal length of the objective lens 14b is set to be f=2.4 mm.

If the focal lengths are set to make the working distances H constant, servo control can be easily performed. At the same time, this serves to prevent accidents such as collision between the optical disks 10a and 10b and the objective lenses 14a and 14b. Such settings are very important for practical design.

Referring to FIG. 14, reference numeral 103 denotes a data recording layer with a tracking guide which is formed on a data recording surface.

[Fourth Embodiment]

Figure 15:
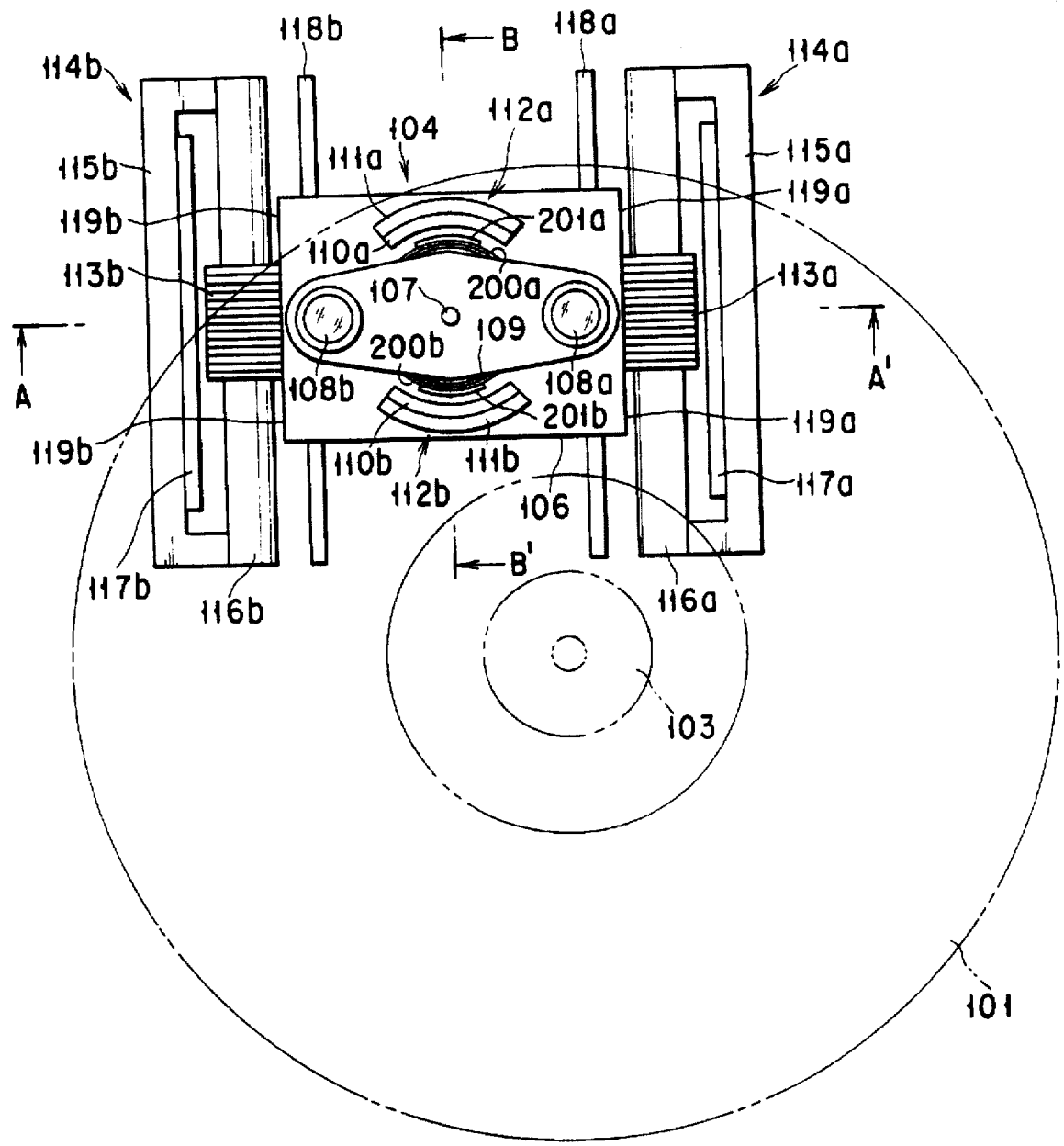
FIG. 15 is a plan view schematically showing an overall optical disk recording/reproducing apparatus including an optical head according to the fourth embodiment of the present invention.
Figure 16:
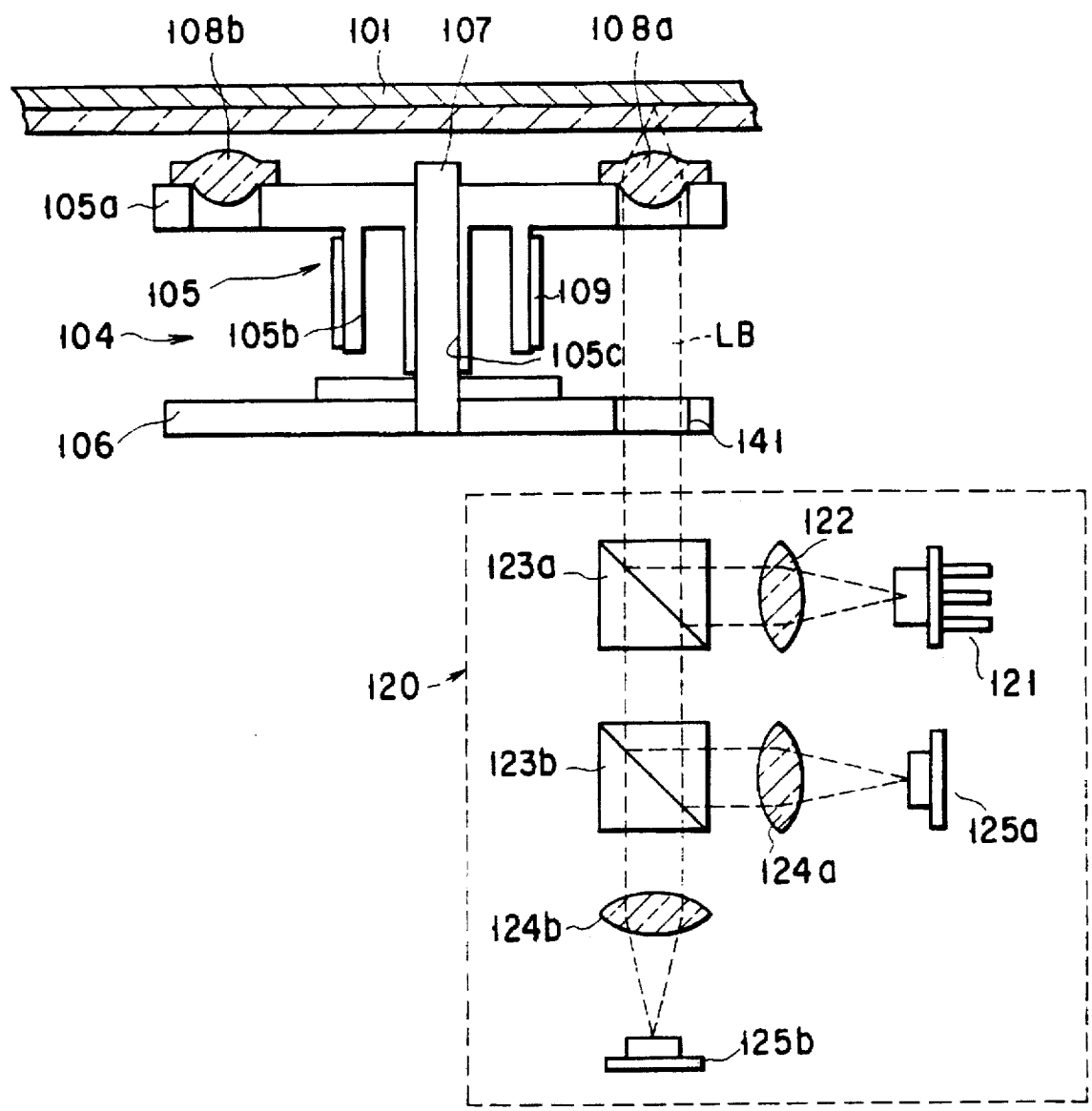
FIG. 16 is a sectional view taken along a line A—A' in FIG. 15, shown together with an optical system.
Figure 17:
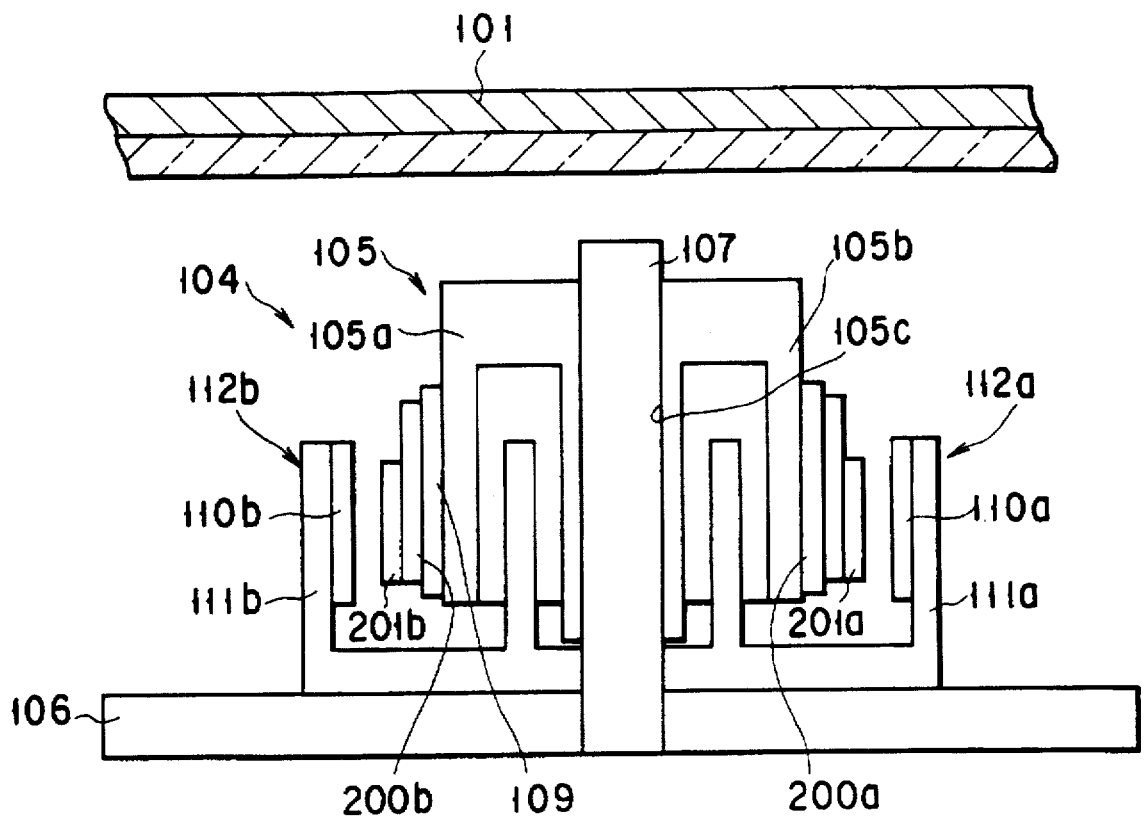
FIG. 17 is a sectional view taken along a line B—B in FIG. 15.

An objective lens driving unit according to the fourth embodiment of the present invention will be described below with reference to FIGS. 15 to 18. FIG. 15 is a plan view showing the objective lens driving unit. FIG. 16 is a sectional view taken along a line A–A' of the objective lens driving unit in FIG. 15, together with an optical processing system. FIG. 17 is a sectional view taken along a line B–B' of the objective lens driving unit in FIG. 15. FIG. 18 is a view showing an optical system and a signal processing system.

A disk 101 (e.g., an optical disk or a magnetooptical disk) used for a data recording/reproducing operation is held by a chucking means such as a magnetic chuck with respect to a spindle motor 103 fixed to a base 102. The disk 101 is stably rotated/driven by the spindle motor 103 in a recording/reproducing operation.

A movable member 104 is arranged below the disk 101 at a position near thereto. The movable member 104 is constituted by first and second movable members 105 and 106 and supported to be movable in the radial direction and direction of thickness of the disk 101.

The first movable member 105 is constituted by a flat blade 105a having a substantially elliptic shape and opposing the disk 101 surface, and a cylindrical coil bobbin 105b fixed to the lower portion of the blade 105a. A slide bearing 105c is arranged in the center of the blade 105a and the coil bobbin 105b.

A rotating shaft 107 having one end fixed to the second movable member 106 to extend vertically therefrom is inserted in the slide bearing 105c with a small gap (10 micron or less). The first movable member 105 can be rotated about the rotating shaft 107 and translated in the axial direction thereof.

A plurality of (two in this case) objective lenses 108a and 108b are fixed on the blade 105a to be spaced apart from each other. As these objective lenses 108a and 108b, objective lenses having different optical characteristics (e.g., the numerical aperture (NA) of the objective lens 108a is 0.45, and the NA of the objective lens 108b is 0.6) are selected. These two objective lenses 108a and 108b are arranged on a diameter passing through the rotating shaft 107 at an equal distance from the center axis such that the center of gravity of the total mass of the first movable member 105 almost coincides with the rotating shaft 107. That is, the structure of the first movable member 105 achieves a good balance in weight with respect to the rotating shaft 107 owing to the two objective lenses 108a and 108b.

A focus coil 109 is wound around the coil bobbin 105b. Two rectangular tracking coils 200a and 200b, each of which is two-dimensionally wound, are bonded to the focus coil 109 to be spaced apart from each other by a predetermined distance. Magnetic circuits 112a and 112b respectively constituted by permanent magnets 110a and 110b and the yokes 111a and 111b are arranged around the focus coil 109 and the tracking coils 200a and 200b and above the second movable member 106 to be symmetrical about the rotating shaft 107. The magnetic circuits 112a and 112b are arranged to oppose the focus coil 109 and the tracking coils 200a and 200b via magnetic gaps, each having a predetermined length so as to provide magnetic fields for the focus coil 109 and the tracking coils 200a and 200b. Note that the two magnetic circuits 112a and 112b have the same structure, and the directions of magnetization of the permanent magnets 110a and 110b coincide with the directions of thickness of the magnetic gaps, respectively.

When the focus coil 109 is energized, it receives magnetic fluxes from the magnetic circuits 112a and 112b to generate a Lorentz force. As a result, the first movable member 105 is slightly translated in the direction of thickness (the axial direction of the rotating shaft 107) of the disk 101. When the tracking coils 200a and 200b are energized, they receive magnetic flexes from the magnetic circuits 112a and 112b to generate a Lorentz force. As a result, the first movable member 105 is slightly rotated/driven in the radial direction (about the rotating shaft 107) of the disk 101.

Two magnetic members 201a and 201b consisting of iron pieces or the like are arranged on the tracking coils 200a and 200b at positions spaced apart from each other by 180° around the coil bobbin 105b. The magnetic members 201a and 201b are bonded to the tracking coils 200a and 200b at positions spaced apart from the two objective lenses 108a and 108b by 90° to be symmetrical about the rotating shaft 107. When one objective lens 108a (or 108b) is in an optical path 124 (to be described later), these magnetic members 201a and 201b are arranged to oppose the magnetic gaps of the magnetic circuits 112a and 112b.

As described above, the second movable member 106 is connected to the first movable member 105 via the rotating shaft 107. A pair of radial coils 113a and 113b are mounted on the two end portions of the second movable member 106 at an equal distance from the center-of-gravity position of the second movable member 106. The radial coils 113a and 113b receive magnetic fields from radial magnetic circuits 114a and 114b fixed to the base 102.

The radial magnetic circuits 114a and 114b are respectively constituted by back yokes 115a and 115b, center yokes 116a and 116b, and permanent magnets 117a and 117b. The radial coils 113a and 113b movably extend through in magnetic gaps defined by the center yokes 116a and 116b and the permanent magnets 117a and 117b. Note that the two radial magnetic circuits 114a and 114b have the same structure, and the directions of magnetization of the permanent magnets 117a and 117b coincide with the directions of thickness of the magnetic gaps.

Two pairs of slide bearings 119a and 119b, i.e., four slide bearings, are respectively arranged on the left and right sides of the second movable member 106.

Two guide rails 118a and 118b are arranged to be parallel to each other to extend through these slide bearings. Note that the two ends of each of the guide rails 118a and 118b are fixed to the base 102. The second movable member 106 is supported to be movable along the guide rails 118a and 118b.

When the radial coils 113a and 113b are energized, they receive magnetic fluxes from the radial magnetic circuits 114a and 114b to generate a Lorentz force. As a result, the second movable member 106 is translated in the radial direction of the disk 101.

The widths of the magnetic gaps defined by the radial magnetic circuits 114a and 114b are set to be sufficiently large in the same direction such that the second movable member 106 can be moved by a required distance in the longitudinal direction of the guide rails 118a and 118b, i.e., the objective lenses 108a and 108b can be moved in the radial direction from the outermost periphery to the innermost periphery of the disk 101.

The optical system and the signal processing system of the apparatus will be described with reference to FIGS. 16 and 18. A laser beam to be irradiated on the disk 101 is generated by an optical unit 120 fixed to the lower portion of the movable member 104 to be movable integrally with the movable member 104. A laser beam LB irradiated from a semiconductor laser 121 in the optical unit 120 is collimated by a collimator lens 122. The parallel beam is then deflected at 90° by a first beam splitter 123a and guided into the second movable member 106 from the radial direction of the disk 101. An optical path (specifically a space) 141 is formed in the bottom portion of the second movable member 106 to receive the laser beam LB. The laser beam LB passes through the optical path 141 and is incident on the objective lens 108a (or 108b). The laser beam LB incident on the objective lens 108a (or 108b) undergoes a predetermined converging effect to be focused on the data storage surface of the disk 101.

When the system is in the data reproduction mode, the laser beam LB guided to the disk 101 is intensity-modified in accordance with data recorded on the data storage surface, i.e., the present/absence of small pits, and is returned to the objective lens 108. The reflected laser beam LB returned to the objective lens 108 passes through the optical path 141 again to be guided to the optical unit 120. The laser beam LB passes through the first beam splitter 123a is split into two paths by a second beam splitter 123b. The two resultant light beams are respectively focused on first and second photodetectors 125a and 125b via focusing lenses 124a and 124b.

The reflected laser beams LB guided to the photodetectors 125a and 125b are respectively converted into electrical signals and are supplied to a tracking control circuit 127 and a focus control circuit 128 arranged in a control section 126. Signals generated by the tracking control circuit 127 and focus control circuit 128 are used, as a focus offset signal and a tracking offset signal for the objective lens 108 (108a or 108b), for focus direction control and tracking direction control.

The positional offset (focus offset) of the objective lens 108 in the focus direction is detected by using the focus offset signal and a tracking offset signal. The value of a current supplied to the focus coil 109 is controlled such that this positional offset is corrected. In addition, the positional offset of the objective lens 108 in the tracking direction is detected by using the tracking offset signal. The value of a current supplied to tracking coils 100a and 100b is controlled such that this positional offset is corrected.

The reflected laser beam LB guided to the photodetector 125b is also supplied to a data read circuit 129. The data represented by the laser beam LB are various data recorded on the disk 101, which are supplied to a host system (e.g., a personal computer) (not shown) to be output as characters, a still picture, or a motion picture from a display or a piece of music or sounds from a loudspeaker. In this case, the second movable member 106 is controlled to move in the radial direction of the disk 101 by a coarse or fine driving operation so as to follow tracks on the data recording surface of the disk 101.

The control section 126 includes a data write circuit 130 for generating a recording signal in accordance with data input from an external host system (e.g., a personal computer) (not shown), and an objective lens selector 131 for generating a signal for rotating/controlling the first movable member 105 to set one of the objective lenses 108a and 108b in the optical path 124 of the laser beam LB.

Switching of the two objective lenses 108a and 108b will be described next.

The disk 101 which can be used in the apparatus of the present invention is not limited to one type of disk as in the conventional apparatus, but a plurality of disks based on different standards associated with, e.g., disk recording density, allowable warp amount, and disk substrate thickness can be used. For example, not only a CD-ROM disk but also MO and PC disks and the like can be used. As the two objective lenses 108a and 108b, objective lenses suitable for processing of available disks are prepared.

If, for example, a disk requiring the laser beam LB to have a small spot diameter is to be used, an objective lens having a large numerical aperture (NA) is selected. If a disk requiring the laser beam LB to have a large spot diameter is to be used, an objective lens having a small NA is selected.

When the user places the desired disk 101 on the spindle motor 103, data indicating the type of the disk 101 (e.g., data indicating "CD-ROM disk", "PC disk", or the like as data of the disk based on a different standard) is input through a host system (e.g., a personal computer). This input signal is supplied to the objective lens selector 131 to perform control to move the corresponding objective lens 108a (or 108b) onto the optical path 141 of the laser beam LB.

If the objective lens 108a (or 108b) corresponding to the placed disk 101 has already been on the optical path 141, the first movable member 105 need not be greatly moved. If, however, the required objective lens 108a (or 108b) is spaced apart from the optical path 141 by 180° with respect to the rotating shaft 107, a large current is instantaneously supplied to the tracking coils 200a and 200b.

The current supplied in this case has a current value required to guide the first movable member 105 onto the optical path 141 with a large acceleration within a short period of time, unlike a current for fine driving control of the first movable member 105.

When the first movable member 105 is rotated/accelerated to cause a predetermined objective lens 108a (or 108b) to reach the optical path 141, the magnetic members 201a and 201b reach the positions where they oppose the magnetic gaps defined by the magnetic circuits 112a and 112b. In this case, while the magnetic members 201a and 201b oppose the magnetic circuits 112a and 112b, the magnetic members 201a and 201b receive the maximum magnetic attraction forces from the magnetic circuits 112a and 112b. For this reason, if a large current is instantaneously supplied to the tracking coils 200a and 200b, the first movable member 105 is reliably decelerated/stopped and positioned without supplying a special current for a decelerating/stopping operation, when the objective lens 108 reaches the optical path 124.

As described above, according to the fourth embodiment which is operated in the above manner, since two objective lenses can be switched and used in accordance with the standards or specifications of a disk, a plurality of objective lens driving units suitable for the standards or specifications of a disk need not be prepared. Therefore, there is provided an optical head which can properly handle various data without requiring any other optical head.

In addition, since a plurality of magnetic circuits and magnetic members are used, magnetic attraction forces acting on the first movable member can be easily balanced. For this reason, the slide bearings 119a and 119b are not pressed against the rotating shaft 107, and the frictional force, a so-called "rubbing", between the first movable member 105 and the rotating shaft 107 can be minimized. This allows the first movable member 105 to smoothly rotate and translate.

Furthermore, since the objective lenses are positioned to cause the center of gravity of the first movable member to almost coincide with the rotating shaft, so-called "rubbing" can be minimized as in the above case.

Note that even if these objective lenses are arranged to be symmetrical about the rotating shaft or arranged around the rotating shaft at equal intervals, the same effects as described above can be expected.

[Fifth Embodiment]

Figure 19:
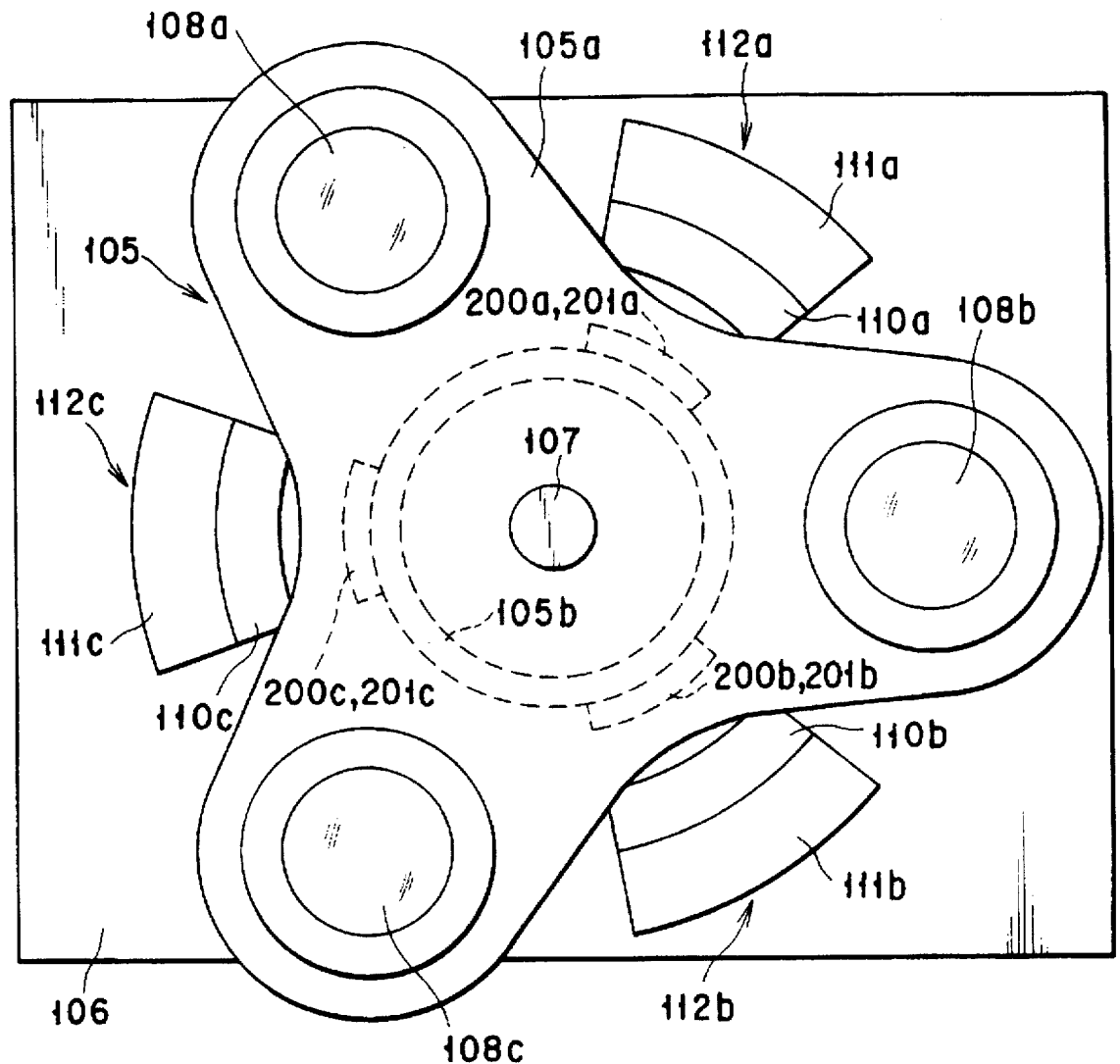
FIG. 19 is a plan view showing a movable portion of an optical head according to the fifth embodiment of the present invention.

An objective lens driving unit according to the fifth embodiment of the present invention will be described next with reference to FIG. 19. Note that the same reference numerals in the fifth embodiment denote the same parts as in each embodiment described above, and a repetitive description will be avoided.

A characteristic feature of this embodiment is that three objective lenses are mounted on a first movable member. More specifically, a blade 105a of a first movable member 105 is shaped to have three protruding portions spaced apart from each other by 120° with respect to a rotating shaft 107. Objective lenses 108a, 108b, and 108c are respectively fixed/arranged on these protruding portions. Three magnetic circuits 112a, 112b, and 112c are fixed to a second movable member 106 to be symmetrical about the rotating shaft 107. The objective lenses 108a, 108b, and 108c and the magnetic circuits 112a, 112b, and 112c are arranged at equal angular intervals on the same circumference around the rotating shaft 107 as the center. Three tracking coils 200a, 200b, and 200c and three magnetic members 201a, 201b, and 201c, each consisting of an iron piece or the like, are bonded to a coil bobbin 105b at equal angular intervals. (Note that the magnetic members 201a, 201b, and 201c are bonded in the state shown in FIG. 17).

As a basic structure for supporting the first movable member 105 to allow it to move in the focus direction and the radial direction, the same slide bearing mechanism as that in the fourth embodiment is employed. In addition, since the structure and operation of the second movable member 106 are the same as those in the fourth embodiment, an illustration and description thereof will be omitted.

According to the embodiment having such an arrangement, magnetic gaps for providing magnetic fields for a focus coil 109 and the tracking coils 200a, 200b, and 200c, which are equal in number to the objective lenses 108a, 108b, and 108c are present and located at equal angular intervals on the same circumference around the rotating shaft 107 as the center. Since the magnetic members 201a, 201b, and 201c for determining the neutral position of the first movable member 105, equal in number to the objective lenses 108a, 108b, and 108c, are mounted, a predetermined one of the objective lenses 108a, 108b, and 108c can be reliably positioned on an optical path 141 by the same control method as that in the fourth embodiment.

In the optical head of this embodiment, since the three objective lenses can be switched and used in accordance with the standards or specifications of a disk, a plurality of special (different) optical heads suitable for the standards or specifications of disks need not be prepared. Therefore, there is provided an optical head which can properly handle various data without requiring any other optical heads.

Since pluralities of magnetic circuits and magnetic members are used, magnetic attraction forces acting on the first movable member can be easily balanced. For this reason, the slide bearings are not pressed against the rotating shaft, and the frictional force, a so-called "rubbing", between the first movable member and the rotating shaft can be minimized. This allows the first movable member to smoothly rotate and translate.

Furthermore, since the objective lenses are positioned to cause the center of gravity of the first movable member to almost coincide with the rotating shaft, so-called "rubbing" can be minimized as in the above case.

Note that even if these objective lenses are arranged to be symmetrical about the rotating shaft or arranged around the rotating shaft at equal intervals, the same effects as described above can be expected.

[Sixth Embodiment]

Optical head according to the sixth embodiment of the present invention will be described next with reference to FIG. 20. A characteristic feature of this embodiment is that four objective lenses are mounted on a first movable member. More specifically, a blade 105a of a first movable member 105 is shaped to have four protruding portions separated from each other by 90° with respect to a rotating shaft 107. Objective lenses 104a, 104b, 104c, and 104d are fixed/arranged on these protruding portions. Four magnetic circuits 112a, 112b, 112c, and 112d are fixed to a second movable member 106 to be symmetrical about the rotating shaft 107. The objective lenses 104a, 104b, 104c, and 104d and the magnetic circuits 112a, 112b, 112c, and 112d are arranged at equal angular intervals on the same circumference around the rotating shaft 107 as the center. In addition, four tracking coils 200a, 200b, 200c, and 200d and four magnetic members 201a, 201b, 201c, and 201d, each consisting of an iron piece or the like, are bonded to a coil bobbin 105b at equal angular intervals. (Note that the magnetic members 201a, 201b, 201c, and 201d are bonded in the state shown in FIG. 18.)

As a basic structure for supporting the first movable member 105 to allow it to move in the focus and radial directions, the same slide bearing mechanism as that in the fourth embodiment is employed. In addition, since the structure and operation of the second movable member 106 are the same as those in the fourth embodiment, an illustration and description thereof will be omitted.

According to the embodiment having such an arrangement, magnetic gaps for providing magnetic fields for a focus coil 109 and the tracking coils 200a, 200b, 200c, and 200d, which are equal in number to the objective lenses 108a, 108b, 108c, and 108d, are present and located at equal angular intervals on the same circumference around the rotating shaft 107 as the center. Since the magnetic members 201a, 201b, 201c, and 201d for determining the neutral position of the first movable member 105, which are equal in number to the objective lenses 108a, 108b, 108c, and 108d, are mounted, a predetermined one of the objective lenses 108a, 108b, 108c, and 108d can be reliably positioned on an optical path 141 by the same control method as that in the fourth embodiment.

In the optical head of this embodiment, since the four objective lenses can be switched and used in accordance with the standards or specifications of a disk, a plurality of special (different) optical heads suitable for the standards or specifications of disks need not be prepared. Therefore, there is provided an optical head which can properly process various data without requiring any other objective lens driving units.

Since pluralities of magnetic circuits and magnetic members are used, magnetic attraction forces acting on the first movable member can be easily balanced. For this reason, the slide bearings are not pressed against the rotating shaft, and the frictional force, a so-called "rubbing", between the first movable member and the rotating shaft can be minimized. This allows the first movable member to smoothly rotate and translate.

Furthermore, since the objective lenses are positioned to cause the center of gravity of the first movable member to almost coincide with the rotating shaft, so-called "rubbing" can be minimized as in the above case.

Note that even if these objective lenses are arranged to be symmetrical about the rotating shaft or arranged around the rotating shaft at equal intervals, the same effects as described above can be expected.

The above three embodiments respectively exemplify the cases wherein the numbers of objective lenses are set to be two, three, and four. However, the present invention is not limited to these numbers. The required effects can be obtained by performing the same control as described above with a plurality of objective lenses.

The relationship between the numbers of objective lenses, magnetic members, and magnetic gaps is preferably set such that the numbers of magnetic members and magnetic gaps are divisors of the number of objective lenses, for example: two magnetic gaps and six magnetic members for six objective lenses; three magnetic gaps and six magnetic members for six objective lenses; six magnetic gaps and six magnetic members for six objective lenses; and two magnetic gaps and three magnetic members for six objective lenses. Note that a plurality of magnetic members may be mounted at almost the same position to oppose one magnetic circuit.

By using such a combination, neutral positions determined by magnetic attraction forces between magnetic members and magnetic gaps, which are equal in number to objective lenses, can be arranged. In addition, the magnetic attraction forces between the magnetic members and the magnetic gaps cancel each other to further reduce the frictional force, i.e., so-called "rubbing" between the first movable member and the rotating shaft.

[Seventh Embodiment]

Figure 21A:
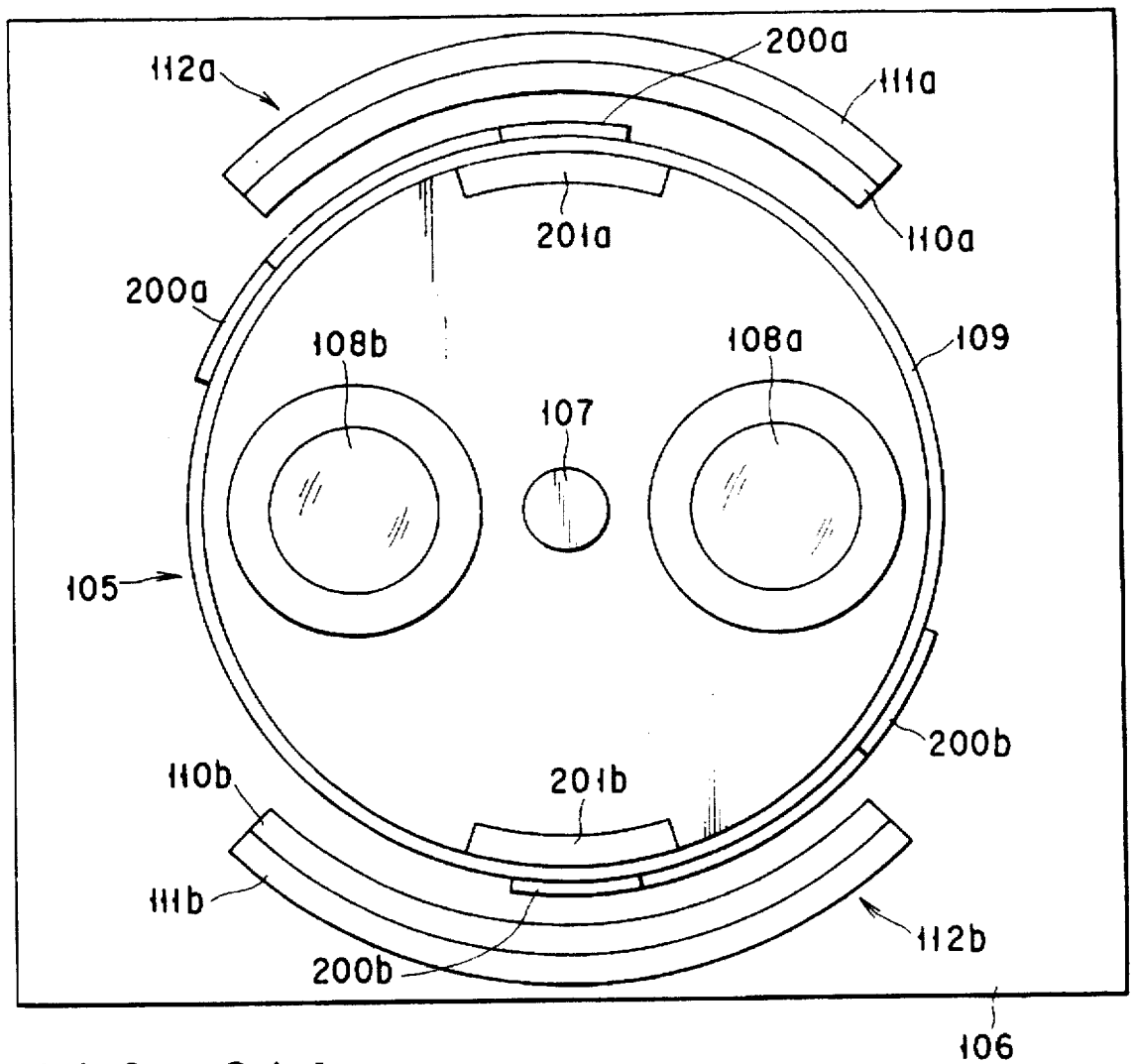
FIG. 21A is a plan view showing a movable portion of an optical head according to the seventh embodiment of the present invention.
Figure 21B:
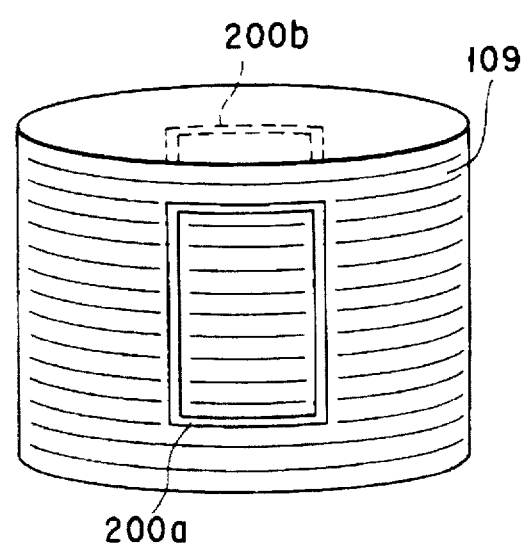
FIG. 21B is a perspective view of the movable portion in the seventh embodiment.

An optical head according to the seventh embodiment of the present invention will be described next with reference to FIGS. 21A and 21B. FIG. 21A is a plan view of the seventh embodiment. FIG. 21B is a perspective view showing the arrangement of tracking coils and a focus coil.

A characteristic feature of this embodiment is that a first movable member is different in shape from that in each embodiment describe above. More specifically, a blade 105a as a part of a first movable member 105 is circular, and the diameter of a coil bobbin 105b is slightly larger than that in each embodiment described above. The diameter of the blade 105a is almost equal to that of the coil bobbin 105b. The first movable member 105 has a cylindrical shape as a whole.

Consequently, magnetic circuits 112a and 112b opposing a focus coil 109 and tracking coils 200a and 200b bonded to the coil bobbin 105b are formed to have larger curvatures than those in each embodiment described above.

Notches are formed in the first movable member 105, and magnetic members 201a and 201b are embedded in the notches.

As a basic structure for supporting the first movable member 105 to allow it to move in the focus and radial directions, the same slide bearing mechanism as that in the fourth embodiment is employed. In addition, since the structure and operation of the second movable member 106 are the same as those in the fourth embodiment, an illustration and description thereof will be omitted.

In this embodiment having the above structure, the same effects as described above can be obtained by performing the same operation as that in each embodiment described above.

In the optical head of this embodiment, since the two objective lenses can be switched and used in accordance with the standards or specifications of a disk, a plurality of dedicated (different) optical heads suitable for the standards or specifications of disks need not be prepared. Therefore, there is provided an optical head which can properly process various data without requiring any other optical heads.

Since pluralities of magnetic circuits and magnetic members are used, magnetic attraction forces acting on the first movable member can be easily balanced. For this reason, the slide bearings are not pressed against the rotating shaft, and the frictional force, a so-called "rubbing", between the first movable member and the rotating shaft can be minimized. This allows the first movable member to smoothly rotate and translate.

Furthermore, since the objective lenses are positioned to cause the center of gravity of the first movable member to almost coincide with the rotating shaft, so-called "rubbing" can be minimized as in the above case. Note that even if these objective lenses are arranged to be symmetrical about the rotating shaft or arranged around the rotating shaft at equal intervals, the same effects as described above can be expected.

[Eighth Embodiment]

An optical head according to the eighth embodiment of the present invention will be described next with reference to FIG. 22. Similar to the fifth embodiment, a characteristic feature of this embodiment is that three objective lenses are mounted on a first movable member. More specifically, objective lenses 108a, 108b, and 108c are fixed/arranged on a first movable member 105 at three positions separated from each other by 120° with respect to a rotating shaft 107. Three magnetic circuits 112a, 112b, and 112c are fixed to a second movable member 106 to be symmetrical about the rotating shaft 107. These objective lenses 108a, 108b, and 108c and magnetic circuits 112a, 112b, and 112c are arranged at equal angular intervals on the same circumference around the rotating shaft 107 as the center. In addition, three magnetic members 200a, 200b, and 200c are bonded to the first movable member 105, and three magnetic members 201a, 201b, and 201c, each consisting of an iron piece, are embedded in the first movable member 105 at equal angular intervals.

As a basic structure for supporting the first movable member 105 to allow it to move in the focus and radial directions, the same slide bearing mechanism as that in the fourth embodiment is employed. In addition, since the structure and operation of the second movable member 106 are the same as those in the fourth embodiment, an illustration and description thereof will be omitted.

In this embodiment having the above structure, the same effects as described above can be obtained by performing the same operation as that in each embodiment described above.

In the optical head of this embodiment, since the three objective lenses can be switched and used in accordance with the standards or specifications of a disk, a plurality of special (different) optical heads suitable for the standards or specifications of disks need not be prepared. Therefore, there is provided an optical head which can properly process various data without requiring any other optical heads.

Since pluralities of magnetic circuits and magnetic members are used, magnetic attraction forces acting on the first movable member can be easily balanced. For this reason, the slide bearings are not pressed against the rotating shaft, and the frictional force, a so-called "rubbing", between the first movable member and the rotating shaft can be minimized. This allows the first movable member to smoothly rotate and translate.

Furthermore, since the objective lenses are positioned to cause the center of gravity of the first movable member to almost coincide with the rotating shaft, so-called "rubbing" can be minimized as in the above case.

Note that even if these objective lenses are arranged to be symmetrical about the rotating shaft or arranged around the rotating shaft at equal intervals, the same effects as described above can be expected.

[Ninth Embodiment]

An optical head according to the ninth embodiment of the present invention will be described next with reference to FIG. 23.

Similar to the sixth embodiment, a characteristic feature of this embodiment is that four objective lenses are mounted on a first movable member. More specifically, objective lenses 108a, 108b, 108c, and 108d are fixed/arranged on a blade 105a of a first movable member 105 at four positions separated from each other by 90° with respect to a rotating shaft 107. Four magnetic circuits 112a, 112b, 112c, and 112d are fixed to a second movable member 106 to be symmetrical about the rotating shaft 107. These objective lenses 108a, 108b, 108c, and 108d and magnetic circuits 112a, 112b, 112c, 112d are arranged at equal angular intervals on the same circumference around the rotating shaft 107 as the center. In addition, four tracking coils 200a, 200b, 200c, and 200d are bonded to a first coil bobbin 105b, and four magnetic members 201a, 201b, 201c, and 201d, each consisting of an iron piece, are embedded in the coil bobbin 105b at equal angular intervals.

As a basic structure for supporting the first movable member 105 to allow it to move in the focus and radial directions, the same slide bearing mechanism as that in the fourth embodiment is employed. In addition, since the structure and operation of the second movable member 106 are the same as those in the fourth embodiment, an illustration and description thereof will be omitted.

In this embodiment having the above structure, the same effects as described above can be obtained by performing the same operation as that in each embodiment described above.

In the optical head of this embodiment, since the four objective lenses can be switched and used in accordance with the standards or specifications of a disk, a plurality of dedicated (different) optical heads suitable for the standards or specifications of disks need not be prepared. Therefore, there is provided an optical head which can properly process various data without requiring any other optical heads.

Since pluralities of magnetic circuits and magnetic members are used, magnetic attraction forces acting on the first movable member can be easily balanced. For this reason, the slide bearings are not pressed against the rotating shaft, and the frictional force, a so-called "rubbing", between the first movable member and the rotating shaft can be minimized. This allows the first movable member to smoothly rotate and translate.

Furthermore, since the objective lenses are positioned to cause the center of gravity of the first movable member to almost coincide with the rotating shaft, so-called "rubbing" can be minimized as in the above case.

Note that even if these objective lenses are arranged to be symmetrical about the rotating shaft or arranged around the rotating shaft at equal intervals, the same effects as described above can be expected.

[Tenth Embodiment]

Figure 24:
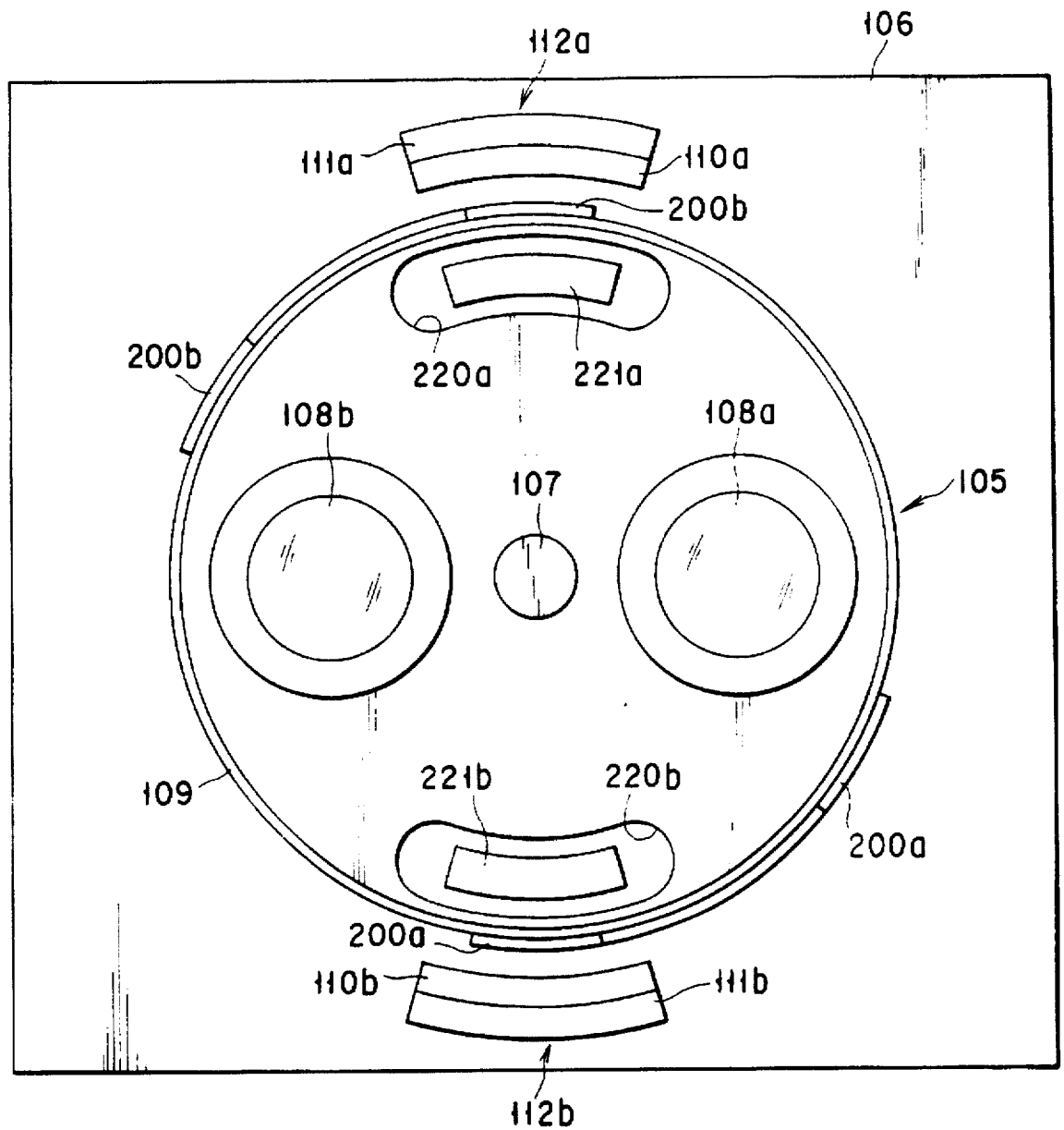
FIG. 24 is a plan view showing a movable portion of an optical head according to the tenth embodiment of the present invention.
Figure 25:
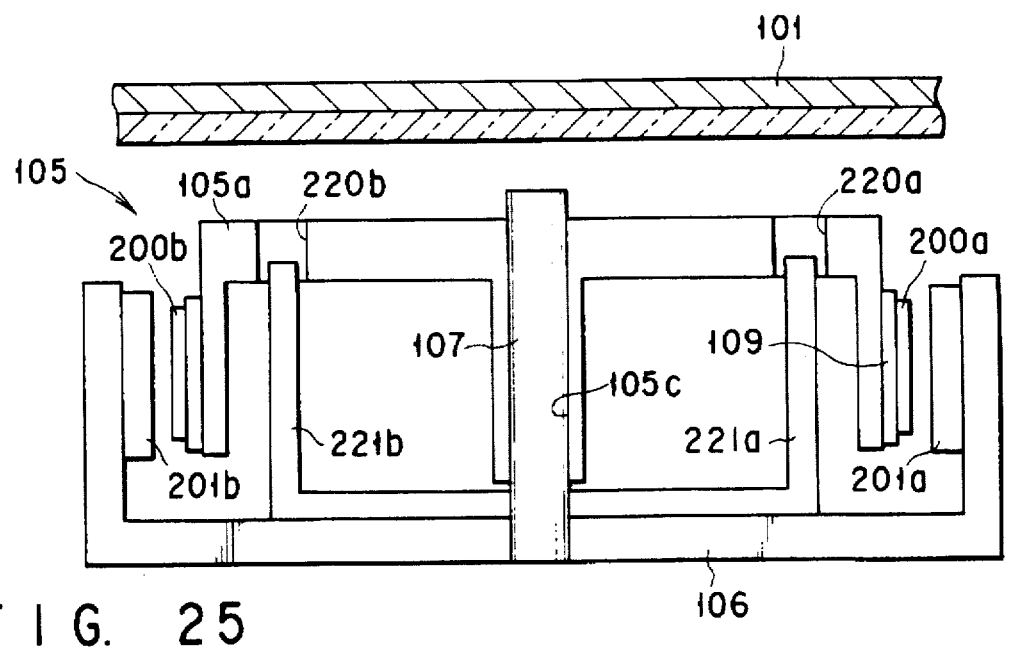
FIG. 25 is a sectional view of the tenth embodiment.

An optical head according to the tenth embodiment of the present invention will be described next with reference to the plan view of FIG. 24 and the sectional view of FIG. 25.

A characteristic feature of this embodiment is that a first movable member is different in shape from that in each embodiment described above. More specifically, elliptic holes 220a and 220b are formed at two positions near the outer periphery of a first movable member 105. In this case, the positions where the holes 220a and 220b are formed are symmetrical about a rotating shaft 107 and spaced apart from objective lenses 108a and 108b by 90°.

Center yokes 221a and 221b to be inserted in the holes 220a and 220b are fixed to a second movable member 106. Permanent magnets 110a and 110b, yokes 111a and 111b, and the center yokes 221a and 221b constitute magnetic circuits 112a and 112b. As shown in FIG. 25, the height of the center yokes 221a and 221b in the axial direction is set such that each center yoke slightly protrudes (by, e.g., about 0.5 mm) from the lower surface of a blade 105a of the first movable member 105. The length of the holes 220a and 220b in the rotating direction is set to be slightly larger than that of the center yokes 221a and 221b in the rotating direction.

As a basic structure for supporting the first movable member 105 to allow it to move in the focus and radial directions, the same slide bearing mechanism as that in the fourth embodiment is employed.

In this embodiment having the above structure, although the structure and operation of the second movable member 106 are almost the same as those in the fourth embodiment, the operation of the first movable member 105 which is to be performed when the first movable member 105 is coarsely moved in the tracking direction is different from that in the fourth embodiment. More specifically, if the first movable member 105 is to be coarsely moved in the tracking direction in the state shown in FIG. 25, the center yokes 221a and 221b are brought into contact with the holes 220a and 220b. As a result, a required rotational amount cannot be obtained. For this reason, when the first movable member 105 is to be coarsely moved in the tracking direction, a focus coil 109 is energized first to finely move the first movable member 105 in the focus direction so as to move it upward by a distance slightly larger than 0.5 mm mentioned above. Tracking coils 200a and 200b are then energized to perform a tracking/driving operation. After the first movable member 105 is rotated/driven to a necessary position, the focus coil 109 is deenergized to lower the first movable member 105 so as to insert the center yokes 221a and 221b in the holes 220a and 220b. Such a series of operations are realized by supplying part of an output from the objective lens selector 131 in the control section 126 in the signal processing system shown in FIG. 18 to not only the tracking control circuit 127 but also the focus control circuit 128.

By employing the above structure and operation, the height of the first movable member 105 in the axial direction (especially the thickness of the blade 105a) can be sufficiently reduced, and the overall profile of the unit can be reduced.

Assume that the first movable member 105 is rotated excessively, and an objective lens 104 cannot be positioned on an optical path 141. In this case, excessive rotation of the first movable member 105 can be prevented by bringing the holes 220a and 220b into contact with the center yokes 221a and 221b. That is, the holes 220a and 220b and the center yokes 221a and 221b realize the function of a stopper. Even if, therefore, the first movable member 105 is rotated excessively, the objective lens 104 can be quickly positioned on an optical path 124.

Note that buffer members such as rubber members may be arranged on the contact surfaces between the holes 220a and 220b and the center yokes 221a and 221b, or the contact surfaces may be shaped to allow surface contact (for example, the contact surfaces may be shaped into flat surfaces). With this arrangement, the influences of vibrations, caused by collision, on objective lenses 104a and 104b, the focus coil 109, and the tracking coils 200a and 200b can be minimized.

In the optical head of this embodiment, since the two objective lenses can be switched and used in accordance with the standards or specifications of a disk, a plurality of dedicated (different) optical heads suitable for the standards or specifications of disks need not be prepared. Therefore, there is provided an objective lens driving unit which can properly process various data without requiring any other optical heads.

Furthermore, since the objective lenses are positioned to cause the center of gravity of the first movable member to almost coincide with the rotating shaft, the first movable member is balanced about the rotating shaft. For this reason, so-called "rubbing" between the first movable member and the rotating shaft can be minimized. Therefore, fine rotation and fine translation of the first movable member can be smoothly performed.

Note that even if these objective lenses are arranged to be symmetrical about the rotating shaft or arranged around the rotating shaft at equal intervals, the same effects as described above can be expected.

[Eleventh Embodiment]

Figure 26:
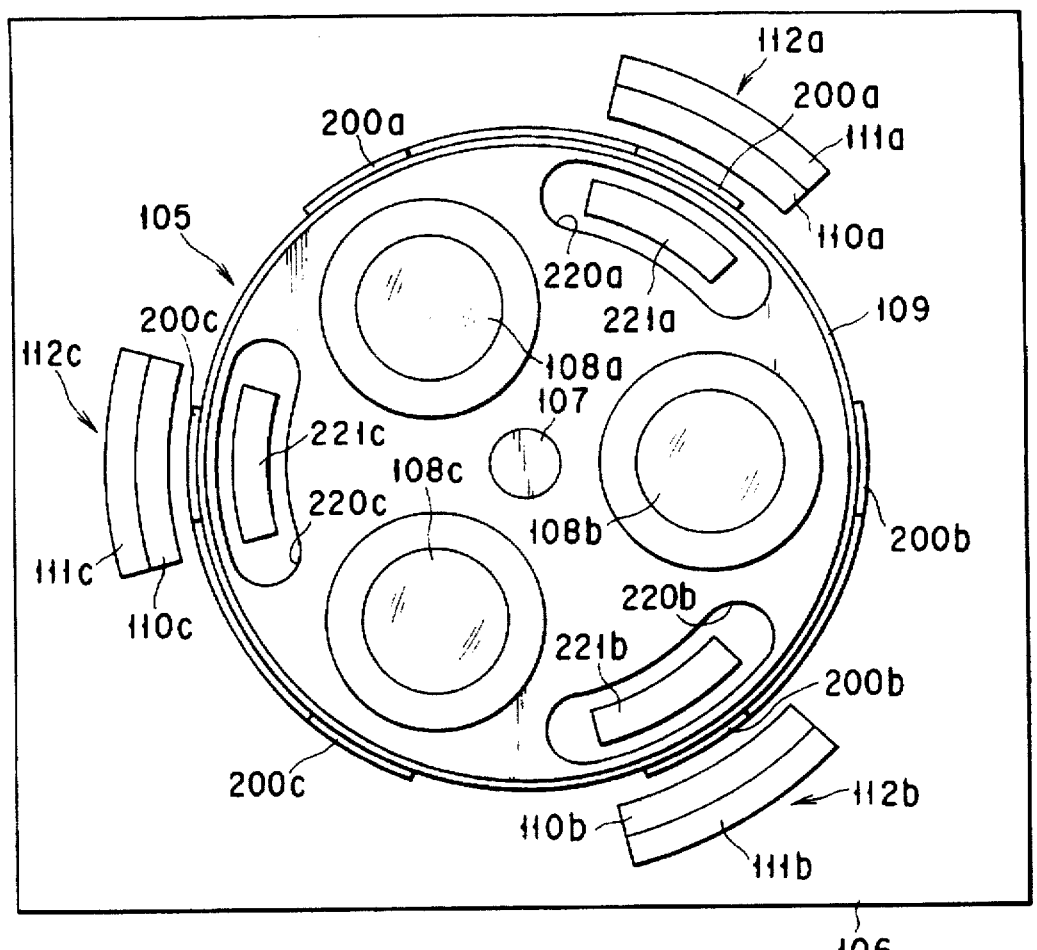
FIG. 26 is a plan view showing a movable portion of an optical head according to the eleventh embodiment of the present invention.

An objective lens driving unit according to the eleventh embodiment of the present invention will be described next with reference to FIG. 26.

A characteristic feature of this embodiment is that three objective lenses are mounted on a first movable member, similar to the fifth embodiment. More specifically; objective lenses 108a, 108b, and 108c are arranged on a first movable member 105 at three positions spaced apart from each other by 120° with respect to a rotating shaft 107. Holes 220a, 220b, and 220c are also formed in the first movable member 105. Three magnetic circuits 112a, 112b, and 112c are fixed to a second movable member 106 to be symmetrical about the rotating shaft 107, and center yokes 221a, 221b, and 221c are inserted in the holes 220a, 220b, and 220c. These objective lenses 108a, 108b, and 108c and magnetic circuits 112a, 112b, and 112c are arranged at equal angular intervals on the same circumference around the rotating shaft 107 as the center. Three tracking coils 200a, 200b, and 200c and three magnetic members 201a, 201b, and 201c, each consisting of an iron piece, are bonded to the first movable member 105 at equal angular intervals.

As a basic structure for supporting the first movable member 105 to allow it to move in the focus and radial directions, the same slide bearing mechanism as that in the fourth embodiment is employed. In addition, since the structure and operation of the second movable member 106 are the same as those in the fourth embodiment, an illustration and description thereof will be omitted.

In this embodiment having the above structure, the same effects as described above can be obtained by performing the same operation as that in the tenth embodiment. In the optical head of this embodiment, since the three objective lenses can be switched and used in accordance with the standards or specifications of a disk, a plurality of dedicated (different) optical heads suitable for the standards or specifications of disks need not be prepared. Therefore, there is provided an optical head which can properly process various data without requiring any other optical heads.

Furthermore, since the objective lenses are positioned to cause the center of gravity of the first movable member to almost coincide with the rotating shaft, the first movable member is balanced about the rotating shaft. For this reason, so-called "rubbing" between the first movable member and the rotating shaft can be minimized. Therefore, fine rotation and fine translation of the first movable member can be smoothly performed.

Note that even if these objective lenses are arranged to be symmetrical about the rotating shaft or arranged around the rotating shaft at equal intervals, the same effects as described above can be expected.

[Twelfth Embodiment]

An optical head according to the twelfth embodiment of the present invention will be described next with reference to FIG. 27.

Figure 20:
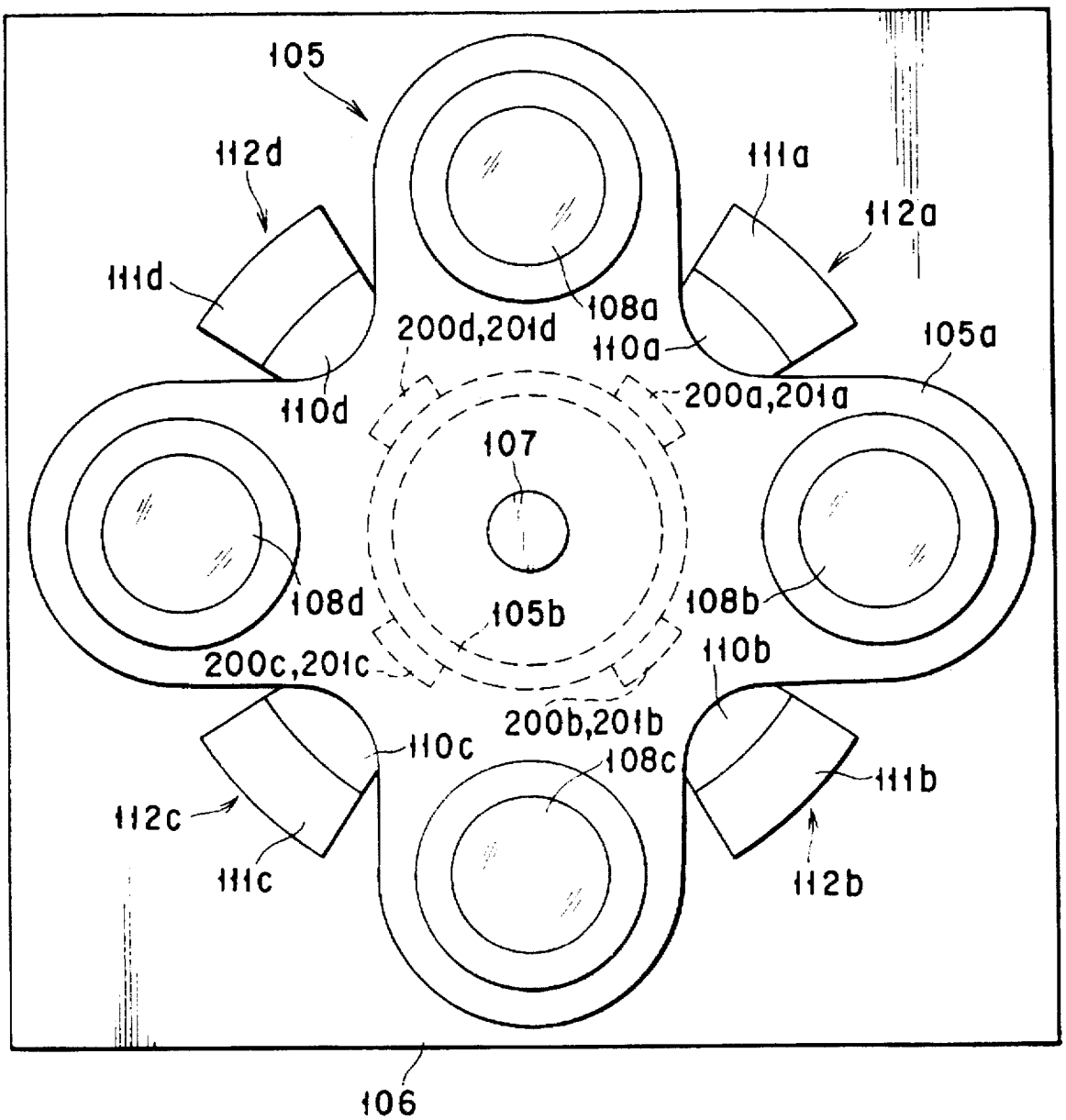
FIG. 20 is a plan view showing a movable portion of an optical head according to the sixth embodiment of the present invention.

A characteristic feature of this embodiment is that four objective lenses are mounted on a first movable member, similar to the sixth embodiment (FIG. 20). More specifically, objective lenses 108a, 108b, 108c, and 108d are arranged on a blade 105a of a first movable member 105 at four positions spaced apart from each other by 90° with respect to a rotating shaft 107. Holes 220a, 220b, 220c, and 220d are also formed in the blade 105a. Four magnetic circuits 112a, 112b, 112c, and 112d are fixed to a second movable member 106 to be symmetrical about the rotating shaft 107, and center yokes 221a, 221b, 221c, and 221d are inserted in the holes 220a, 220b, 220c, and 220d. These objective lenses 108a, 108b, 108c, and 108d and magnetic circuits 112a, 112b, 112c, and 112d are arranged at equal angular intervals on the same circumference around the rotating shaft 107 as the center. Four tracking coils 200a, 200b, 200c, and 200d and four magnetic members 201a, 201b, 201c, and 201d, each consisting of an iron piece, are bonded to the first movable member 105 at equal angular intervals.

As a basic structure for supporting the first movable member 105 to allow it to move in the focus and radial directions, the same slide bearing mechanism as that in the fourth embodiment is employed. In addition, since the structure and operation of the second movable member 106 are the same as those in the fourth embodiment, an illustration and description thereof will be omitted.

In this embodiment having the above structure, the same effects as described above can be obtained by performing the same operation as that in the tenth embodiment.

In the optical head of this embodiment, since the four objective lenses can be switched and used in accordance with the standards or specifications of a disk, a plurality of dedicated (different) optical heads suitable for the standards or specifications of disks need not be prepared. Therefore, there is provided an optical head which can properly process various data without requiring any other optical heads.

Furthermore, since the objective lenses are positioned to cause the center of gravity of the first movable member to almost coincide with the rotating shaft, the first movable member is balanced about the rotating shaft. For this reason, so-called "rubbing" between the first movable member and the rotating shaft can be minimized.

Therefore, fine rotation and fine translation of the first movable member can be smoothly performed. Note that even if these objective lenses are arranged to be symmetrical about the rotating shaft or arranged around the rotating shaft at equal intervals, the same effects as described above can be expected.

Figure 28A:
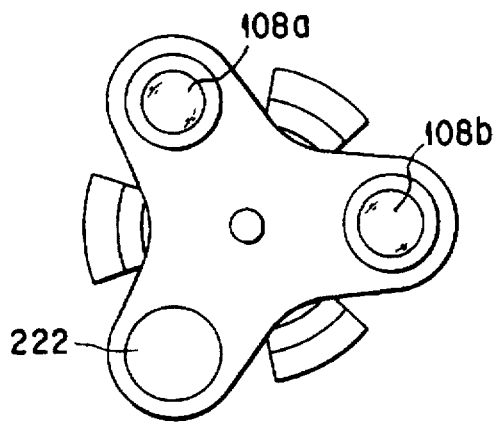
FIGS. 28A to 28F are plan views, each showing an example of using one counterweight instead of an objective lens in the fourth to twelfth embodiments.
Figure 28B:
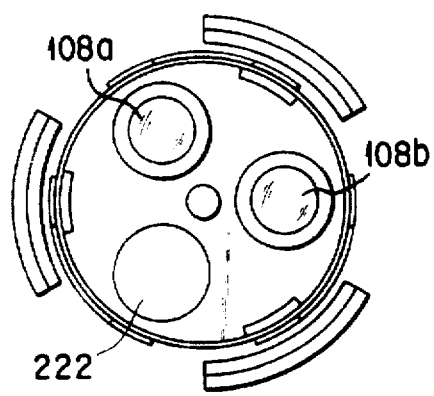
Figure 28C:
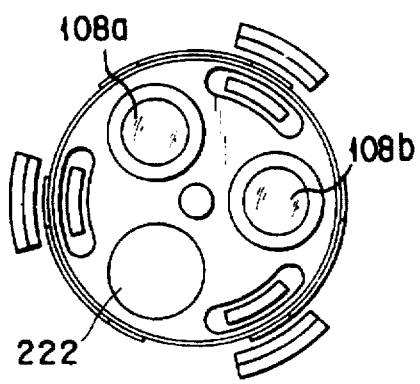

In the fifth, sixth, eighth, ninth, eleventh, and twelfth embodiments, a counterweight may be arranged in place of an objective lens on the first movable member. As is apparent from the plan views of FIGS. 28A, 28B, and 28C, the two objective lenses 108a and 108b and one counterweight 222 are arranged such that the center-of-gravity position of the first movable member 105 almost coincides with the rotating shaft 107. More specifically, mass adjustment is performed by using the counterweight 222 having a mass equal to the average value of the masses of the two objective lenses 108a and 108b. In other respects, the structures of these modifications shown in FIGS. 28A, 28B, and 28C are the same as those of the fifth, eight, and eleventh embodiments.

Figure 28D:
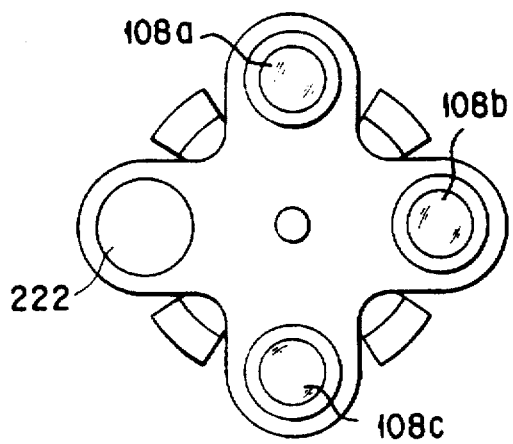
Figure 28E:
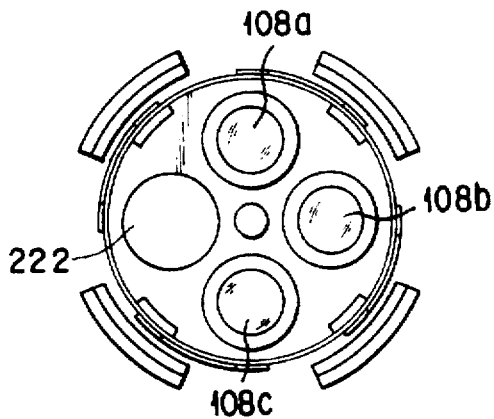
Figure 28F:
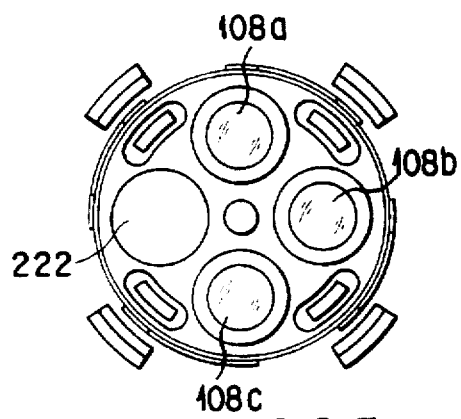

Similarly, in each of the modifications shown in FIGS. 28D, 28E, and 28F, the three objective lenses 108a, 108b, and 108c and one counterweight 222 are arranged such that the center-of-gravity position of the first movable member 105 almost coincides with the rotating shaft 107. In other respects, the structures of these modifications are the same as those of the sixth, ninth, and twelfth embodiments.

In each of the modifications shown in FIGS. 29A, 29B, and 29C, the two objective lenses 108a and 108b and two counterweights 222a and 222b are arranged such that the center-of-gravity position of the first movable member 105 almost coincides with the rotating shaft 107. In other respects, the structures of these modification are the same as those of the sixth, ninth, and twelfth embodiments.

According to these modifications, although the numbers of objective lenses mounted are smaller than those in the fourth to twelfth embodiments, respectively, the same effects can be expected.

In addition, the modifications shown in FIGS. 28B and 28D may employ a modification of the tracking drive operation of the first movable member 105, which will be described below.

Figure 30A:
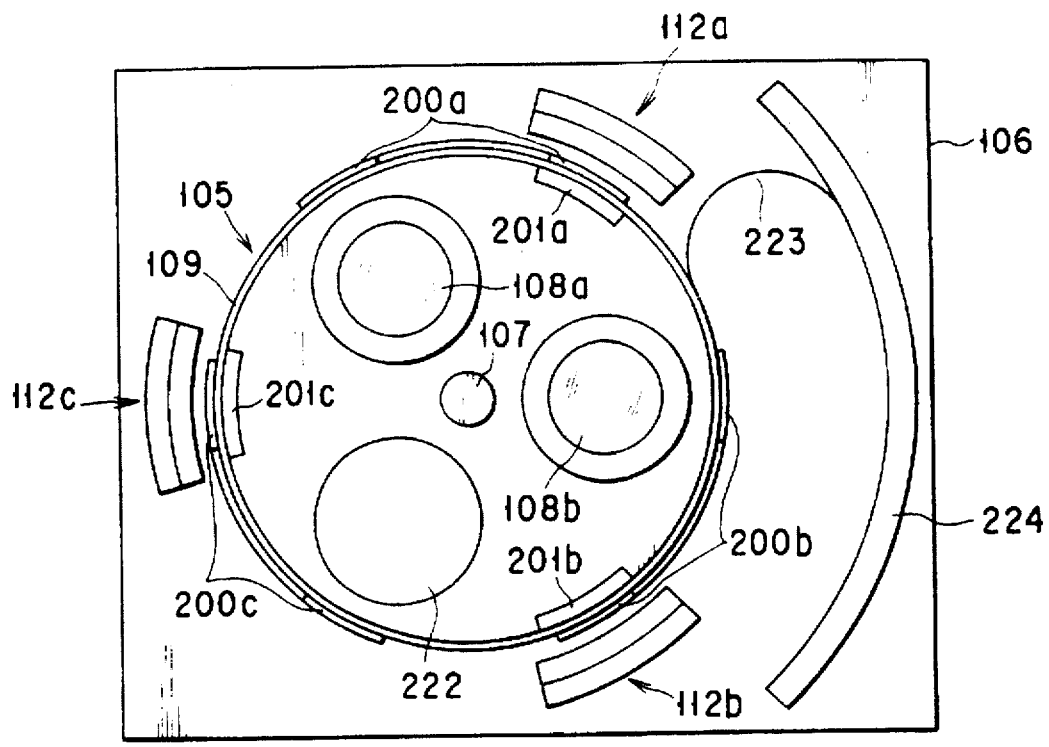
FIGS. 30A and 30B are plan views, each showing an example of using a flexible print board in the modification shown in FIG. 28B.
Figure 30B:
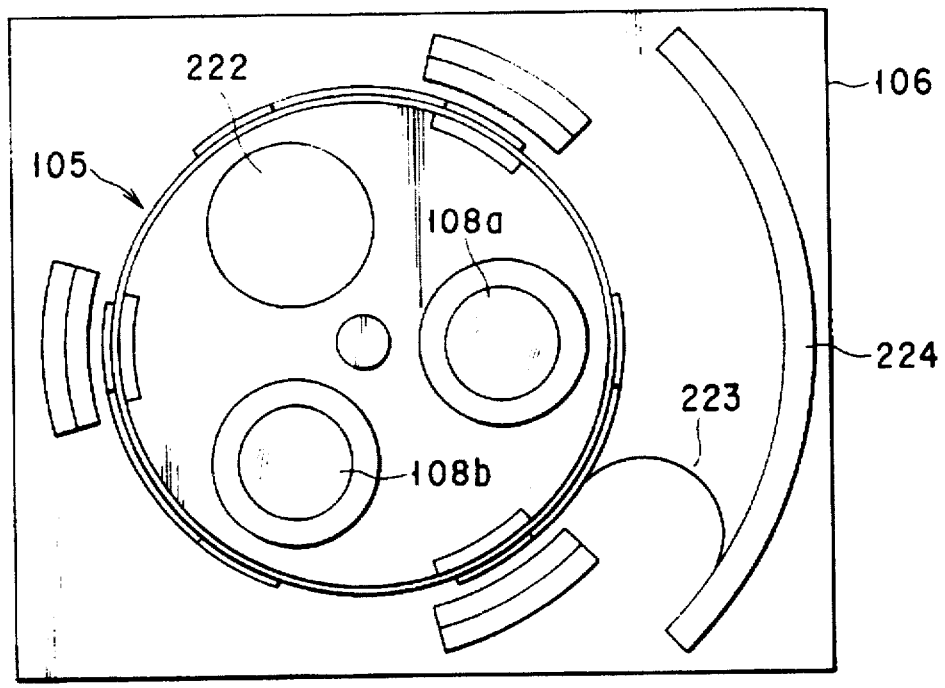

In the optical head shown in FIGS. 30A and 30B, a flexible print board 223 extends from a side surface of the first movable member 105. One end of the flexible print board 223 is fixed to the first movable member 105. The other end of the flexible print board 223 is fixed to a guide plate 224 extending vertically from the second movable member 106. The flexible print board 223 is formed to be sufficiently long in consideration of a displacement (trace deformation) upon rotation of the first movable member 105. Note that the flexible print board 223 serves to supply a current to the focus coil 109 and a tracking coil 200 and is connected to the control system via the guide plate 224 and the second movable member 106. In addition, the side surface of the first movable member 105 and the inner surface of the guide plate 224 are concentric with respect to the rotating shaft 107 as the center, and the gap length between the surfaces is made constant.

In this modification, as is apparent from a change from the state in FIG. 30A to the state in FIG. 30B, the rotational angle of the first movable member 105 which is required to switch the objective lenses 108a and 108b is 120°. On the other hand, the required moving amount of the flexible print board 223 is about 60°, which is not larger than ½ the required rotational angle of the first movable member 105. Therefore, this flexible print board 223 can be arranged between the magnetic circuits 112a, 112b, and 112c (arranged at almost 60°-intervals). In this arrangement, the magnetic circuits 112a, 112b, and 112c do not become obstacles.

In addition, the flexible print board 223 is deformed into a U-shape to always apply a predetermined pressure (pressing force) to the first movable member 105 and the guide plate 224. This pressing force always biases the first movable member 105 in the direction of the rotating shaft 107 regardless of a change in the rotational angle of the first movable member 105. For this reason, no pressure is applied to the first movable member 105 in the rotating direction, and no unnecessary restitutive force is generated upon rotation of the first movable member 105. Therefore, tracking control is free from adverse effects.

With the above arrangement, a wiring pattern required to supply power to the focus coil 109 and the tracking coil 200 can be easily and effectively formed.

Figure 31A:
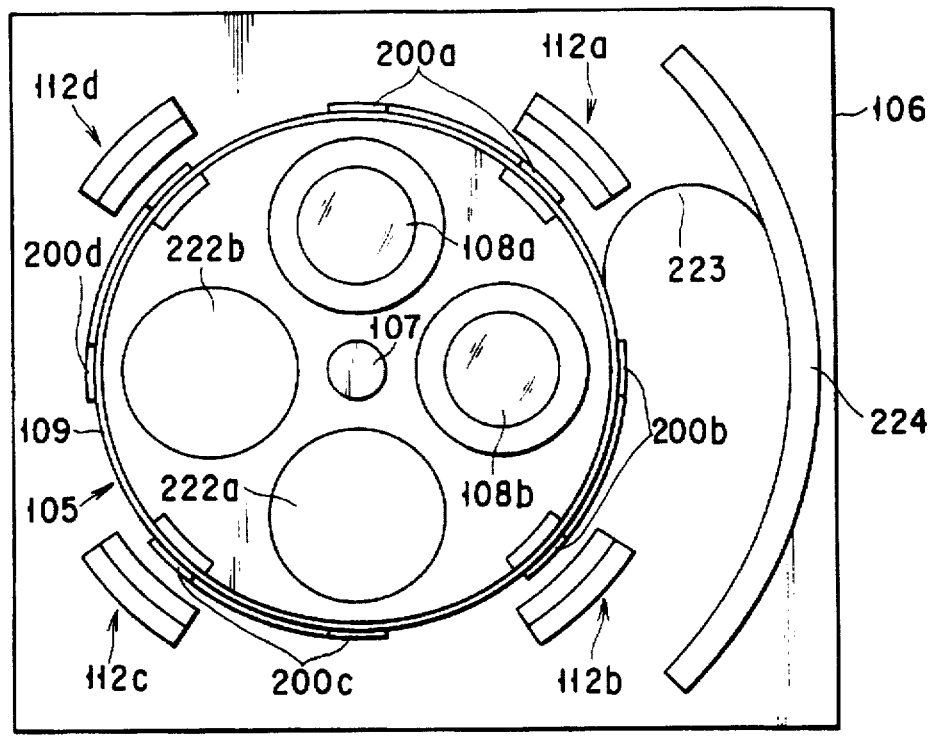
FIGS. 31A and 31B are plan views, each showing an example of using a flexible print board in the modification shown in FIG. 29B.
Figure 31B:
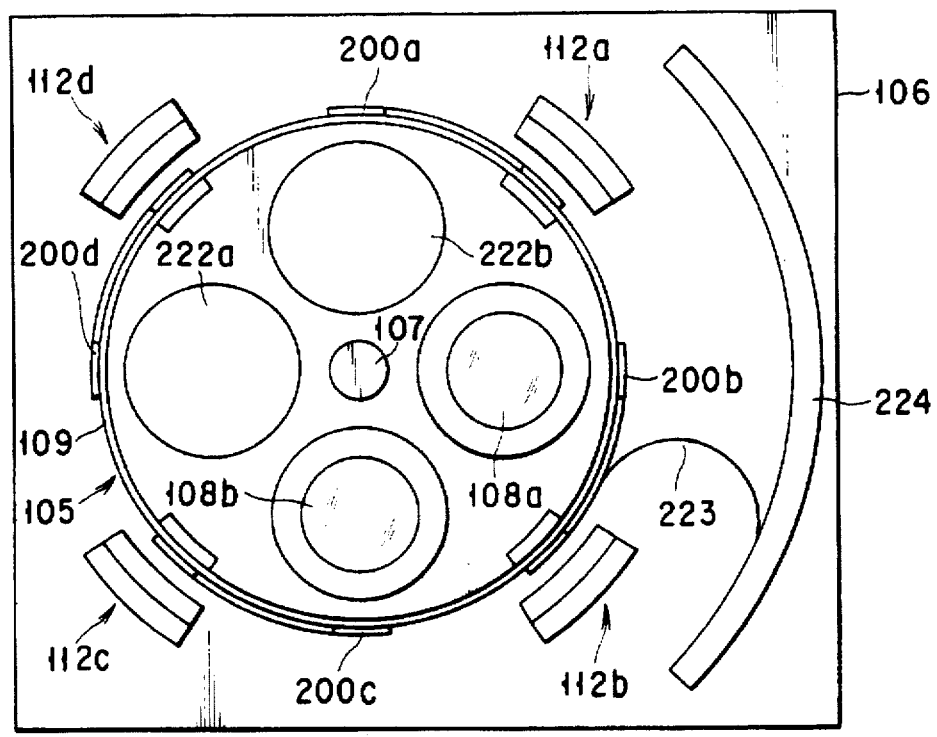

In addition, the same effects as described above can be expected from the movable member 105 having the two objective lenses 108a and 108b and the two counterweights 222a and 222b as in the optical head shown in FIGS. 31A and 31B. In this modification, the rotational angle of the first movable member 105 which is required to switch the objective lenses 108a and 108b is 90°, and the required moving amount of the flexible print board 223 is 45°. In this case as well, the flexible print board 223 can be arranged between the magnetic circuits 112a, 112b, 112c, and 112d (arranged at almost 90°-intervals). In this arrangement, the magnetic circuits 112a, 112b, 112c, and 112d do not become obstacles.

The same effects as those in the modification shown in FIGS. 30A and 30B can be expected from this modification.

[Thirteenth Embodiment]

Figure 34:
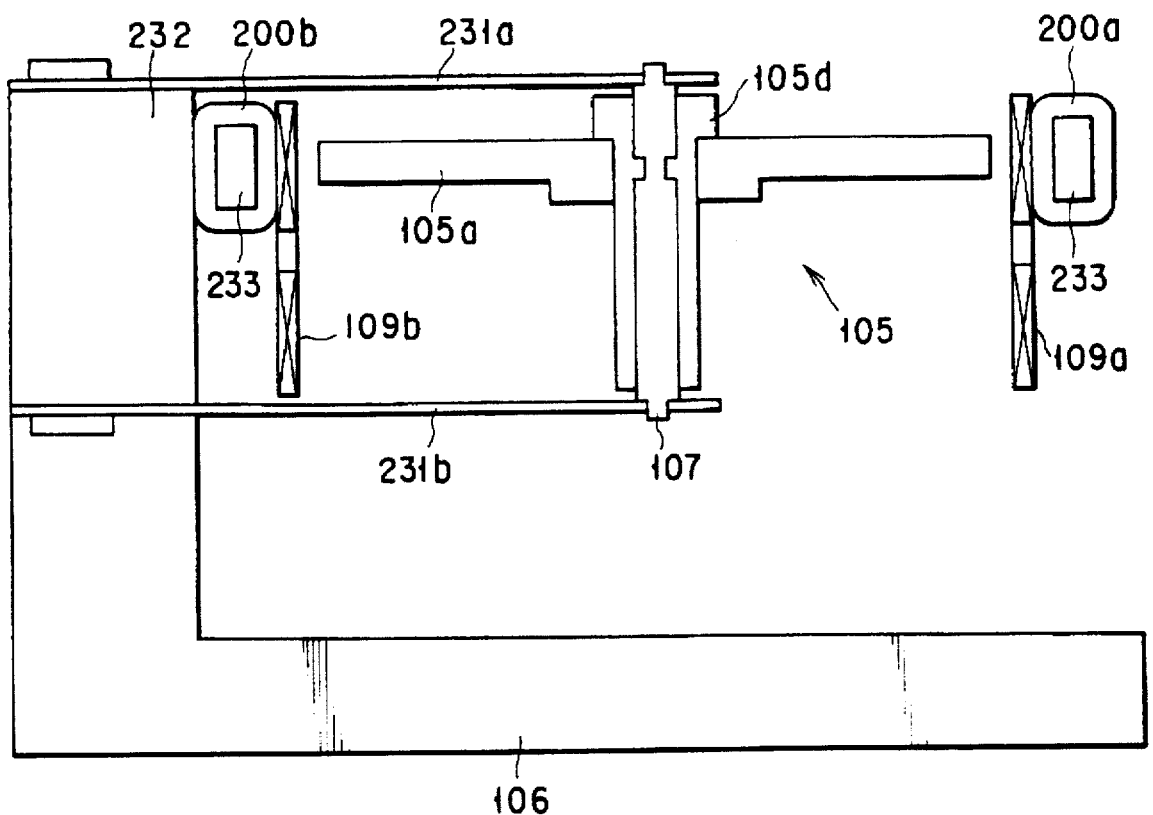
FIG. 34 is a sectional view taken along a line B–B' in FIG. 32.
Figure 35:
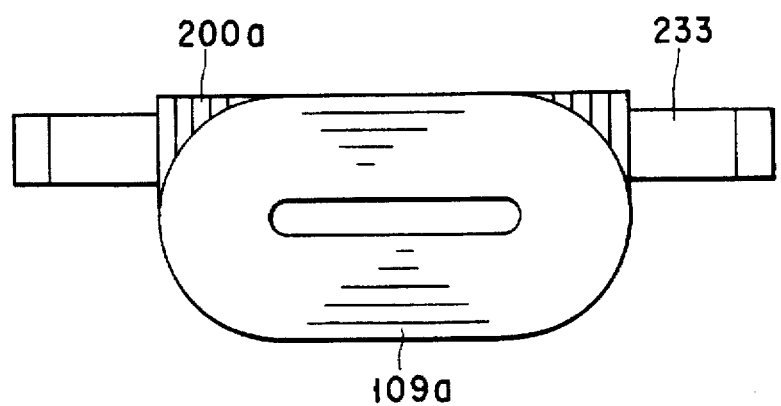
FIG. 35 is a sectional view taken along a line C–C' in FIG. 32.

An optical head according to the thirteenth embodiment of the present invention will be described next with reference to FIGS. 32 to 35. FIG. 32 is a plan view of the optical head. FIG. 33 is a sectional view taken along a line A–A' of a first movable member in FIG. 32. FIG. 34 is a sectional view taken along a line B–B' of the optical head in FIG. 32. FIG. 35 is a sectional view taken along a line C–C' of the optical head in FIG. 32.

In the optical head of this embodiment, the shape of each constituent element is slightly different from that in each embodiment described above. This will be described in detail below.

A first movable member 105 includes a blade 105a having projections at two positions with respect to a rotating shaft 107 as the center. Two objective lenses 108a and 108b are arranged to protrude from the blade 105a at two positions spaced apart from these two projections by 90°.

As shown in FIG. 33, the objective lenses 108a and 108b are mounted at different positions in the axial direction of the rotating shaft 107. In this case, the objective lens 108a located near a disk 101 has a larger numerical aperture (NA) than the objective lens 108b located far from the disk 101.

A rotating shaft bearing 105d is fixed in the center of the blade 105a. The rotating shaft 107 is engaged with the rotating shaft bearing 105d. With this arrangement, rotational movement of the blade 105a about the rotating shaft 107 is allowed. Note that a circumferential groove is formed in the rotating shaft 107 at a position near the middle point in the axial direction, thereby restricting translation of the blade 105a in the axial direction of the rotating shaft 107.

The upper and lower end portions of the rotating shaft 107 are rotatably fitted to one end of a leaf spring 231a and one end of a leaf spring 231b, respectively. The two leaf springs 231a and 231b are arranged to be parallel to each other so as to constitute a parallel leaf spring mechanism. The other end of each of the leaf springs is fixed to a second movable member 106 via a fixing member 232. Therefore, the first movable member 105 can be translated in the axial direction of the rotating shaft 107 while being suspended from the second movable member 106 via the parallel leaf springs 231a and 231b. Note that the fixing member 232 is inserted as a member for maintaining the parallelism between the leaf springs 231a and 231b.

The rotating shaft bearing 105d is manufactured by the following method. Outsert molding of a resin such as a plastic material is performed with respect to the rotating shaft 107, and a clearance formed by the difference in contraction ratio between the resin and the rotating shaft 107 in this molding process is used as a small gap, thereby forming the rotating shaft bearing 105d. By this manufacturing method, the rotating shaft bearing 105d can be formed, which causes little backlash and prevents easy occurrence of aberrations due to a tilt of an objective lens, thereby obtaining proper signals.

Since the structure and operation of the second movable member 106 are the same as those in the first embodiment, a description thereof will be omitted.

In this case, the blade 105a is made of a rare-earth element or a neodymium magnet (or a plastic magnet consisting the same material) and is magnetized from the rotating shaft 107 toward the projections. An annular yoke 233 having a substantially rectangular ring-like shape is formed around the blade 105a. Cylindrical tracking coils 200a and 200b and booster coils 234a and 234b are alternately arranged on the middle portions of the respective sides of the yoke 233 so as to be wound therearound. In the neutral state shown in FIG. 32, the projections of the blade 105a oppose the tracking coils 200a and 200b and the booster coils 234a and 234b. In addition, rectangular focus coils 109a and 109b, each of which is two-dimensionally wound, are bonded to the surfaces of the tracking coils 200a and 200b. FIG. 35 (a sectional view taken along a line C–C' in FIG. 32) shows the positional relationship between the tracking coils 200a and 200b and the focus coils 109a and 109b. Note that the annular yoke 233 is fixed to the second movable member 106 via the fixing member 232.

According to this embodiment having the above structure, the blade 105a itself is a magnetic member and part of a magnetic circuit. For this reason, when focus coils 109a and 109b or the tracking coils 200a and 200b are energized, a Lorentz force is generated. As a result, the first movable member 105 is slightly driven in the direction of thickness or radial direction of the disk 101.

In this embodiment, the parallel leaf springs 231a and 231b are used. Therefore, the first movable member 105 can be moved in the focus direction without impairing the parallelism between the optical axes of the objective lenses 108a and 108b due to deformation of the parallel leaf springs 231a and 231b.

The first movable member 105 is moved in the tracking direction and rotated about the rotating shaft 107 as in the fourth embodiment. Since the small gap between the rotating shaft bearing 105d and the rotating shaft 107 is set to be 10 micron or less, a mount position offset between the objective lenses 108a and 108b is set on a negligible level.

In addition, since the projections are formed at the two positions on the blade 105a, when the objective lens 108 is guided onto an optical path 141, the two projections are located nearest to the yoke 233 to coincide with the magnetic central position. Since a magnetically stable point is set when magnetic fields are present at the booster coils 234a and 234b as well as at the tracking coils 200a and 200b, accurate synchronization can be established without using any means for measuring the position of a magnetic pole, such as a Hall element, as in a general motor.

The same method as the method of instantaneously supplying a large current to the tracking coils in the fourth embodiment is applied to the booster coils 234a and 234b (i.e., a control signal from the objective lens selector 131 in FIG. 18 is supplied to the booster coils 234a and 234b) to generate kick pulses at predetermined intervals, thereby rotating the first movable member 105 at 90°-intervals.

Furthermore, since the permanent magnet and the coils are respectively arranged on the movable and stationary portions of the optical head, a wiring pattern for supplying power to the coils can be easily formed. Therefore, the first movable member 105 can be easily rotated through 180° or more. In addition, since the permanent magnet is used as the blade 105a, the rigidity of the optical head is high to obtain good vibration characteristics, thus obtaining great practical effects.

A method of mounting the objective lenses will be described next. The center axis of the parallel leaf springs 231a and 231b coincides with a direction perpendicular to a line segment connecting the centers of the two objective lenses 108a and 108b in the state shown in FIG. 32 (one objective lens 108a or 108b is on the optical path 141). As described above, the objective lens 108a is mounted at a level higher than that of the objective lens 108b. As shown in FIG. 33, while the parallel leaf springs 231a and 231b are in a neutral state, the upper surface of the objective lens 108a is located above the lower surface of the upper leaf spring 231a, and the objective lens 108b is located between the two leaf springs 231a and 231b.

At the same time, in this arrangement, movement of each objective lens is controlled such that the objective lens 108a is rotated in a direction in which it does not interfere with the leaf springs 231a and 231b, and the objective lens 108b is rotated in the gap between the leaf springs 231a and 231b.

Letting $L_1$ be the operating range (maximum operating distance) of the objective lens 108a, and $L_2$ be the operating range (maximum operating distance) of the objective lens 108b, $L_2$ is larger than $L_1$ in consideration of interference with the leaf springs 231a and 231b. A difference L between the levels at which the two objective lenses 108a and 108b are mounted is represented by $$L \leq L_2 - L_1$$

When the objective lens 108a is used, the distance between the surface of the disk 101 and the objective lens 108a is the distance $L_1$, and the distance between the objective lens 108b and the disk 101 is given by $$L_1 + L$$

When the objective lens 108b is used, the distance between the surface of the disk 101 and the objective lens 108a is given by $$L_2 - L$$

At this time, the distance between the objective lens 108b and the disk 101 is the distance $L_2$.

In this case, L represents the difference between the levels at which the objective lenses 108a and 108b are mounted. When the difference L is a positive value, the objective lens 108a is closer to the disk 101 than the objective lens 108b. At this time, a minimum distance D to the first movable member 105 is given by $$D = \text{MINIMUM } (L_1, L_1+L, L_2-L, L_2)$$

If $L_2 > L_1$, then D=MINIMUM $(L_1, L_1+L, L_2-L)$. If $L<0$, then $D=L_1+L<L_1$. If $0<L\leq(L_2-L_1)$, then $D=L_1$. If $L_2-L_1<L$, then $D=L_2-L<L_1$. As is apparent, when L is given by $L \leq L_2-L_1$, the minimum distance D is maximized and coincides with the distance $L_1$.

The probability of collision between the objective lenses 108a and 108b, therefore, can be minimized by setting the difference L (between the levels at which the objective lenses 108a and 108b are mounted) to satisfy the above inequality.

Assume that the actual mounted states of the objective lenses 108a and 108b contradict the neutral positions in the respective operating ranges. In this case, in order to correct such deviations, a DC current must be constantly supplied to position the objective lenses 108a and 108b in the focus direction. In this embodiment, however, as described above, since the levels at which the objective lenses 108a and 108b are to be mounted are set in correspondence with the respective operating ranges, the power consumption of the unit can be reduced.

In addition, collision between the objective lenses 108a and 108b and the disk 101 can be prevented, and damage such as flaws on the disk 101 can be prevented.

As is apparent, a method of providing a deviation between the positions of the objective lenses 108a and 108b in the optical axis direction is not limited to the method of elastically supporting the first movable member 105 with the parallel leaf springs 231a and 231b as in this embodiment, but other methods such as an axial sliding method may be used.

[Fourteenth Embodiment]

Figure 36:
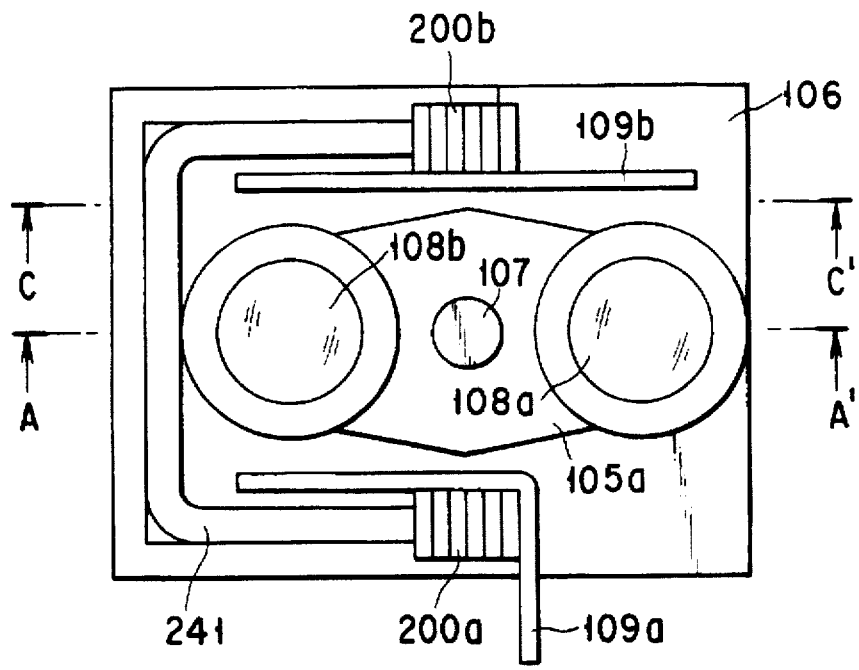
FIG. 36 is a plan view of a movable portion of an optical head according to the fourteenth embodiment of the present invention.
Figure 37:
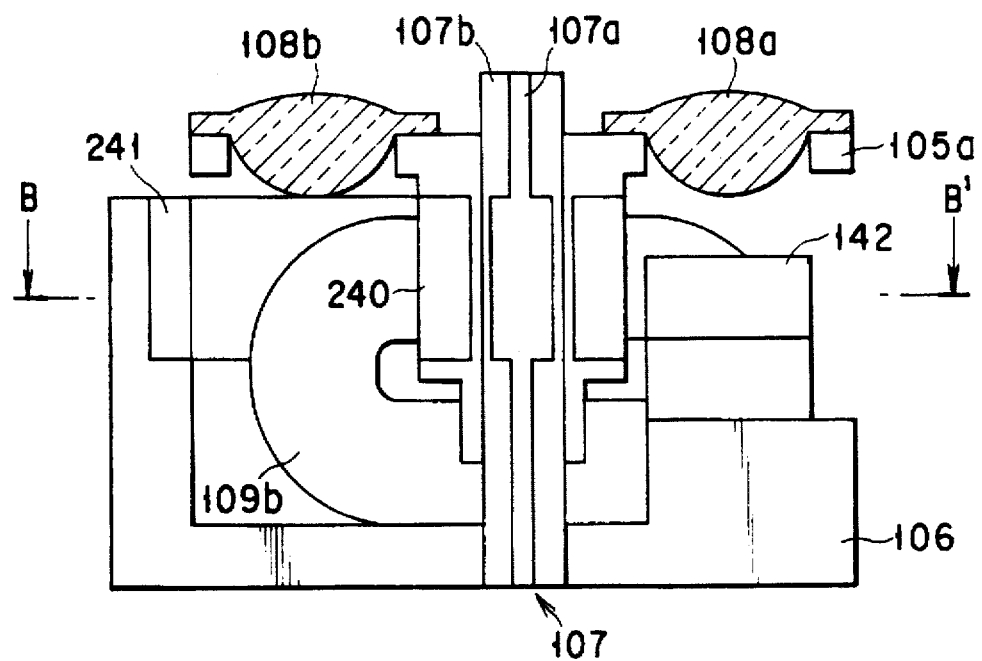
FIG. 37 is a sectional view taken along a line A–A' in FIG. 36.
Figure 38:
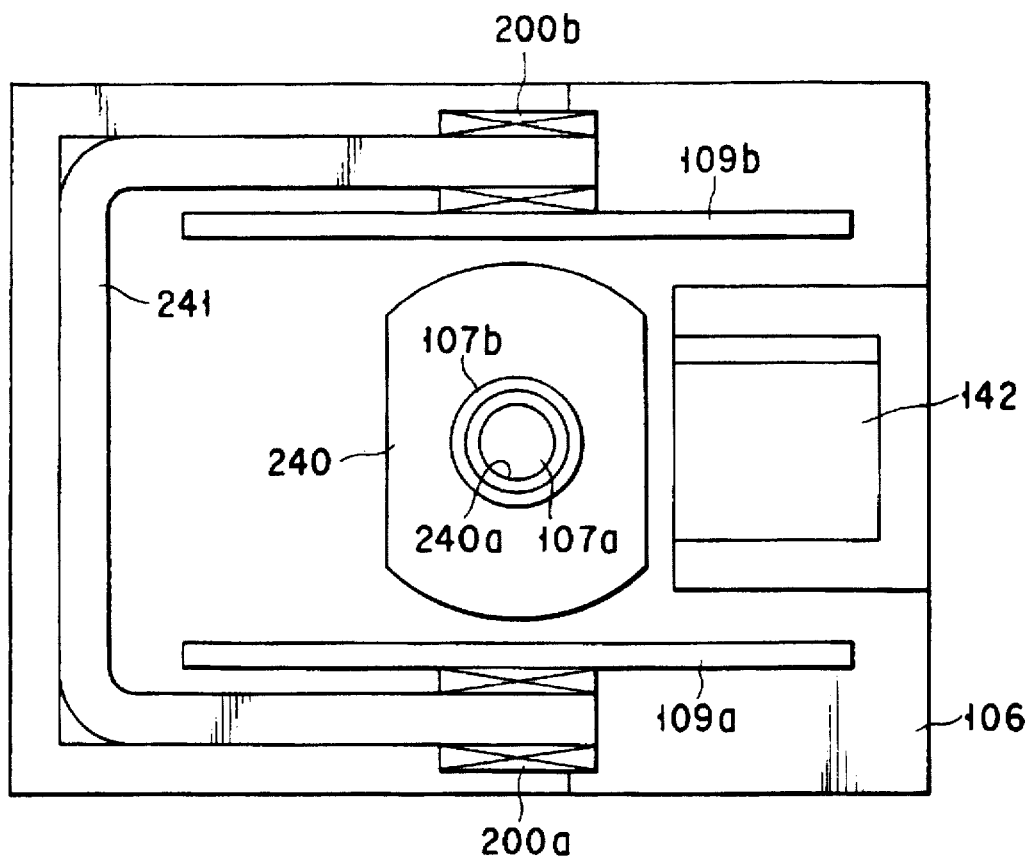
FIG. 38 is a partially sectional view taken along a line B–B' in FIG. 37.
Figure 39:
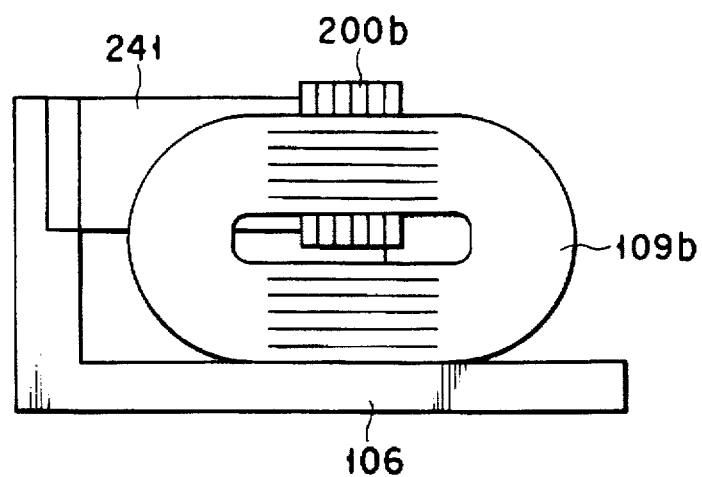
FIG. 39 is a sectional view taken along a line C–C' in FIG. 36.

An optical head according to the fourteenth embodiment of the present invention will be described below with reference to FIGS. 36 to 39. FIG. 36 is a plan view of the optical head. FIG. 37 is a sectional view taken along a line A-A' of the optical head in FIG. 36. FIG. 38 is a partially sectional view taken along a line B-B' of the optical head in FIG. 37. FIG. 39 is a sectional view taken along a line C-C' in FIG. 36.

This embodiment is different from the thirteenth embodiment in the structure of a first movable member 105. The first movable member 105 has a blade 105a at a position to oppose the surface of a disk 101, and a permanent magnet 240 fixed to the lower portion of the blade 105a. In this embodiment, the blade 105a is made of a composite material consisting of carbon and a resin having excellent sliding characteristics and high rigidity, such as a liquid crystal polymer, an epoxy resin, or a polyphenylenesulfite resin. As is apparent from the sectional view of FIG. 37, the permanent magnet 240 is formed into a substantially elliptic shape with a hole 240a being formed in the center. The two ends of the permanent magnet 240 in the longitudinal direction are magnetized to the N and S poles, respectively. The permanent magnet 240 is finished to be axially symmetrical. The blade 105a and the permanent magnet 240 are integrally manufactured as the first movable member 105 by injection molding.

A rotating shaft 107 is constituted by a magnetic core 107a as a central portion, and a coating portion 107b around the magnetic core 107a. Since an intermediate portion of the magnetic core 107a, i.e., a fitting portion with respect to the permanent magnet 240, is large in diameter, magnetic fluxes flow more in this portion than in other portions of the permanent magnet 240. Therefore, the neutral position of the first movable member 105 in the axial direction is magnetically determined.

As a material for the coating portion 107b, a composite resin consisting of a resin such as an epoxy resin, carbon, and mica is used. By selecting such a material, the coating portion 107b has a high hardness and excellent sliding characteristics.

FIG. 39 (a sectional view taken along a line C–C' in FIG. 36) shows the positional relationship between tracking coils 200a and 200b and focus coils 109a and 109b. In this embodiment, no booster coil is used, and a large current is instantaneously supplied to the tracking coils 200a and 200b as in the fourth embodiment.

An optical unit 120 (not shown) is not fixed to a movable member 104 but is fixed to a base 102 (a so-called separate optical system is employed). For this reason, a laser beam LB is guided from the radial direction of the disk 101 and deflected at 90° by a reflecting mirror 142 fixed to a second movable member 106 so as to be guided to an objective lens 108. As shown in FIG. 36, the focus coil 109a is partly bent to ensure the optical path of the laser beam LB from this stationary optical system.

A magnetic flux flowing from the permanent magnet 240 to the focus coil 109a (tracking coil 200a) passes through a U-shaped yoke 241 to form a magnetic path extending from the opposing focus coil 109b (tracking coil 200b) to the permanent magnet 240. By using this magnetic path, the neutral positions of the objective lenses 108a and 108b in a recording/reproducing operation is determined.

A Lorentz force is generated by currents flowing in the tracking coils 200a and 200b of the magnetic circuit constituted by the U-shaped yoke 241 and the permanent magnet 240. As a result, the first movable member 105 is finely driven in the direction of thickness and radial direction of the disk 101.

According to this embodiment having the above arrangement, the following effects can be obtained. In this embodiment, with only one permanent magnet, the first movable member 105 can be driven in both the focus and tracking directions, and a driving force for switching the objective lenses 108a and 108b can also be generated. Therefore, the number of relatively expensive permanent magnets used is decreased to reduce the manufacturing cost of the head.

In addition, for example, a coil opposing the S pole is located far away from an end face of the reverse polarity, i.e., the N pole, so that a magnetic field of the S pole effectively acts on the coil. That is, the intensity of a magnetic field at a portion where an electromagnetic interaction between the permanent magnet and the coil occurs is increased as compared with the case wherein two permanent magnets are bonded to oppose each other.

Furthermore, as in the tenth embodiment described above, since the permanent magnet and the coil are respectively arranged on the movable and stationary portions of the unit, a wiring pattern for supplying power to the coil can be easily formed. In this embodiment, as in the fourth embodiment, since a shaft sliding method is used for a driving operation in the focus direction, the first movable member 105 may be rotated clockwise or counterclockwise to switch the objective lenses 108a and 108b. In principle, the first movable member 105 can be rotated through 360°. The fourteenth embodiment realizes "switching of the objective lenses by one-way rotation" which cannot be realized by any of the embodiments described above. Therefore, the possibility that the unit fails because of an operation error is greatly reduced.

[Fifteenth Embodiment]

Figure 40:
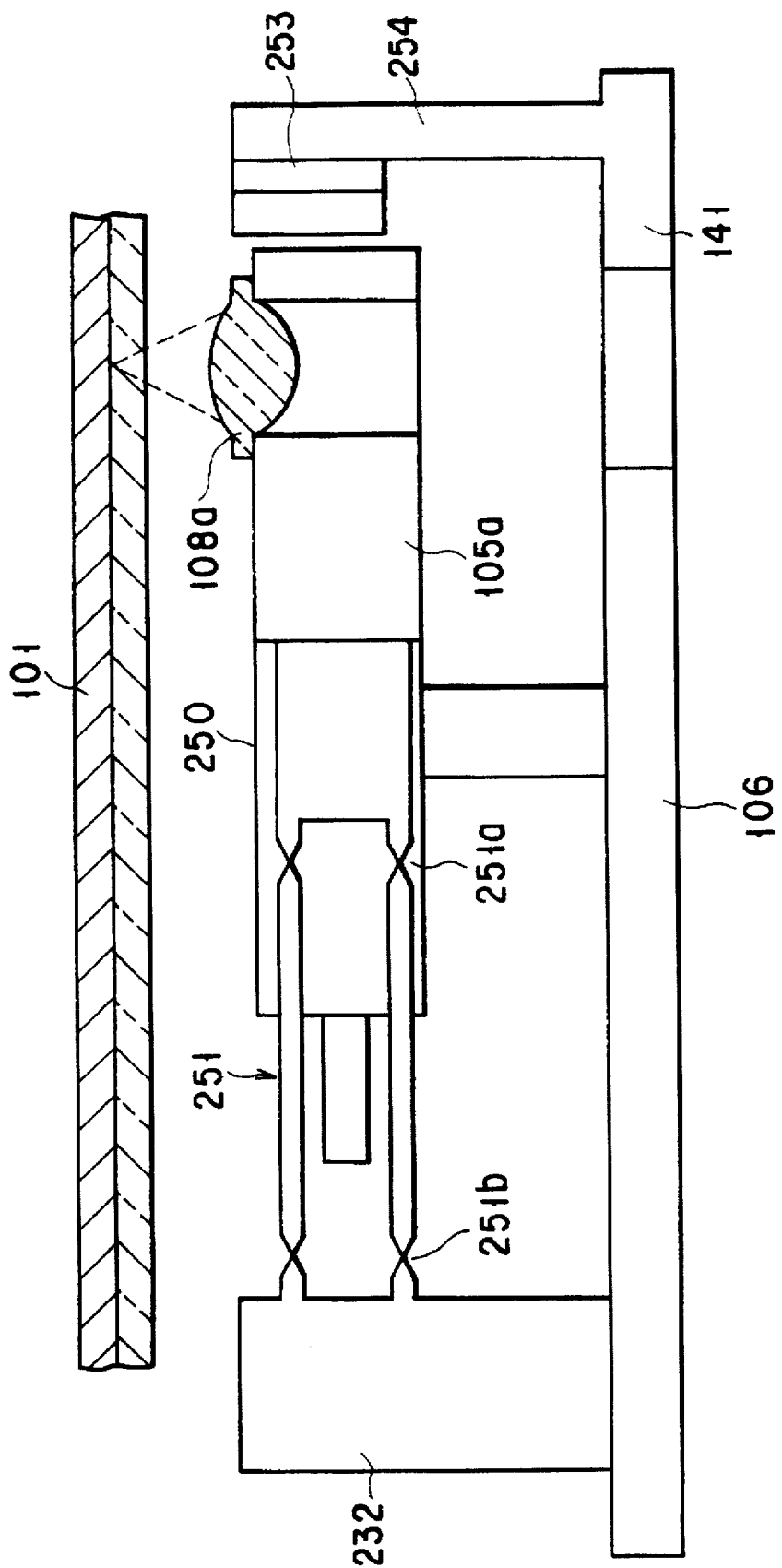
FIG. 40 is a sectional view of a movable portion of an optical head according to the fifteenth embodiment of the present invention.
Figure 41:
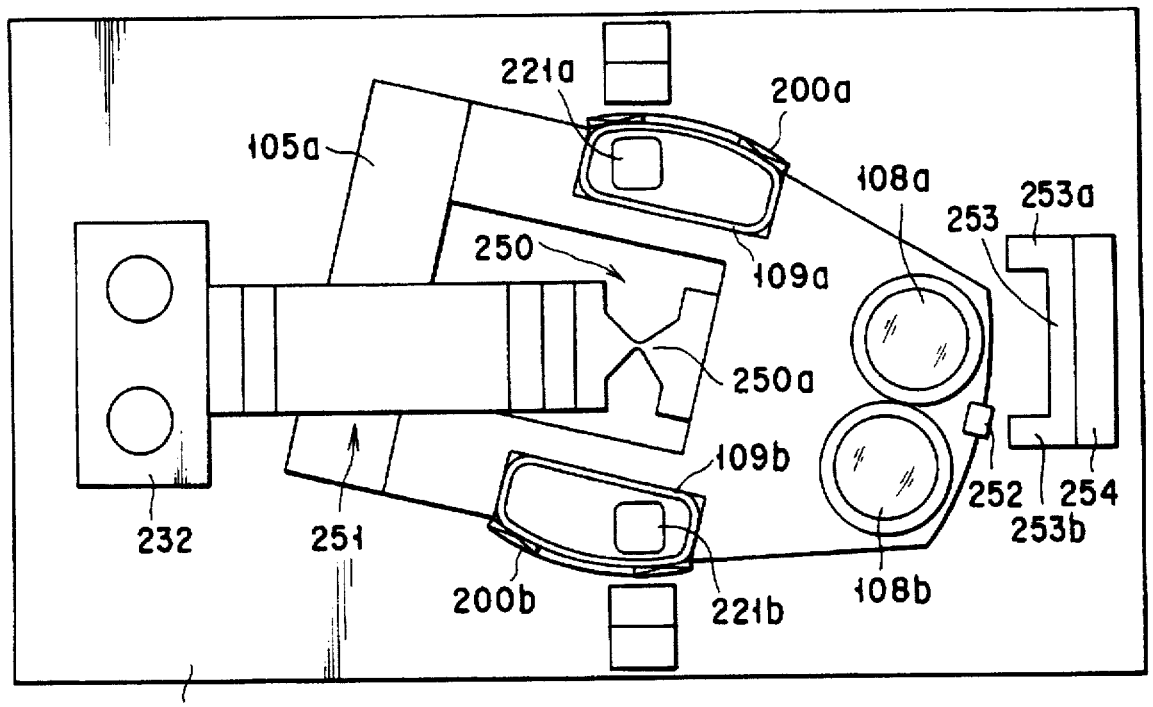
FIG. 41 is a plan view showing an operation state of the fifteenth embodiment.
Figure 42:
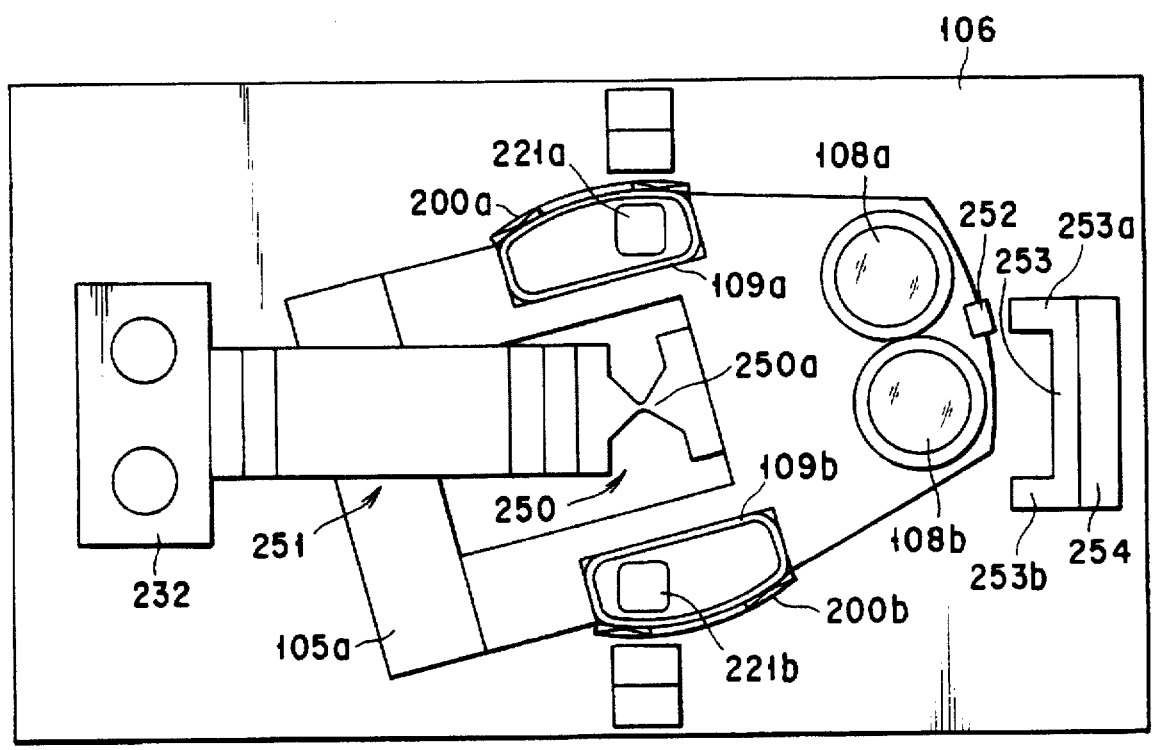
FIG. 42 is another plan view showing an operation state of the fifteenth embodiment.

An optical head according to the fifteenth embodiment of the present invention will be described below with reference to FIGS. 40 to 42. FIG. 40 is a sectional view of the optical head. FIGS. 41 and 42 are plan views showing the operation states of the optical head.

The fifteenth embodiment is different from the fourteenth embodiment in a support mechanism for a first movable member 105. More specifically, a hinge mechanism is employed for displacements in the axial direction of the first movable member 105 and around its axis. The positions where two objective lenses 108a and 108b are mounted on the first movable member 105 are very close to each other as compared with other embodiments.

As shown in FIGS. 41 and 42, in this embodiment, one end of a first hinge member 250 is fixed to the central portion of the first movable member 105. The first hinge member 250 has a low-profile hinge 250a. The position of the hinge 250a coincides with the center-of-gravity position of the first movable member 105. The first hinge member 250 is designed to allow rotation of the first movable member 105 within a finite angle range.

The other end of the first hinge member 250 is fixed to one end of a second hinge member 251. As shown in FIG. 40, the second hinge member 251 has a four-joint hinge mechanism with hinges 251a and 251b arranged at two positions. The other end of the second hinge member 251 is fixed to the second movable member 106 via a fixing member 232. The second hinge member 251 is designed to allow translation of the first movable member 105 in the axial direction.

Notches are formed near side portions of the first movable member 105, and focus coils 109a and 109b, each wound in the annular shape, are fitted/fixed in the notches. Rectangular tracking coils 200a and 200b, each wound two-dimensionally, are fixed on the surfaces of the annular focus coils 109a and 109b. Centeryokes 221a and 221b are inserted in the annular spaces respectively defined by the focus coils 109a and 109b. At the neutral position of each selected one of the objective lenses 108a and 108b, the two opposing side portions of the tracking coils 200a and 200b (portions extending vertically in FIG. 40) are located in a magnetic gap.

A magnetic member 252 made of an iron piece is mounted on the distal end portion of the first movable member 105. A yoke 253 and a permanent magnet 254 are arranged to oppose the magnetic member 252 and fixed on a second movable member 106. In this case, the yoke 253 has a substantially U-shape with projections 253a and 253b formed at two positions.

The two objective lenses 108a and 108b are fixed to the first movable member 105 at positions close to each other. When the magnetic member 252 opposes one projection 253b of the yoke 253, the objective lens 108a is positioned on the center axis (FIG. 41). When the magnetic member 252 opposes the other projection 253a of the yoke 253, the objective lens 108b is positioned on the center axis (FIG. 42). Note that in the states shown in FIGS. 41 and 42, the objective lenses 108a and 108b are respectively arranged on an optical path 141.

The operation of this embodiment will be described next.

The basic operation principle of the first movable member 105 is almost the same as that of each embodiment described above. In this embodiment, the first movable member 105 is moved in the focus direction by deforming the two hinges 251a and 251b of the second hinge member 251. When the first movable member 105 is to be moved in the tracking direction, the hinge 250a of the first hinge member 250 is deformed.

In this case, the hinge 250a of the first hinge member 250 can be rotated through about 10° in two directions with respect to the center axis, i.e., a total of about 20°. With this change in angle, the two objective lenses 108a and 108b can be switched.

While the objective lens 108a is in an operation state, the magnetic member 252 opposes one projection 253b. While the objective lens 108b is in an operation state, the magnetic member 252 opposes the other projection 253a. For this reason, the positions where the two objective lenses 108a and 108b are used become magnetically stable points. In this case, the magnetic member 252 is located on the objective lens side with respect to the first hinge member 250 and is located on the opposite side to the four-joint hinge member 251. Therefore, magnetic attraction forces act in the directions in which the hinges 251a and 251b are extended by magnetic attraction. These directions are opposite to the directions in which the hinges 251a and 251b are pushed, i.e., the hinges 251a and 251b are bent. For this reason, the overall first movable member 105 tends to restore the neutral position in the axial direction. As a result, the driving characteristics in the focus direction are greatly stabilized.

[Sixteenth Embodiment]

Figure 43:
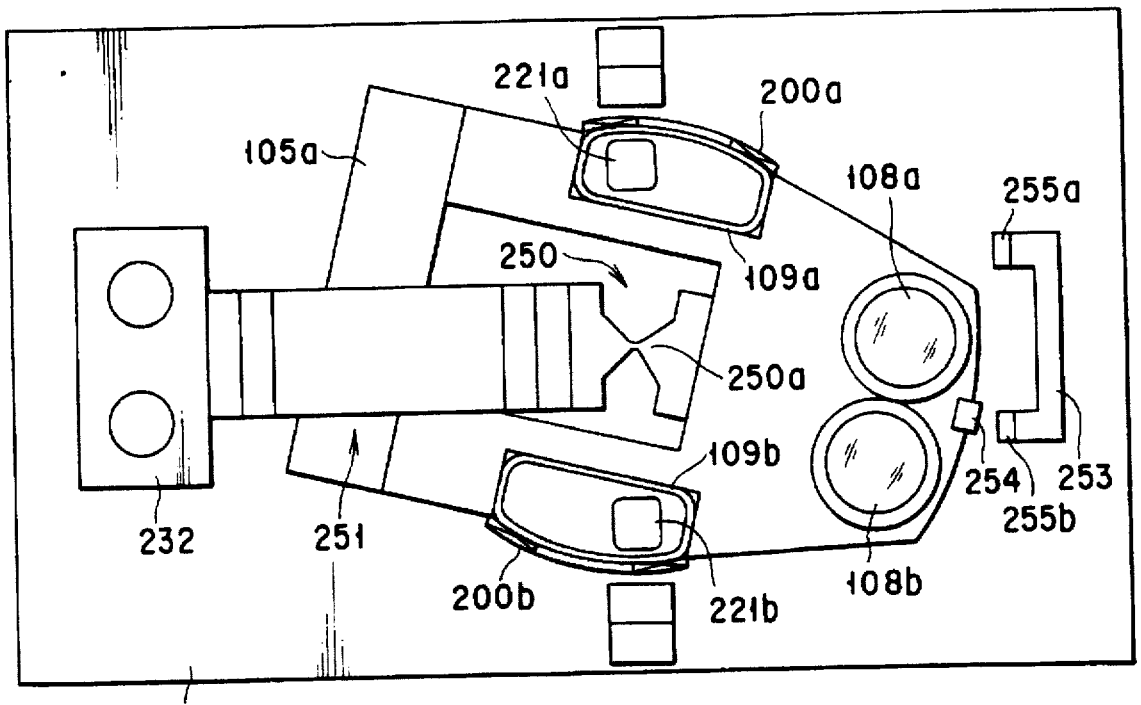
FIG. 43 is a plan view showing an operation state of an optical head according to the sixteenth embodiment of the present invention.
Figure 44:
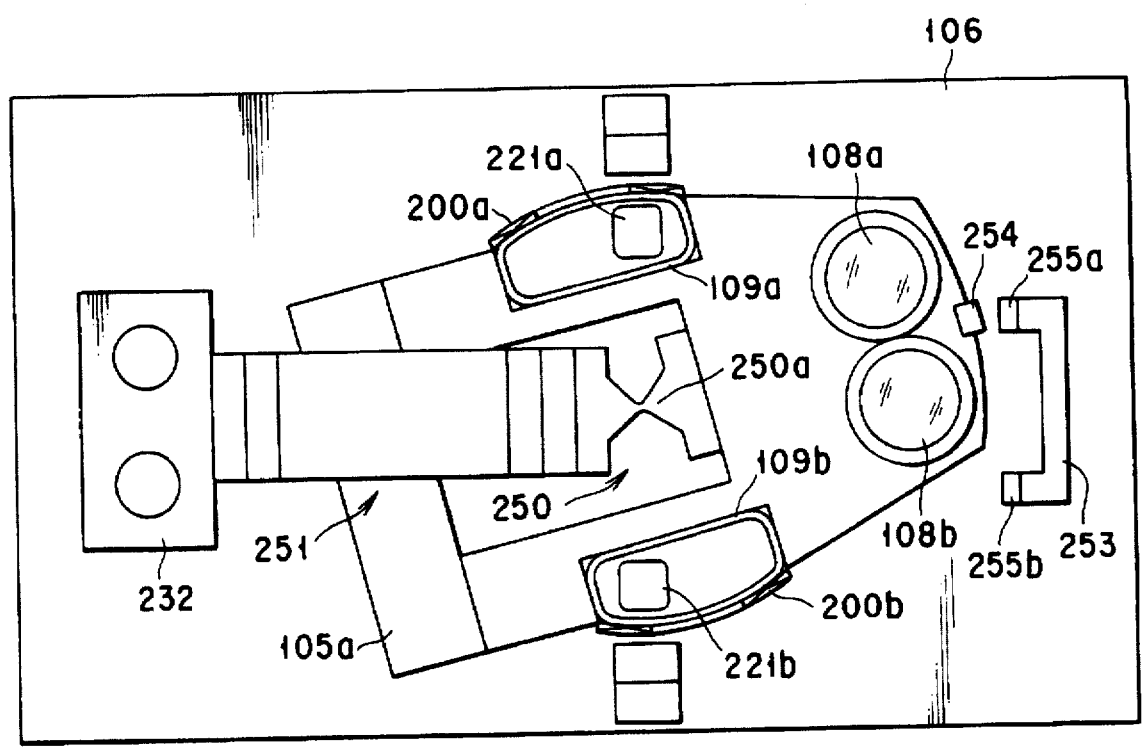
FIG. 44 is a plan view showing an operation state of the sixteenth embodiment.

An optical head according to the sixteenth embodiment of the present invention will be described next with reference to FIGS. 43 and 44.

This embodiment is different from the thirteenth embodiment in a positioning mechanism for objective lenses 108a and 108b. More specifically, in the fifteenth embodiment, the magnetic member 252 is mounted on the first movable member 105, and the permanent magnet 254 is mounted on the second movable member 106 via the yoke 253. In the sixteenth embodiment, a permanent magnet 254 is mounted on a first movable member 105, and a yoke 253 is mounted on a second movable member 106.

Note that since the cross-section of the optical head of the sixteenth embodiment is almost the same as that of the fifteenth embodiment (see FIG. 40), a description thereof will be omitted.

Magnetic sensors 255a and 255b such as Hall elements are fixed at the positions where the projections 253a and 253b are formed. With the magnetic sensors 255a and 255b, which one of the objective lenses 108a or 108b is used (placed in an optical path 124) can be known. In this arrangement, even if a strong shock is externally applied to the unit, an objective lens in an operation state can be discriminated. Therefore, great practical effects can be obtained. For example, an operation error can be prevented.

[Seventeenth Embodiment]

FIG. 45 shows the arrangement of an optical head apparatus according to the seventeenth embodiment of the present invention, which is roughly constituted by a stationary optical portion 401 and a lens actuator including a rotating blade 402 as a movable support member and a magnetic circuit 411. The rotating blade 402 can be rotated in a direction parallel to the recording surface of a recording medium (to be referred to as an optical disk hereinafter) (not shown) loaded in the optical disk apparatus, and can also be moved in the direction of the optical axis of a light beam irradiated on the optical disk. The stationary optical portion 401 is constituted by a transmission optical system including a light source 403 such as a semiconductor laser, a collimator lens 404, and a beam splitter 405, and a detection system, including a focusing lens 408, a holographic optical element (HOE) 409, and a photodetector 410, for detecting a light beam reflected by an optical disk.

The rotating blade 402 has a cylindrical shape with a bottom, at least the upper end portion (in FIG. 45) of which is closed. A plurality of (two in this case) objective lenses 407a and 407b are arranged on the upper end portion of the rotating blade 402. The magnetic circuit 411 is constituted by a pair of semi-arc yokes 412a and 412b arranged around the rotating blade 402 at positions opposing each other at 180°, magnets 413a and 413b attached to the inner circumferential portions of the yokes 412a and 412b, and tracking coils 414a to 414f arranged at positions where they can oppose the magnets 413a and 413b of the rotating blade 402. The arrangement and operation of this magnetic circuit 411 will be described in detail later.

A reflecting mirror 406 for forming an optical path between the beam splitter 405 and the objective lenses 407a and 407b is arranged between the stationary optical portion 401 and the rotating blade 402.

The operation of the optical head apparatus of this embodiment will be described next. Light emitted from the light source 403 is collimated by the collimator lens 404. The parallel beam is then focused by the objective lens 407a or 407b via the beam splitter 405 and the reflecting mirror 406 to form a small beam spot on a surface, of an optical disk which is placed on the rotating blade 402 and rotated, on which data is recorded (to be referred to as a recording surface hereinafter).

The light reflected by the recording surface of the optical disk travels along a route reverse to the above route, i.e., the route for incident light, from the light source 403 to the recording surface of an optical disk 420a or 420b through the collimator lens 404, the beam splitter 405, the reflecting mirror 406, and the objective lens 407a or 407b. That is, the reflected light is reflected by the beam splitter 405 through the objective lens 407a or 407b and the reflecting mirror 406 and guided to the detection system. The detection system generates error signals for controlling the position of a small beam spot focused by the objective lens 407a or 407b in the optical axis direction (focus direction) and the radial direction of the optical disk 420a or 420b (tracking direction) with respect to a pit array on the recording surface of the optical disk 420a or 420b, and also reproduces a reproduction signal recorded on the optical disk 420a or 420b.

The detection system for obtaining these three signals (the focus error signal, the tracking error signal, and the reproduction signal) can be realized by an arrangement like the one described in detail in "Optical Memory Apparatus" in Japanese Patent Disclosure (KOKAI) No. 3-257. Although the detection system itself is irrelevant to the gist of the present invention, its operation will be briefly described below. As described above, the detection system in this embodiment is constituted by the focusing lens 408, the HOE 409, and the photodetector 410. Light reflected by an optical disk is focused on the photodetector 410 by the focusing lens 408.

The region of the HOE 409 arranged between the focusing lens 408 and the photodetector 410 is divided into two regions by a line extending in the same direction as that of each track on the optical disk 420a or 420b. Holograms having different grating patterns are respectively formed in these two regions of the HOE 409. More specifically, when one hologram has a spindle-like grating pattern, the other hologram has a barrel-like grating pattern. In addition, different grating pitches are set such that diffracted light beams of the respective holograms are incident on the detection surface of the photodetector 410 at different positions. If the grating patterns of holograms on the HOE 409 are set in this manner, light beams on the photodetector 410 exhibit characteristic changes in shape in accordance with a focus offset. Therefore, the photodetector 410 is constituted by two two-division light-receiving elements, and differential detection of the respective diffracted light beams is performed by the two-division light-receiving elements, thereby detecting a focus error. A tracking error can be detected from a difference between the diffracted light beams of the respective holograms. In addition, a reproduction signal can be easily detected from the sum total of outputs from the photodetector 410. In this embodiment, the detection system is constituted by the HOE. However, the present invention is not limited to this detection system, and any known detection optical system such as a focus error detection system based on a so-called astigmatism method using a combination of a focusing lens and a cylindrical lens can be equally used.

Four output signals output from the two two-division light-receiving elements constituting the photodetector 410 are input to a detection signal processor 501 to be amplified and arithmetically processed, thereby generating a reproduction signal, a focus error signal, and a tracking error signal in the above manner. Of these signals, the reproduction signal is output to a signal processor (not shown) for performing a decoding operation and the like. The focus error signal and the tracking error signal are input to a control signal generating circuit 502 connected to a host system (not shown). After sequence control to lock focusing servo control and signal processing such as superposition of a special operation signal on a tracking control signal in a track search operation are performed, the resultant signals are output, as a focus control signal and a tracking control signal, from an actuator control circuit 503. Currents flowing in a focus coil 416 and the tracking coils 414a to 414c in the magnetic circuit 411 are controlled in accordance with these focus and tracking control signals.

In accordance with driving forces generated by electromagnetic effects upon this control, the rotating blade 402 is controlled in the optical axis direction (focus direction) of a light beam irradiated on an optical disk and the radial direction (tracking direction) of the optical disk, and control is performed to position a beam spot on a track on the optical disk.

These arrangements and a series of these operations are basically the same as those of a conventional optical head apparatus. A characteristic arrangement of this embodiment will be described below.

In general, an optical disk apparatus optically reads data recorded on an optical disk and reproduces the data as a signal. For this reason, if dust and flaws are present on the recording surface of the optical disk, light is scattered, and data cannot be reproduced. For this reason, the thickness of a layer (generally a disk substrate) of an optical disk on which a light beam is incident is set to be large, and the size of a beam spot on the disk substrate surface is set to be large, thereby reducing the influences of dust and flaws produced after the manufacturing process. The disk substrates of many conventional optical disk generally have a thickness of 1.2 mm. However, when the numerical aperture of an objective lens is increased or the wavelength of light emitted from a light source is shortened to increase the recording density of an optical disk, drawbacks based on thick disk substrates become conspicuous.

Figure 1B:
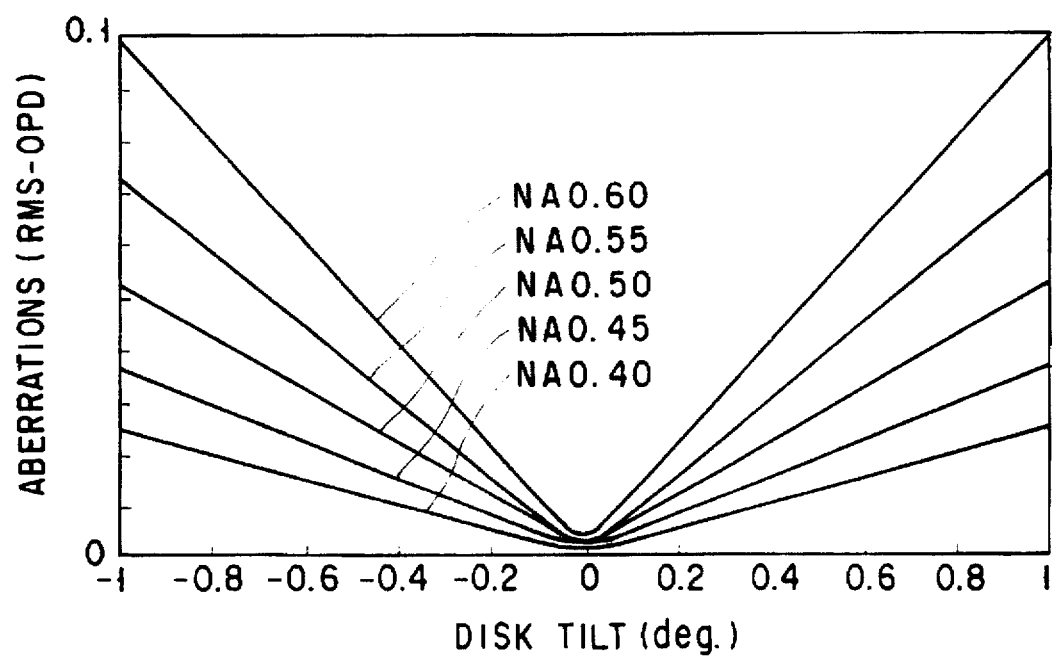

FIGS. 1A and 1B show changes in transmission wavefront aberration as optical disks tilt with respect to optical disks in cases wherein the thicknesses of the disk substrates are 1.2 mm and 0.6 mm, respectively. As shown in FIGS. 1A and 1B, even if the numerical aperture of the objective lens remains the same, the transmission wavefront aberration due to a disk tilt is reduced, and the focusing characteristics of a beam spot on the recording surface are improved as the thickness of the disk substrate decreases. For this reason, optical disks having thinner disk substrates have been developed. As a result, optical disks whose substrate thickness are different are present. It is inevitably required that data be reproduced from these optical disks by using the same apparatus. In order to meet such demands, the present invention has been made to stably reproduce data recorded on optical disks based on different specifications associated with substrate thickness and the like by using one simple, small, inexpensive apparatus without posing such conventional problems. This apparatus will be described in detail below.

FIGS. 46A and 46B schematically show how the specifications of optical disks are associated with the optical head apparatus. This case exemplifies the two optical disks 420a and 420b having different substrate thicknesses. The objective lenses 407a and 407b having different numerical apertures NAa and NAb are used for these optical disks 420a and 420b having different substrate thicknesses. The degrees of freedom in the specifications of the objective lenses 407a and 407b are associated with focal lengths (Fa and Fb), working distances (WDa and WDb), apertures (Da and Db), and the like. According to the degrees of freedom, several characteristic optical head apparatuses can be formed. This will be described in detail later.

In this embodiment, as shown in FIG. 45, the plurality of objective lenses 407a and 407b respectively having optimal optical characteristics in accordance with the specifications of optical disks are arranged on the rotating blade 402. By selectively using these objective lenses, data can be reproduced from optical disks based on different specifications. If, for example, an optical disk to be used is a CD, the thickness of a disk substrate is set to be 1.2 mm, and the numerical aperture of an objective lens is set to be 0.45. If a recording medium having a higher recording density is to be used, the thickness of a disk substrate is set to be 0.6 mm, and the numerical aperture of an objective lens is set to be 0.6. In this manner, an objective lens which satisfies these specifications is mounted. The rotating blade 402 is rotated in accordance with an optical disk inserted in the apparatus to select the optimal objective lens to the optical disk, thereby performing data reproduction. A control method of selecting one of the objective lenses 407a and 407b will be described later.

FIGS. 47A and 47B show the shapes of objective lenses as examples. FIG. 47A shows a glass mold lens. FIG. 47B shows a plastic injection lens. Although these lenses are only examples, they have characteristic differences in form because of different manufacturing methods and materials. Even with different specifications, lenses can be formed to have the same outer shape or weight in this manner. If objective lenses having such a relationship are arranged, an unbalanced state of weights which degrades the vibration characteristics of an actuator does not occur. Therefore, an excellent optical head apparatus can be formed.

Figure 48:
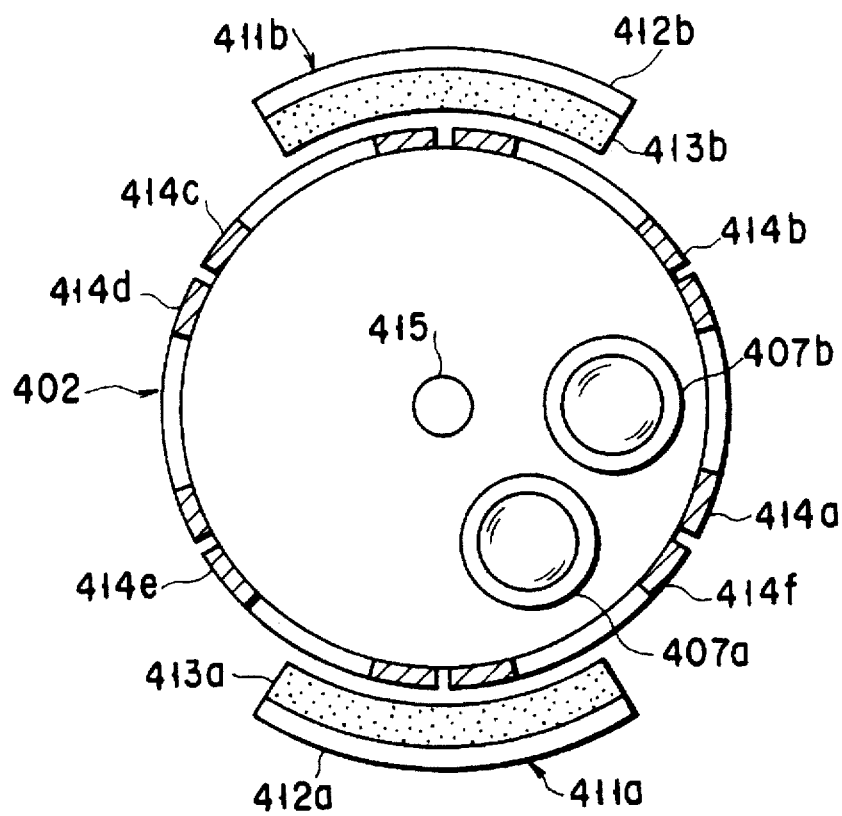
FIG. 48 is a view showing the detail arrangement of a lens actuator in the seventeenth embodiment.
Figure 49:
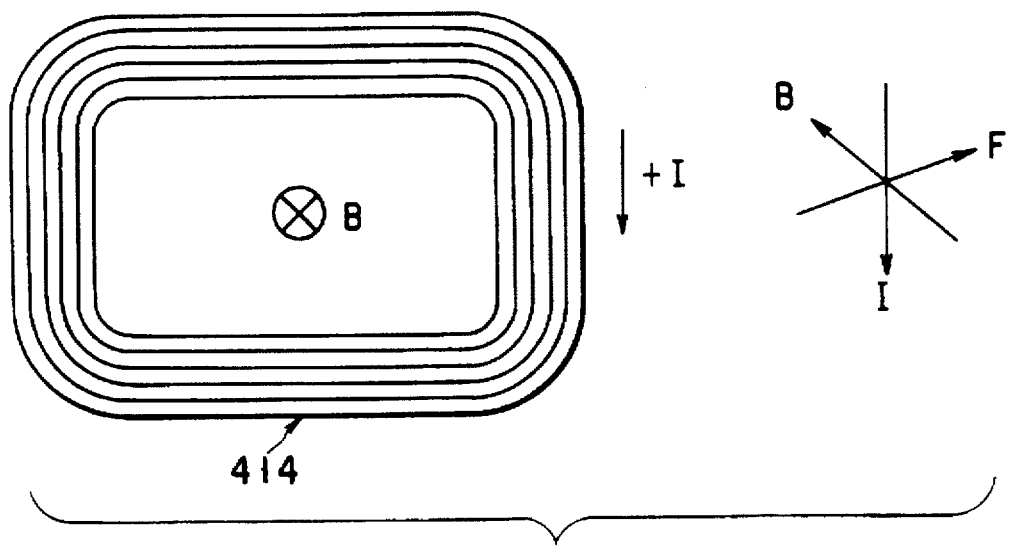
FIG. 49 is view showing the shape of a tracking coil arranged on a rotating blade in the seventeenth embodiment.

FIG. 48 shows the detailed arrangement of a lens actuator constituted by the rotating blade 402 and the magnetic circuit 411 (411a and 411b) shown in FIG. 45. The six tracking coils 414a to 414f, each having the shape shown in FIG. 49, are arranged on the outer surface of the rotating blade 402. These tracking coils 414a to 414f constitute the magnetic circuits 411a and 411b, together with the magnets 413a and 413b and the yokes 412a and 412b, so as to generate a driving force for selectively setting the objective lenses 407a and 407b on the optical axis of a light beam in accordance with the specifications of an optical disk (e.g., the substrate thickness of the optical disk) loaded in the optical disk apparatus, and a driving force for rotating/controlling the rotating blade 402 about a rotating shaft 415 as the rotational center to follow a track offset caused by the decentering of the optical disk in reproducing data recorded on the optical disk. Assume that the optical axis of a light beam is located on the chain line in FIG. 48. FIG. 48, therefore, shows a state wherein the objective lens 407b is located on the optical axis of the light beam, and the light beam is irradiated on the optical disk via the objective lens 407b, thereby reproducing data from the optical disk.

In this case, tracking control for data reproduction performed by irradiating a light beam on and optical disk via the objective lens 407a is performed by using the tracking coils 414d and 414e in the magnetic circuit 411a and the tracking coils 414a and 414b in the magnetic circuit 411b. On the other hand, tracking control for data reproduction performed by irradiating a light beam on an optical disk via the objective lens 407b is performed by using the tracking coils 414e and 414f in the magnetic circuit 411a and the tracking coils 414b and 414c in the magnetic circuit 411b.

In this embodiment, the objective lenses 407a and 407b are spaced apart from each other by 60°, and the tracking coils 414a to 414f are arranged at 60°-intervals around the entire circumference of the rotating blade 402. The relative positional relationship between the objective lenses and the tracking coils is set such that the hollow portion of each tracking coil 414 shown in FIG. 49 coincides the objective lenses 407a and 407b. With this arrangement of the objective lenses 407a and 407b and the tracking coils 414a to 414f, two tracking coils can always be set in each of the magnetic circuits 411a and 411b regardless of which one of the objective lenses 407a and 407b is used for data reproduction. With this arrangement, four of the six tracking coils 414a to 414f are used for tracking control. That is, the efficiency in using the tracking coils is high, and a large driving force can be efficiently generated.

Figure 50:
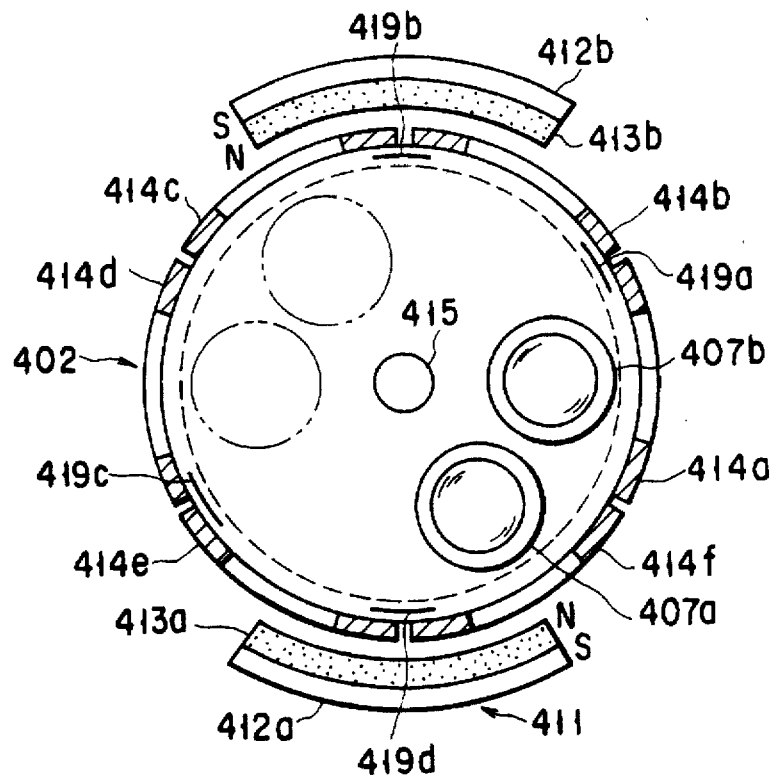
FIG. 50 is a view showing the more detailed arrangement of the lens actuator in the seventeenth embodiment.

FIG. 50 shows the arrangement of the lens actuator in more detail. In the rotating blade 402 of the lens actuator, ferromagnetic pieces 419a to 419d are respectively embedded between the tracking coils 414a and 414b, the tracking coils 414b and 414c, the tracking coils 414d and 414e, and the tracking coils 414e and 414f. These ferromagnetic pieces 419a to 419d serve to determine the neutral position of the rotating blade 402 in the optical axis direction of a light beam and the rotating direction of the rotating blade 402 with respect to the rotating shaft 415 as the center by using a magnetic attraction force acting between the magnets 413a and 413b in the magnetic circuits 411a and 411b. When each of the objective lenses 407a and 407b is located on the optical axis of a light beam, two of the ferromagnetic pieces 419a to 419d are respectively located at the centers of the magnetic circuits 411a and 411b. More specifically, when the objective lens 407a is located on the optical axis, the ferromagnetic pieces 419a and 419c are respectively located in the magnetic circuits 411a and 411b. When the objective lens 407b is located on the optical axis, the ferromagnetic pieces 419b and 419d are respectively located in the magnetic circuits 411a and 411b, as shown in FIG. 50.

Since the ferromagnetic pieces 419a to 419d are arranged to be located in the magnetic circuits 411a and 411b to determine the neutral position of the rotating blade 402 in this manner, the neutral position of the rotating blade 402 can be determined at the optimal positions for the two objective lenses 407a and 407b. Note that in an arrangement for determining a neutral position by using an elastic member such as a rubber member, the neutral position is present at only one point. Unlike in this embodiment, therefore, neutral positions cannot be set at two different positions. In addition, a method of determining neutral positions by using a magnetic balancing force as in the embodiment is disclosed in "Objective Lens Driving Unit" in Japanese Patent Disclosure (KOKAI) No. 60-140549. In this prior art, however, determination of only one set of neutral positions is disclosed, but determination of a plurality of sets of neutral positions is not disclosed.

Figure 51:
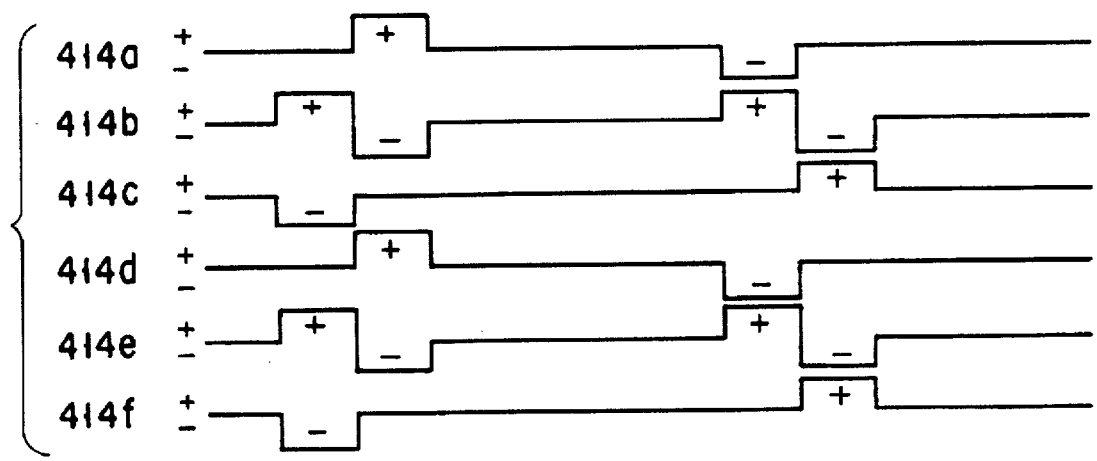
FIG. 51 is a timing chart showing the waveforms of currents, each supplied to the tracking coil to select one of a plurality of objective lenses arranged on the rotating blade in the seventeenth embodiment.

With the use of the lens actuator having the above arrangement, one of the objective lenses 407a and 407b can be arbitrarily located on the optical axis of a light beam by controlling the waveforms of currents supplied to the tracking coils 414a to 414f. FIG. 51 is a timing chart for explaining a control method of selecting one of the objective lenses 407a and 407b in the lens actuator shown in FIG. 50. More specifically, FIG. 51 shows the waveforms of currents to be supplied to the tracking coils 414a to 414f when the objective lens 407a is replaced with the objective lens 407b, and the objective lens 407b is replaced with the objective lens 407a. FIG. 49 shows the direction of a current flowing in each of the tracking coils 414a to 414f, and the direction of a force (indicated by "407b→407a" and "407a→407b") generated by each of the tracking coils 414a to 414f. Assume that when a current flows in each of the tracking coils 414a to 414f clockwise as shown in FIG. 49, the direction of the current is represented by a symbol "+", and a force acts on the rotating blade 402 to rotate it clockwise in this state.

When the objective lens 407b is to be replaced with the objective lens 407a, currents of the same direction are supplied to each of pairs of tracking coils spaced at 180°, i.e., the pair of tracking coils 414a and 414d, the pair of tracking coils 414b and 414e, and the pair of tracking coils 414c and 414f. Of these currents, the currents supplied to the pair of tracking coils 414b and 414e and the pair of tracking coils 414c and 414f are stepwise currents whose directions are reversed from "+" to "−" or from "−" to "+", as shown in FIG. 51. This operation is similar to a lens actuator control operation called "track jump" which is performed to repetitively reproduce data from the same track on an optical disk. In this embodiment, however, a characteristic feature of this operation is that the rotational angle of the rotating blade 402 is large. Another characteristic feature is that the waveforms of currents supplied to the tracking coils 414b and 414e are the same when the objective lens 407a is replaced with the objective lens 407b. This is because the positions of the tracking coils 414b and 414e located in the magnetic circuits 411a and 411b change every time the objective lenses 407a and 407b are replaced with each other.

A tracking control signal for supplying these currents to the tracking coils 414a to 414f is generated by the control signal generating circuit 502 in accordance with a request from the host system, as shown in FIG. 45, and is supplied to the tracking coils 414a to 414f via the actuator control circuit 503.

As described above, according to this embodiment, the plurality of objective lenses 407a and 407b are mounted on the same lens actuator. By controlling the waveforms of currents supplied to the tracking coils 414a to 414f, the objective lenses 407a and 407b are selectively set on the optical axis of a light beam in accordance with optical disks based on different specifications so as to be used for reproduction of data from these optical disks. With this arrangement, only one optical head is required. This solves the problems posed in the conventional techniques of mounting a plurality of objective lenses on special optical heads or lens actuators, respectively, i.e., the problem that the actuators or the optical heads occupy a large space, or the merit of reproducing data from optical disks based on different specifications by one optical disk apparatus is impaired because an optical system cannot be shared.

[Eighteenth Embodiment]

FIG. 52 schematically shows the arrangement of a lens actuator of this embodiment. In the embodiment, objective lenses 407a and 407b are arranged on a rotating blade 402 to be point symmetrical with a rotating shaft 415 as the center. Stationary optical portions 401, each having an arrangement similar to that shown in FIG. 45, are arranged in correspondence with these objective lenses 407a and 407b.

The optical head apparatus of this embodiment is mounted to be movable in the radial direction (indicated by an arrow A) of an optical disk 420 when the optical disk 420 is fitted on a guide shaft 418 of a spindle motor 417 to be loaded. The rotating blade 402 is arranged such that when the optical head apparatus is moved in the direction indicated by the arrow A, the locus of a rotating shaft 415 coincides with a straight line (indicated by the chain line) passing through the center of the optical disk 420. A data pit array 510 on the optical disk 420 is read by being irradiated with a light beam emerging from the objective lens 407a or 407b.

In this case, in order to select and use an objective lens suitable for the optical disk 420 loaded in the optical disk apparatus, signals detected from the optical disk 420 via the objective lens 407a or 407b need only to be selected as signals (a focus control signal and a tracking control signal) for driving the lens actuator in accordance with an instruction from a host system. For this reason, an objective lens need not be selected by rotating the rotating blade 402 through a large angle of, e.g., 60°, as in the seventeenth embodiment. Therefore, in this embodiment, the lens actuator may have almost the same arrangement as that of a lens actuator having one objective lens mounted thereon. That is, a lens actuator having the two objective lenses 407a and 407b mounted thereon can be easily formed as an application of a conventional technique.

[Nineteenth Embodiment]

Figure 53:
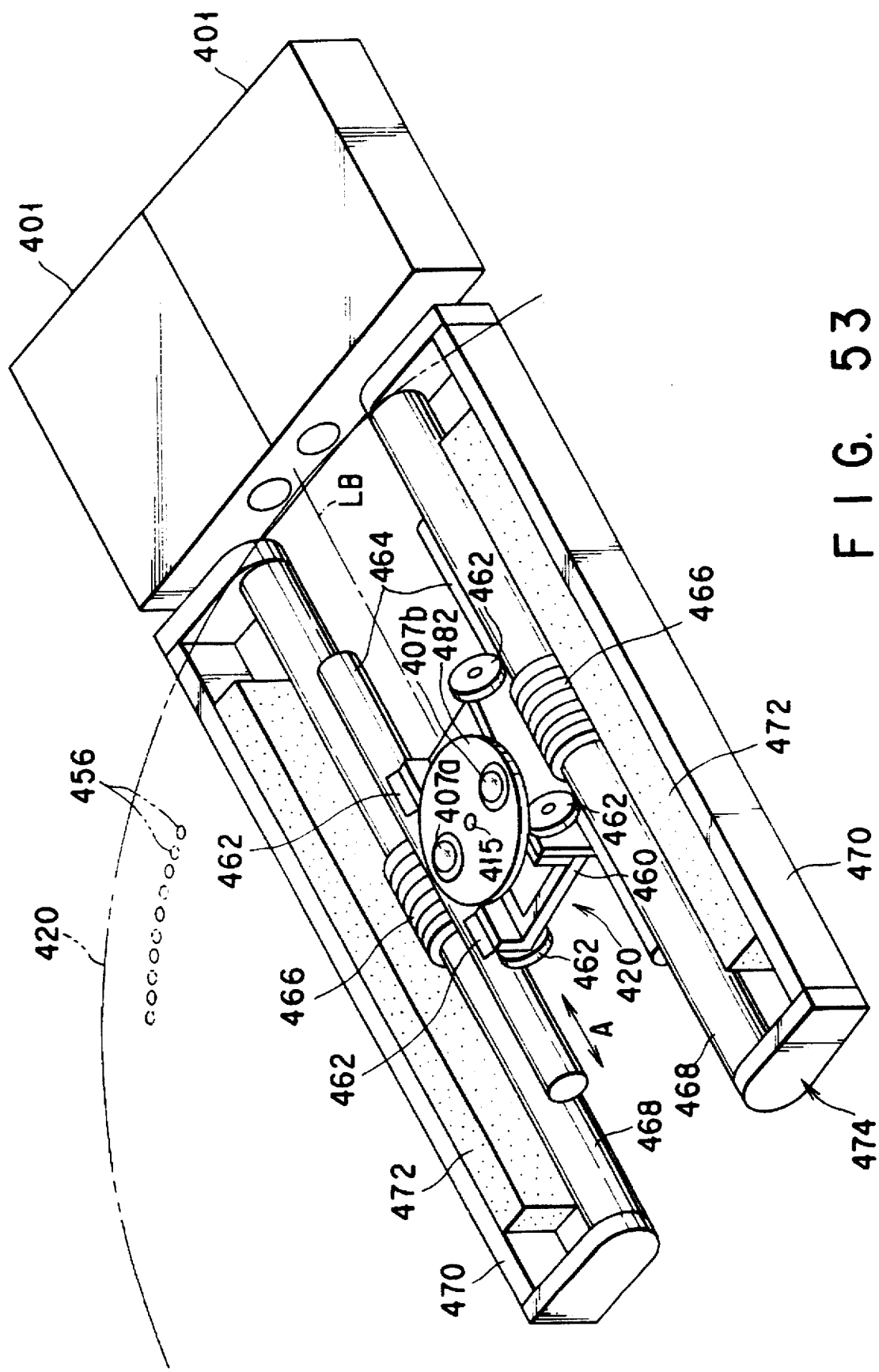
FIG. 53 is a perspective view showing the arrangement of the main part of an optical head according to the nineteenth embodiment of the present invention.

FIG. 53 shows the arrangement of an optical head apparatus according to the nineteenth embodiment of the present invention, in which the two stationary optical portions 401 in the eighteenth embodiment (FIG. 52) are fixed/arranged separately from a carriage for moving the optical head apparatus in the radial direction of an optical disk 420.

The arrangement of this embodiment will be described below. A pickup 421 carrying a movable optical system constituted by objective lenses 407a and 407b and a reflecting mirror (not shown) is arranged on the lower surface side of the optical disk 420. Two stationary optical systems 401 are arranged on the extended line of the path of the pickup 421 in the circumferential direction of the optical disk 420. A light beam irradiated from each stationary optical system 401 toward the pickup 421 is reflected at a right angle by the reflecting mirror of the movable optical system and focused/irradiated on the optical disk 420 via the objective lens 407a or 407b. A light beam reflected by the optical disk 420 passes through the objective lens 407a or 407b and is deflected horizontally by the reflecting mirror to be sent to a corresponding one of the stationary optical systems 401. When data is to be reproduced from the optical disk 420, a light beam focused/irradiated on the optical disk 420 via the objective lens 407a or 407b is intensity-modulated in accordance with the presence/absence of a pit 456, and the reflected light passes through the objective lens 407a or 407b and is guided to a corresponding one of the stationary optical systems 401 by the reflecting mirror.

The pickup 421 has a carriage 460 which can be moved in the radial direction (indicated by an arrow A) of the optical disk 420, i.e., the tracking control direction, by using a linear motor 474 as a drive source. A plurality of support rollers 462 are arranged, as roller pairs each supported through a leaf spring, on the two side portions of the carriage 460. These support rollers 462 are brought into rolling contact with two guide shafts 464 arranged horizontally and parallelly along the radial direction of the optical disk 420 so as to be movably supported in the radial direction of the optical disk 420.

In addition, radial coils 466 are mounted on the two side portions of the carriage 460. These radial coils 466 are fitted on inner yokes 468 of a magnetic circuit. The inner yokes 468 are connected to outer yokes 470. Magnets 472 are mounted on the inner sides of the outer yokes 470, thereby constituting the linear motor 474.

In this case, when power is supplied to the radial coils 466, a thrust is generated to reciprocate the carriage 460 in the radial direction of the optical disk 420.

According to the arrangement of this embodiment, as the components of the optical head apparatus on the carriage 460, only the lens actuator and the reflecting mirror are required, so that the number of components mounted on the carriage 460 can be greatly decreased. Therefore, the optical head apparatus is capable of high-speed access.

[Twentieth Embodiment]

Figure 54:
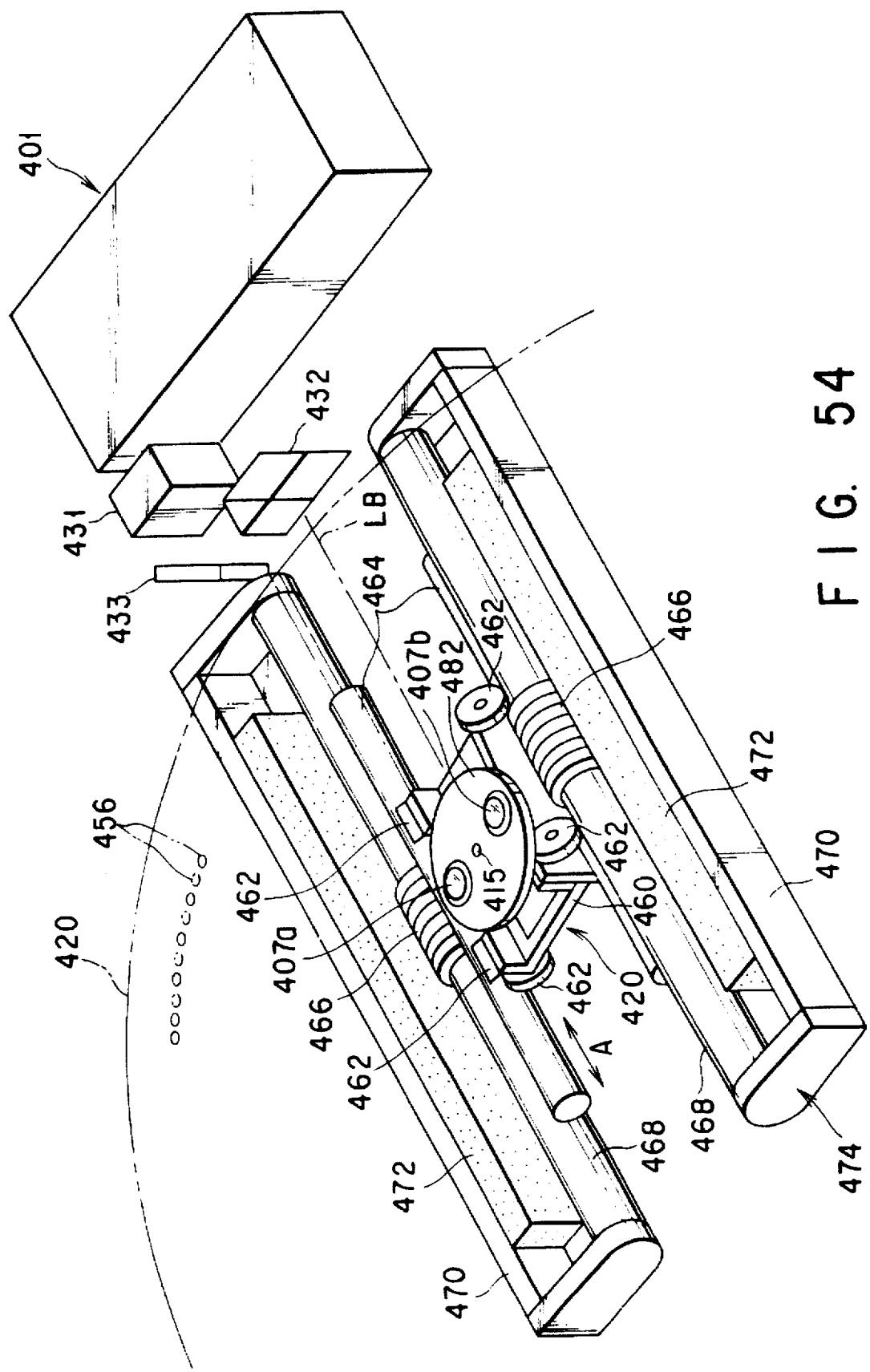
FIG. 54 is a perspective view showing the arrangement of the main part of an optical head according to the twentieth embodiment of the present invention.

FIG. 54 shows the arrangement of an optical head apparatus according to the twentieth embodiment of the present invention. The same reference numerals in the twentieth embodiment denote the same parts as in the nineteenth embodiment, and a description thereof will be omitted. In the nineteenth embodiment (FIG. 53), the two objective lenses 407a and 407b are arranged to be used for optical disks based on different specifications and hence cannot be used at once. Therefore, there is no need to have the stationary optical systems 401 respectively corresponding to the objective lenses 407a and 407b, and one stationary optical system may be designed such that many components are commonly used for the two objective lenses.

This embodiment is designed from this viewpoint. More specifically, the embodiment is designed such that a light beam from a stationary optical system 401 is selectively guided to one of the objective lenses 407a and 407b by an optical switch constituted by, e.g., a polarization plane rotating element 431 and a polarization beam splitter 432 in accordance with the specifications of an optical disk 420 loaded in the apparatus. As the polarization plane rotating element 431, one of the following elements can be used: an element designed to control the rotational amount of the polarization plane of a light beam incident via a capsule having a cholesteric material sealed therein and transparent electrodes mounted on the upper and lower surfaces of the capsule by controlling an applied voltage; and an element designed to electrically control the rotational amount of the polarization plane of an incident light beam by using the magnetooptical effect of an optical crystal.

As described above, since the optical head apparatus of this embodiment requires only one stationary optical system, the overall arrangement of the stationary optical system can be further simplified, and the objective lenses can be selectively used for reproduction of data from optical disks based on different specifications with substantially the same arrangement as that of a conventional optical head apparatus constituted by one objective lens and one stationary optical system.

[21st Embodiment]

Figure 55:
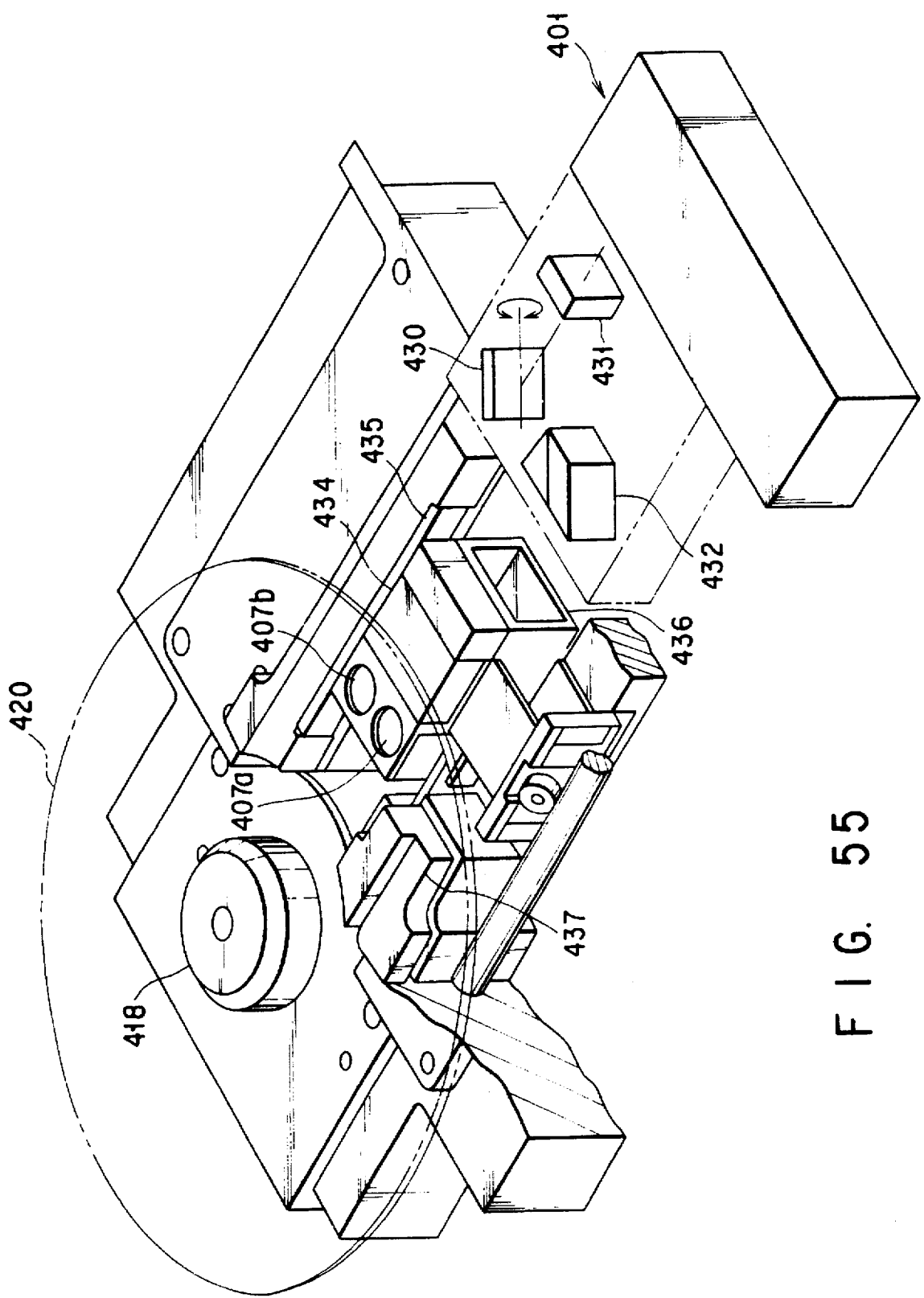
FIG. 55 is a perspective view showing the arrangement of the main part of an optical head according to the 21st embodiment of the present invention.

FIG. 55 shows the arrangement of an optical head apparatus according to the 21st embodiment of the present invention, in which the arrangement of the movable optical system mounted on the carriage 460 of the optical head apparatus of the nineteenth embodiment (FIG. 53) is further simplified to improve the high-speed access characteristics.

More specifically, in each of the seventeenth to twentieth embodiments, the two objective lenses 407a and 407b are arranged on the rotating blade 402 capable of two-dimensionally controlling the positions of the objective lenses. In contrast to this, in this embodiment, two objective lenses 407a and 407b are fixed on a movable end of a carriage 434 which is constituted by a suspension constituted by, e.g., two parallel leaf springs and can be controlled (moved) only in the optical axis direction, thereby simplifying the arrangement of the lens actuator. With this arrangement, a reduction in the weight of the movable member in an access operation is achieved to realize an access operation at a higher speed.

In addition, in this embodiment, a magnetic circuit 435 for moving the objective lenses 407a and 407b in the optical axis direction is attached to a magnetic circuit 437 for moving the carriage 434 in the radial direction of an optical disk 420.

With this arrangement, the components on the carriage 434 are further reduced in weight. In this embodiment, since the controllable degree of freedom of the lens actuator is set for only one axis, a mechanism capable of performing control in the direction of the remaining one axis (control in the tracking direction) is required. For such a mechanism, a swing mirror 430 may be arranged at a light beam exit portion directed from the stationary optical system 401 to the movable optical system so as to control the position of a beam spot on the optical disk 420 in the radial direction. Furthermore, similar to the twentieth embodiment shown in FIG. 54, an optical switch constituted by a polarization plane rotating element 431 and a polarization beam splitter 432 may be arranged to share the arrangement of the stationary optical system 401.

Figure 56:
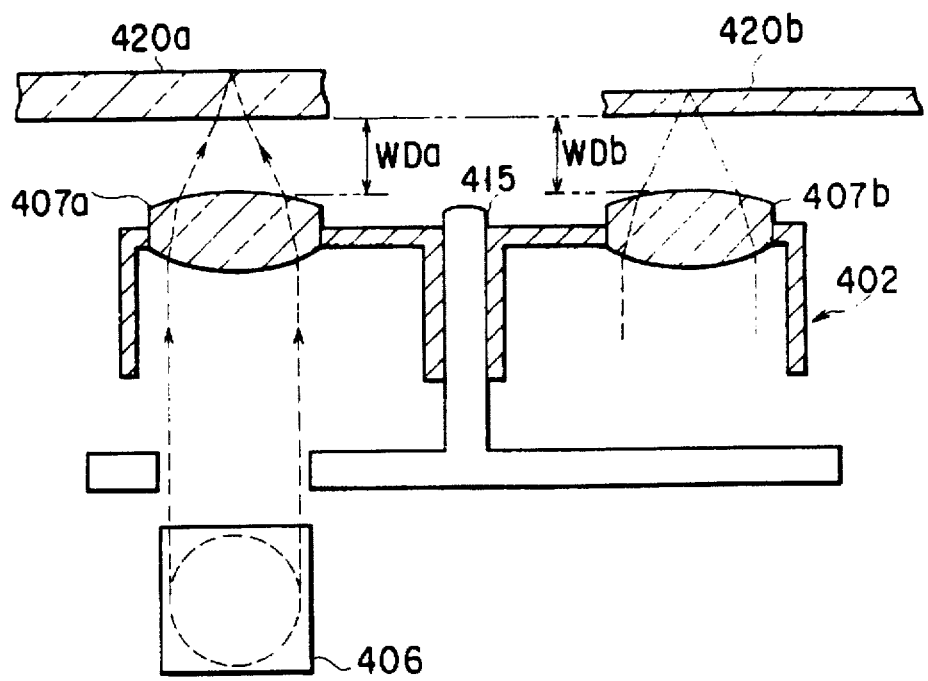
FIG. 56 is a view showing a correlation in the first specifications between two objective lenses in the seventeenth to 21st embodiments.

The manner of setting specifications for objective lenses with respect to optical disks based on different specifications in each of the seventeenth to 21st embodiments will be described below with reference to FIGS. 56 and 57. The optical disk 420 is mounted on the spindle motor with a surface on which a light beam is incident being considered as a reference surface. For this reason, as shown in FIG. 56, if a difference between the specifications of the optical disks 420a and 420b is a different in substrate thickness, the range in which the rotating blade 402 is moved in the optical axis direction of a light beam can be minimized by setting objective lenses having different focal lengths but having almost the same working distance as the two objective lenses 407a and 407b. With this arrangement, even if the optical disks 420a and 420b are replaced with each other, focus control can be easily performed to focus a light beam on the recording surface of the optical disk.

Assume that optical disks using polycarbonate as a substrate material and respectively having thicknesses of 1.2 mm and 0.6 mm as the optical disks 420a and 420b, and the focal length of the objective lens 407b used for reproduction of a signal from the optical disk 420b is set to be 2.6 mm. In this case, if the focal length of the objective lens 407a used for reproduction of a signal from the optical disk 420a is set to be 3 mm, working distances WDa and WDb of the objective lenses 407a and 407b can be made substantially the same.

Figure 57:
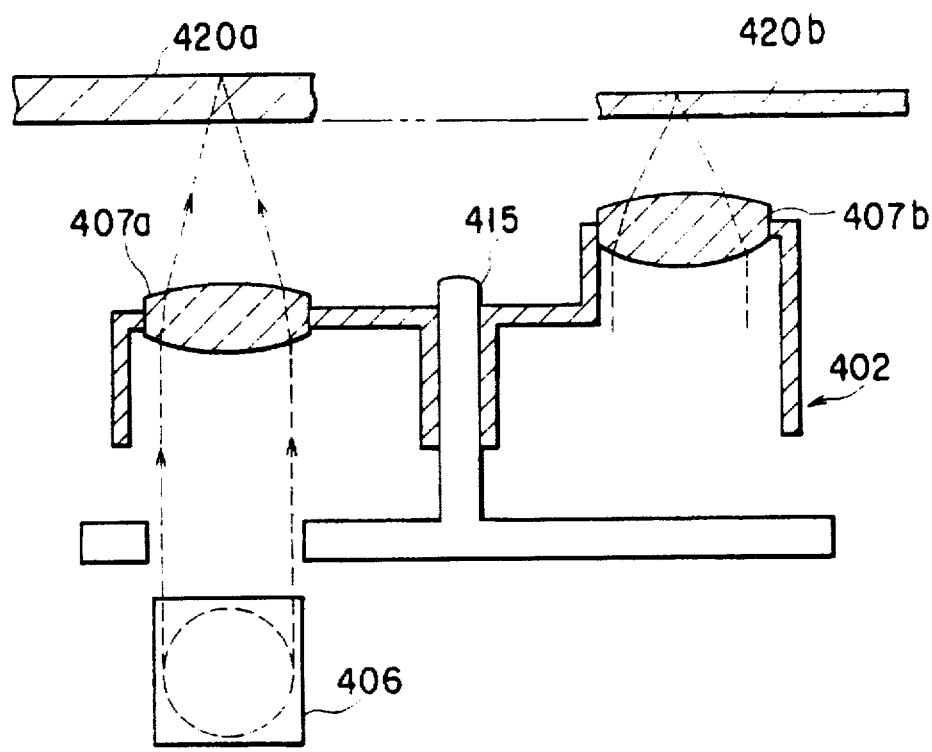
FIG. 57 is a view showing a correlation in the second specifications between two objective lenses in the seventeenth to 21st embodiments.

FIG. 57 shows a method of coping with not only different thicknesses of the substrates of the optical disks 420a and 420b but also different densities of data recorded thereon. Assume that the optical disk 420a is a CD on which digital music data is recorded, and is based on specifications for the next generation, which is higher in recording density than the optical disk 420b. In this case, the numerical aperture of the objective lens 407a for reproduction of a signal from the optical disk 420a is 0.4 to 0.45, and that of the objective lens 407b for reproduction of a signal from the optical disk 420b is 0.6, which is larger than the numerical aperture of the objective lens 407a.

If apertures Da and Db of the objective lenses 407a and 407b are set to be the same, the coefficients of utilization of incident light beams become the same. Therefore, the detection levels of reproduction signals obtained by detecting light beams reflected by the optical disks 420a and 420b can be made substantially the same. This allows simplification of the arrangement of the detection signal processor 501 in FIG. 45. If detection signals obtained by the photodetector 410 change in level depending on optical disks subjected reproduction processing, the amplification degree must be controlled to make the reproduction output levels become almost the same value. Such control is required for the following reason. If the detection level changes, the control gains of the focus control system and the tracking control system change, resulting in unstable control.

If the focal length of the objective lens 407b is set to be 2.6 mm, the apertures Da and Db of the objective lenses 407a and 407b can be made equal by setting the focal length of the objective lens 407b to be 3.9 mm. That is, as shown in FIG. 57, a stepped portion is formed on a portion, of the rotating blade 402, which serves to support the objective lenses 407a and 407b so that the objective lenses 407a and 407b can be disposed at different distances from the optical disk in accordance with the focal lengths of the objective lenses 407a and 407b. If specifications for the two objective lenses 407a and 407b are set under such conditions, since the outer shapes and weights of the lenses can be made substantially the same, although the numerical apertures are different, the weight balance of the lens actuator for driving/controlling the objective lenses two-dimensionally is improved. As a result, a lens actuator with excellent controllability can be easily realized.

Figure 58:
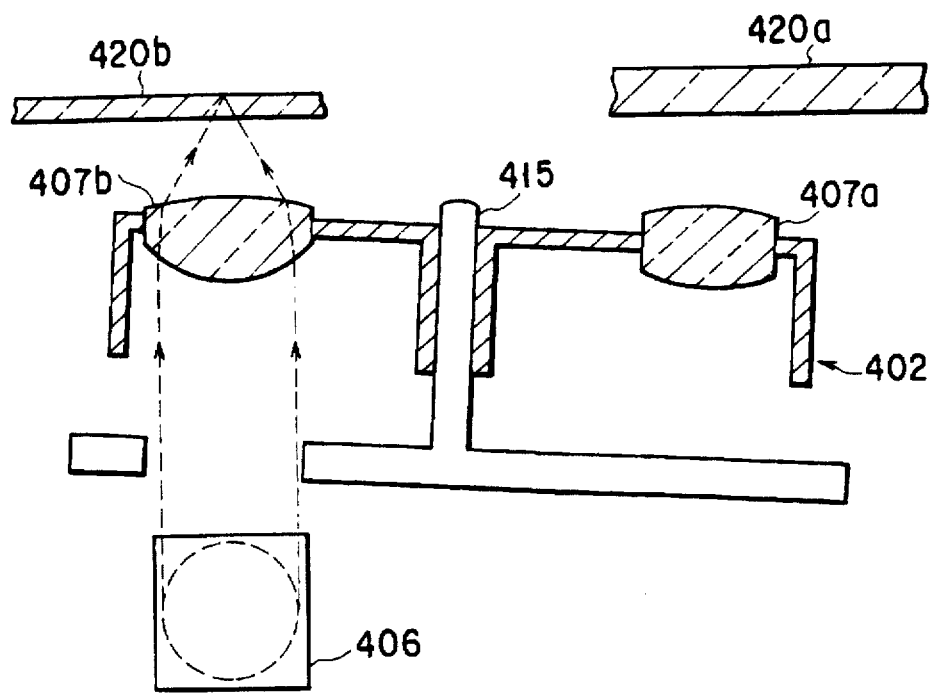
FIG. 58 is a view for explaining an adjustment method for the optical head apparatuses according to the seventeenth to 21st embodiments.

FIG. 58 shows an adjustment means used when the two objective lenses 407a and 407b are not properly mounted on the rotating blade 402. Assume that numerical apertures NAa and NAb of the two objective lenses 407a and 407b are represented by NAa<NAb. Prior to a description of this adjustment means, the background will be described with reference to FIG. 59.

Figure 59:
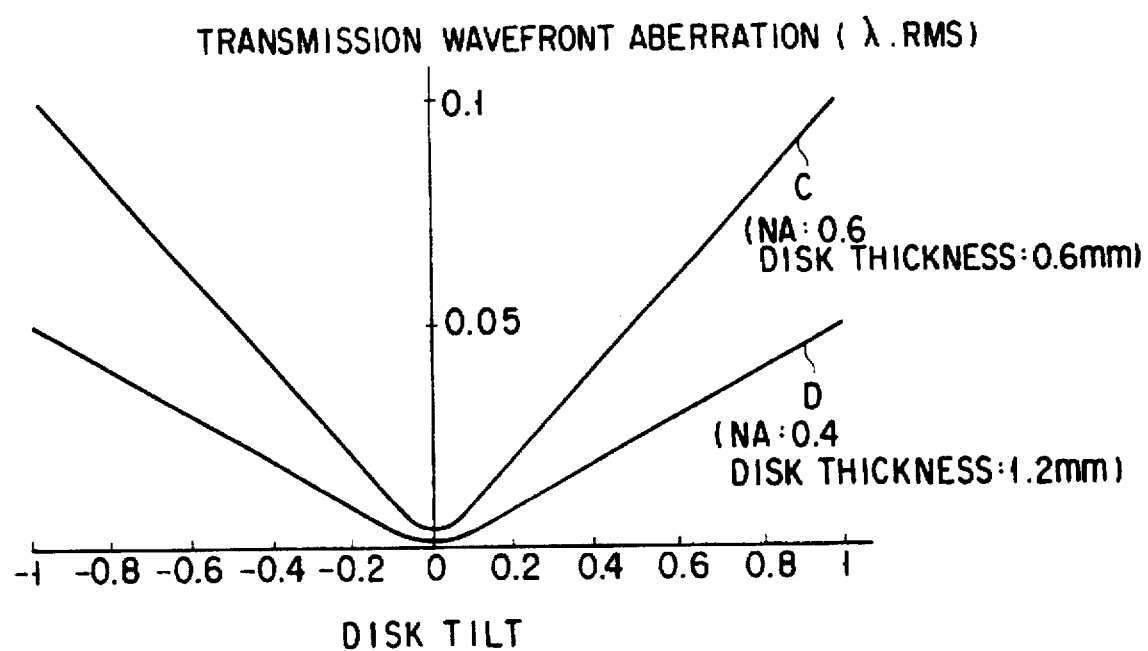
FIG. 59 is a graph showing the relationship between the wavefront aberration and the degree of tilting of the disk.

FIG. 59 shows changes in transmission wavefront aberration caused when optical disks tilt relative to objective lenses. A curve D represents the characteristics of the objective lens 407a having a smaller numerical aperture, whereas a curve C represents the characteristics of the objective lens 407b having a larger numerical aperture. As is apparent, the influence of a tilt on the objective lens 407a having the smaller numerical aperture is smaller than that on the other objective lens. By using this characteristic, the optimal adjustment method is determined.

The adjustment method will be described below with reference to FIG. 58, although no detailed description is required due to the description associated with FIG. 59. Relative tilt adjustment with respect to an optical disk is performed by using the objective lens 407b having the larger numerical aperture. In this case, the optical disk 420a is arranged in a tilted state with respect to the objective lens 407a having the smaller aperture. However, since the influence of this tilt on the objective lens 407a is smaller than that on the objective lens 407b, reproduction of a reproduction signal can be performed properly as a whole.

Although particular embodiments have been described above, the present invention can be carried out by arbitrarily combining the above embodiments. In this case, further many effects can be expected. The gist of the present invention is to provide an optical head apparatus which can obtain reproduction signals having sufficiently high quality in reproducing signals from optical disks based on different specifications, without considerably changing an optical head apparatus constituted by one objective lens, by selectively using at least two objective lenses suitable for the specifications of the optical disks, which are arranged on a lens actuator.

As has been described above, according to the present invention, since a predetermined objective lens can be selected (and used) from a plurality of objective lenses suitable for different types of recording media in accordance with the type of a recording medium used, proper data reproduction can always be performed regardless of the specifications of a recording medium. In addition, according to the present invention, especially since a plurality of objective lenses are mounted on a movable support member such as a rotating blade, and one of the objective lenses is selected by controlling the movable support member, only one lens actuator is required. Therefore, the overall arrangement of the apparatus can be greatly reduced in size and simplified as compared with an arrangement having optical heads respectively having objective lenses based on different specifications for optical heads based on different specifications, and head moving mechanisms.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, it has been described that the plural objective lenses are provided for processing a plurality of optical disks based on different standards associated with, e.g., recording density, allowable warp value, and substrate thickness. However, the present invention is not limited to this. If different specifications are set for objective lenses in a recording operation and a reproducing operation, respectively, with respect to the same optical disk, the plural objective lenses may be selectively used for a recording operation and a reproducing operation, respectively. Further, the optical disk is not limited to the read-only optical disk, but may be a write-once type optical disk or a rewritable optical disk.

What is claimed is:

1. An optical head apparatus used for an optical data recording/reproducing device, comprising:
   plural movable objective lenses for irradiating light in an optical path of a common light source onto a recording medium; and
   means for selecting a desired objective lens among said plural objective lenses and moving the selected desired objective lens to locate the selected desired objective lens in the optical path of the common light source to receive light from the common light source and irradiate the received light through the selected desired objective lens onto the recording medium.

2. An apparatus according to claim 1, wherein said plural objective lenses are associated with types of plural recording media; and
   said selecting means comprises means for selecting the desired objective lens in accordance with the type of the recording medium.

3. An apparatus according to claim 1, wherein said plural objective lenses comprises a first objective lens suitable for recording and a second objective lens suitable for reproducing; and
   said selecting means comprises means for selecting one of said first and second objective lenses depending on a recording mode or a reproducing mode.

4. An apparatus according to claim 1, wherein said plural objective lenses are associated with types of signal processings for plural recording media; and
   said selecting means comprises means for selecting an objective lens in accordance with the type of the signal processing of the recording medium.

5. An apparatus according to claim 1, which further comprises:
   means for holding said plural objective lenses, said holding means being movably around an axis perpendicular to the recording medium.

6. An apparatus according to claim 5, wherein said holding means holds said plural objective lenses with an equal interval around the axis.

7. An apparatus according to claim 5, wherein said holding means holds the plural objective lenses with unequal intervals around the axis.

8. An apparatus according to claim 5, wherein said holding means holds said plural objective lenses having focal distances such that distances between said objective lenses and the data recording medium become constant.

9. An apparatus according to claim 1, wherein said plural objective lenses are mounted on a rotatable member such that said plural objective lenses are at an equal distance from a rotation axis of said rotatable member.

10. An apparatus according to claim 1, wherein said plural objective lenses have different optical characteristics.

11. An optical head apparatus used for an optical data recording/reproducing device, comprising:
   a movable member driven in a direction of thickness of a recording medium and a direction perpendicular to the direction of thickness, the movable member having a common light source emitting light in an optical path of the common light source;
   plural movable objective lenses, mounted on said movable member and movable by movement of said movable member, for irradiating light from the optical path of the common light source onto the recording medium; and
   means for selecting a desired objective lens in accordance with a type of the recording medium, and moving said movable member to locate the desired objective lens in the optical path of the common light source to receive light from the common light source and irradiate the received light through the selected desired objective lens onto the recording medium.

12. An apparatus according to claim 11, wherein said movable member is supported by a slide bearing mechanism for allowing said movable member to slide in an axial direction and rotate about an axis of said movable member.

13. An apparatus according to claim 12, wherein said plural objective lenses are mounted on said movable member with equal intervals around the axis of said slide bearing mechanism.

14. An apparatus according to claim 12, wherein said plural objective lenses are mounted on said movable member at an equal distance from the axis of said slide bearing mechanism.

15. An apparatus according to claim 12, wherein said plural objective lenses are mounted on a rotatable member such that a center of gravity of said plural objective lenses is set to coincide substantially with an axis of said rotatable member.

16. An apparatus according to claim 11, wherein said plural objective lenses have different optical characteristics.

17. An apparatus according to claim 11, wherein
said movable member is supported by a slide bearing mechanism for allowing said movable member to slide in an axial direction and rotate about an axis of said movable member; and
said objective lenses are mounted on said movable member with unequal intervals around the axis of said slide bearing mechanism.

18. An apparatus according to claim 11, wherein said selecting means comprises tracking coil means for driving said movable member in the direction of thickness and the direction perpendicular thereto.

19. An apparatus according to claim 11, wherein said selecting means comprises coil means, fixed to said movable member, for driving said movable member in the direction of thickness and the direction perpendicular thereto.

20. An apparatus according to claim 11, wherein said movable member is supported by a slide bearing mechanism for allowing said movable member to slide in an axial direction and rotate about an axis of said movable member, and
said movable member can be rotated about the axis through at least (360/n)°, where n is the number of said plural objective lenses.

21. An apparatus according to claim 11, wherein
said movable member is supported by a slide bearing mechanism for allowing said movable member to slide in an axial direction and rotate about an axis of said movable member;
said objective lenses are mounted on said movable member with equal intervals around the axis of said slide bearing mechanism; and
said selecting means comprises:
coil means for driving said movable member at least around the axis; and
magnetic circuit means, arranged at equal intervals around said movable member, for applying magnetic field to said coil means.

22. An apparatus according to claim 21, wherein said magnetic circuit means comprises magnetic circuits, the number of the magnetic circuits being equal to the number of said objective lenses.

23. An apparatus according to claim 11, wherein
said movable member is supported by a slide bearing mechanism for allowing said movable member to slide in an axial direction and rotate about an axis of said movable member; and
said selecting means comprises:
magnetic members arranged around the axis of said movable member; and
magnetic circuits, arranged at equal intervals around said movable member, for applying magnetic fields to said magnetic members.

24. An apparatus according to claim 23, wherein said magnetic members are arranged at equal intervals around the axis of said movable member.

25. An apparatus according to claim 11, wherein said movable member is supported by a slide bearing mechanism for allowing said movable member to slide in an axial direction and rotate about an axis of said movable member, and said movable member comprises at least one counterweight for balancing masses of said objective lenses around the axis of said movable member.

26. An apparatus according to claim 25, wherein said objective lenses and said counterweight are arranged at equal intervals around the axis of said movable member.

27. An apparatus according to claim 25, wherein
said selecting means comprises magnetic circuits for generating a driving force of said movable member; and
the number of said objective lenses and said counterweight is equal to the number of the magnetic circuits.

28. An apparatus according to claim 11, wherein said movable member is supported by a slide bearing mechanism for allowing said movable member to slide in an axial direction and rotate about an axis of said movable member, and said movable member comprises projections protruding in a radial direction.

29. An apparatus according to claim 11, wherein said movable member is supported by a slide bearing mechanism for allowing said movable member to slide in an axial direction and rotate about an axis of said movable member, and said movable member comprises a cylindrical portion on one side thereof with respect to the axis and a portion protruding more in a radial direction than the cylindrical portion on the other side thereof.

30. An apparatus according to claim 29, wherein said selecting means comprises:
coil means, fixed to the cylindrical portion of said movable member, for driving said movable member at least around the axis; and
magnetic circuit means, arranged to oppose the cylindrical portion of said movable member, for applying magnetic field to said coil means, the magnetic circuit means being arranged at a lower position than the protruding portion.

31. An apparatus according to claim 11, wherein
said movable member is supported by a slide bearing mechanism for allowing said movable member to slide in an axial direction and rotate about an axis of said movable member;
said objective lenses are arranged at equal intervals around the axis of said movable member;
said selecting means comprises:
coil means for driving said movable member at least around the axis; and
magnetic circuit means for applying magnetic field to said coil means; and said movable member comprises holes into which a part of said magnetic circuit means is inserted.

32. An apparatus according to claim 31, wherein said magnetic circuit means comprises magnetic circuits, the number of the magnetic circuits being equal to the number of the holes and the parts of said magnetic circuits are respectively inserted into the holes.

33. An apparatus according to claim 11, wherein said movable member is supported by a slide bearing mechanism for allowing said movable member to slide in an axial direction and rotate about an axis of said movable member;

said objective lenses are arranged at equal intervals around the axis of said movable member;

said selecting means comprises:

first coil means for driving said movable member around the axis;

second coil means for driving said movable member in the axial direction; and magnetic circuit means for applying magnetic field to said first and second coil means;

said movable member comprises holes into which a part of said magnetic circuit means is inserted; and a drive of said movable member around the axis is performed after a drive of said movable member in the axial direction.

34. An apparatus according to claim 11, wherein said movable member is supported by a slide bearing mechanism for allowing said movable member to slide in an axial direction and rotate about an axis of said movable member;

said objective lenses are arranged at equal intervals around the axis of said movable member;

said selecting means comprises:

coil means for driving said movable member around the axis;

an arcuated guide plate extending around said movable member; and a flexible printed circuit board for coupling said movable member to said guide plate and allowing supply of a current to said coil means.

35. An apparatus according to claim 11, wherein said movable member is supported by a slide bearing mechanism for allowing said movable member to slide in an axial direction and rotate about an axis of said movable member;

said objective lenses are arranged at equal intervals around the axis of said movable member;

said selecting means comprises:

coil means for driving said movable member around the axis;

magnetic circuits for applying magnetic fields to said coil means;

an arcuated guide plate extending around said movable member to have a length corresponding to at least $((360/n)/2)°$, where n is the number of said magnetic circuits; and a flexible printed circuit board for coupling said movable member to said guide plate and allowing supply of a current to said coil means.

36. An apparatus according to claim 11, in which said movable member has a magnet, and which further comprises coil means, arranged around said movable member, for driving said movable member at least in the direction perpendicular the direction of thickness.

37. An apparatus according to claim 36, wherein said movable member comprises projections protruding in a radial direction.

38. An apparatus according to claim 37, wherein said coil means comprises:

an annular yoke surrounding said movable member; and a coil fixed to said yoke.

39. An apparatus according to claim 38, wherein said yoke has a non-circular shape.

40. An apparatus according to claim 11, wherein said movable member is elastically supported by leaf springs in a direction of thickness of the recording medium.

41. An apparatus according to claim 11, wherein said movable member is supported by a slide bearing mechanism for allowing said movable member to slide in an axial direction and rotate about an axis of said movable member;

the slide bearing mechanism is elastically supported by leaf springs and allowed to move in an axial direction; and objective lenses are mounted on said movable member such that at least one of said objective lenses can move between said leaf springs.

42. An apparatus according to claim 11, wherein said selecting means comprises:

a non-circular magnet fixed to said movable member;

a yoke arranged around said movable member; and coil means, fixed to a portion of said yoke which is adjacent to said magnet, for driving said movable member at least in the direction perpendicular to the direction of thickness.

43. An apparatus according to claim 11, wherein said movable member is elastically supported by a hinge mechanism to be movable at least in the direction perpendicular to the direction of thickness; and said objective lenses are mounted on said movable member within an angle range in which said hinge mechanism is elastic.

44. An apparatus according to claim 43, wherein said hinge mechanism comprises two hinges.

45. An apparatus according to claim 43, wherein said selecting means comprises magnetic circuit means capable of magnetically holding said movable member at two positions in the direction perpendicular to the direction of thickness; and said objective lenses are located between said magnetic circuit means and said hinge mechanism.

46. An optical head apparatus used for an optical data recording/reproducing device, comprising:

a stationary optical system including a light source for emitting light in an optical path and a detection system for detecting light reflected by a recording medium, and arranged at a position fixed to the recording medium;

plural movable objective lenses for focusing/irradiating light emitted from said light source into said optical path onto the recording medium;

a movable support member supporting said plural movable objective lenses and arranged to be movable in a direction parallel to the recording medium, said plural objective lens being movable by means of said movable support member; and control means for controlling said movable support member to move said movable objective lenses and selectively locate a desired one of said plural objective lenses into said optical path to receive light from said stationary light source and irradiate the received light through the selected desired objective lens onto the recording medium.

47. An apparatus according to claim 46, wherein said movable support member is movable in a direction parallel to the recording medium; and said control means controls a length of movement of said movable support member.

48. An apparatus according to claim 46, wherein said movable support member is rotatable in a direction parallel to the recording medium; and said control means controls an angle of rotation of said movable support member.

49. An apparatus according to claim 48, wherein said movable support member comprises a ferromagnetic piece;

said control means comprises:

magnetic circuit means for rotating said movable support member, the positioning of said movable support member with respect to the rotation being performed by locating the ferromagnetic piece in the magnetic circuit means; and means for supplying a current to said magnetic circuit means to rotate said movable support member.

50. An apparatus according to claim 49, wherein said magnetic circuit means comprises tracking coil means, mounted on an outer surface of said movable support member, for tracking light on the recording medium; and said control means supplies a given current to said tracking coil means to apply a larger rotating force to said movable support member than in a tracking operation so as to attract said movable support member to a rotational position determined by a magnetic positioning action of said ferromagnetic piece, thereby selectively locating a desired one of said objective lenses on the optical axis.

51. An apparatus according to claim 48, wherein said plural objective lenses are arranged with equal intervals around a rotation axis of said movable support member.

52. An apparatus according to claim 46, wherein said stationary optical system includes plural optical systems corresponding to said plural objective lenses.

* * * * *